US012007680B2

United States Patent
Wippermann et al.

(10) Patent No.: US 12,007,680 B2
(45) Date of Patent: Jun. 11, 2024

(54) DEVICE COMPRISING A MULTI-APERTURE IMAGING DEVICE FOR GENERATING A DEPTH MAP

(71) Applicant: Fraunhofer-Gesellschaft zur Foerderung der angewandten Forschung e.V., Munich (DE)

(72) Inventors: Frank Wippermann, Jena (DE); Jacques Duparré, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 254 days.

(21) Appl. No.: 17/484,723

(22) Filed: Sep. 24, 2021

(65) Prior Publication Data

US 2022/0011661 A1    Jan. 13, 2022

Related U.S. Application Data

(63) Continuation of application No. PCT/EP2020/058222, filed on Mar. 24, 2020.

(30) Foreign Application Priority Data

Mar. 25, 2019    (DE) .......................... 102019204075.6

(51) Int. Cl.
  *H04N 13/271*    (2018.01)
  *G02B 26/08*    (2006.01)
  (Continued)

(52) U.S. Cl.
  CPC ......... *G03B 35/04* (2013.01); *G02B 26/0816* (2013.01); *H04N 13/239* (2018.05);
  (Continued)

(58) Field of Classification Search
  CPC .... G03B 35/04; H04N 13/271; H04N 13/239; H04N 23/51; H04N 23/67; H04N 23/56; H04N 23/55; G02B 26/0816
  See application file for complete search history.

(56) References Cited

U.S. PATENT DOCUMENTS

9,204,121 B1 *  12/2015  Marason ................ H04N 5/141
9,495,751 B2    11/2016  Wajs
(Continued)

FOREIGN PATENT DOCUMENTS

| CN | 107223331 A | 9/2017 |
| CN | 108139565 A | 6/2018 |
(Continued)

*Primary Examiner* — Thai Q Tran
*Assistant Examiner* — Jose M Mesa
(74) *Attorney, Agent, or Firm* — Perkins Coie LLP; Michael A. Glenn

(57) ABSTRACT

An inventive device includes a multi-aperture imaging device comprising an image sensor; an array of adjacently arranged optical channels, each optical channel including an optic for projecting at least one partial field of view of a total field of view onto an image sensor area of the image sensor arrangement, a beam deflection means for deflecting an optical path of the optical channels, and a focusing means for setting a focal position of the multi-aperture imaging device. The device further comprises a control means configured to control the focusing means and to receive image information from the image sensor; the control means being configured to control the multi-aperture imaging device into a sequence of focal positions so as to capture a corresponding sequence of image information of the total field of view and to produce, from the sequence of image information, a depth map for the captured total field of view.

21 Claims, 34 Drawing Sheets

(51) Int. Cl.
*G03B 35/04* (2021.01)
*H04N 13/239* (2018.01)
*H04N 23/51* (2023.01)
*H04N 23/55* (2023.01)
*H04N 23/56* (2023.01)
*H04N 23/67* (2023.01)

(52) U.S. Cl.
CPC ........... *H04N 13/271* (2018.05); *H04N 23/51* (2023.01); *H04N 23/55* (2023.01); *H04N 23/56* (2023.01); *H04N 23/67* (2023.01)

(56) References Cited

U.S. PATENT DOCUMENTS

| | | |
|---|---|---|
| 9,769,458 B2 | 9/2017 | Wippermann et al. |
| 10,291,852 B2 | 5/2019 | Wippermann et al. |
| 10,334,172 B2 | 6/2019 | Wippermann et al. |
| 10,362,229 B2 | 7/2019 | Wippermann et al. |
| 10,425,567 B2 | 9/2019 | Wippermann et al. |
| 10,560,617 B2 | 2/2020 | Wippermann et al. |
| 10,630,902 B2 | 4/2020 | Wippermann et al. |
| 10,701,340 B2 | 6/2020 | Wippermann et al. |
| 10,732,377 B2 | 8/2020 | Wippermann et al. |
| 10,873,688 B2 | 12/2020 | Wippermann et al. |
| 11,016,273 B2 | 5/2021 | Wippermann et al. |
| 2012/0300308 A1 | 11/2012 | Yamamura |
| 2017/0264825 A1* | 9/2017 | Wippermann ....... H04N 23/687 |
| 2018/0172945 A1 | 6/2018 | Wippermann et al. |
| 2018/0241920 A1 | 8/2018 | Wippermann et al. |
| 2018/0324334 A1 | 11/2018 | Wippermann et al. |
| 2019/0011809 A1 | 1/2019 | Wippermann et al. |
| 2020/0033588 A1 | 1/2020 | Wippermann et al. |
| 2020/0057310 A1 | 2/2020 | Wippermann et al. |
| 2021/0314471 A1 | 10/2021 | Wippermann et al. |
| 2021/0314548 A1 | 10/2021 | Wippermann et al. |

FOREIGN PATENT DOCUMENTS

| | | |
|---|---|---|
| CN | 108432225 A | 8/2018 |
| CN | 108604044 A | 9/2018 |
| CN | 109375355 A | 2/2019 |
| DE | 102013222780 B3 | 4/2015 |
| DE | 102014213371 B3 | 8/2015 |
| DE | 102015215833 A1 | 2/2017 |
| DE | 102015215837 A1 | 2/2017 |
| DE | 102015215845 A1 | 2/2017 |
| DE | 102015215840 B4 | 3/2017 |
| DE | 102015216140 A1 | 3/2017 |
| DE | 102015215836 B4 | 5/2017 |
| DE | 102015215844 B4 | 5/2017 |
| DE | 102015215841 B4 | 6/2017 |
| DE | 102017206429 A1 | 10/2018 |
| DE | 102017208709 B3 | 10/2018 |
| DE | 102018222861 A1 | 6/2020 |
| DE | 102018222865 A1 | 6/2020 |
| DE | 102015220566 B4 | 3/2021 |
| JP | 5670481 B2 | 12/2014 |
| TW | 201711443 A | 3/2017 |
| TW | 201839455 A | 11/2018 |
| TW | 1642974 B | 12/2018 |
| TW | 201910869 A | 3/2019 |
| WO | 2018189321 A1 | 10/2018 |
| WO | 2018215311 A1 | 11/2018 |
| WO | 2020077780 A1 | 4/2020 |

\* cited by examiner

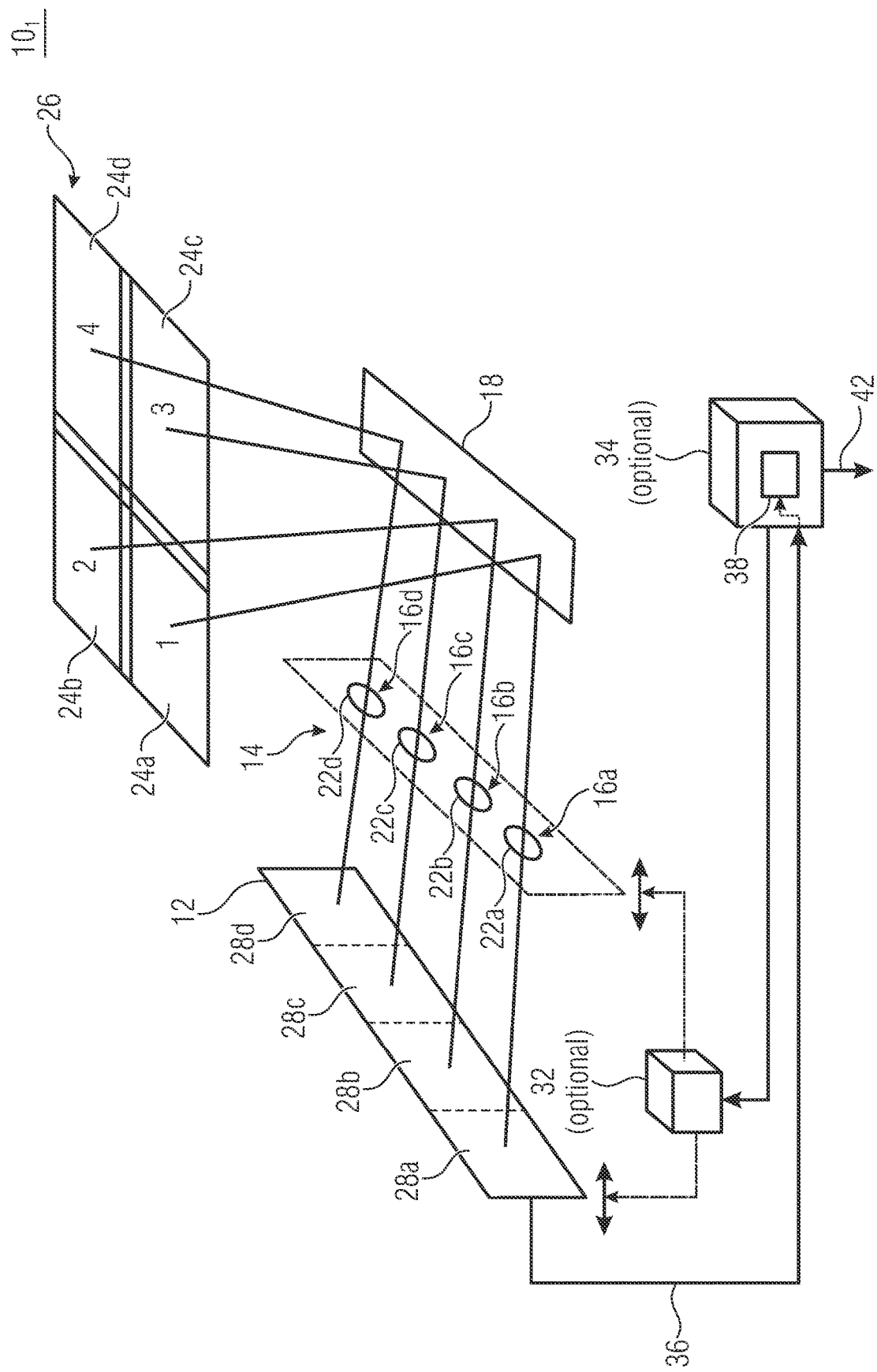

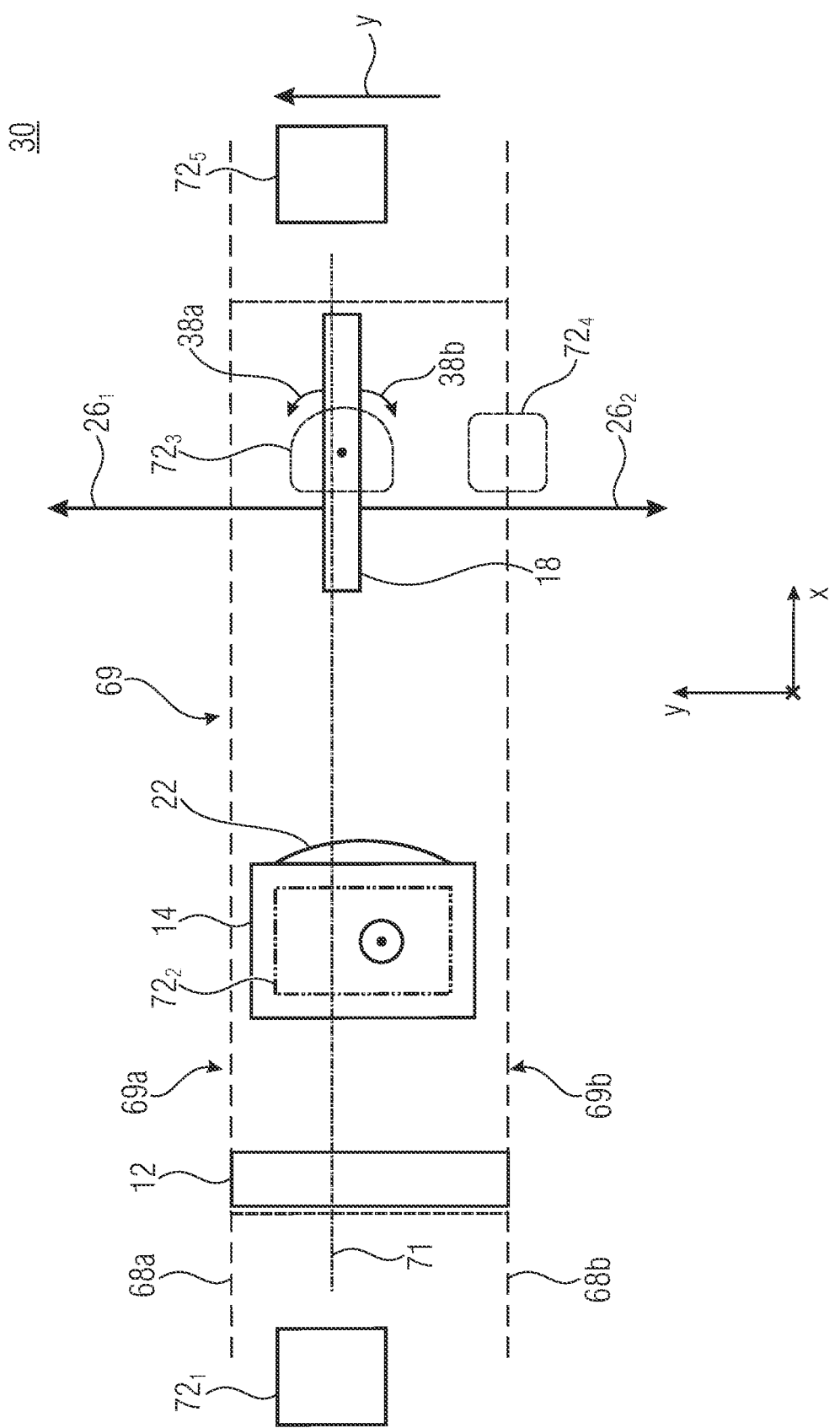

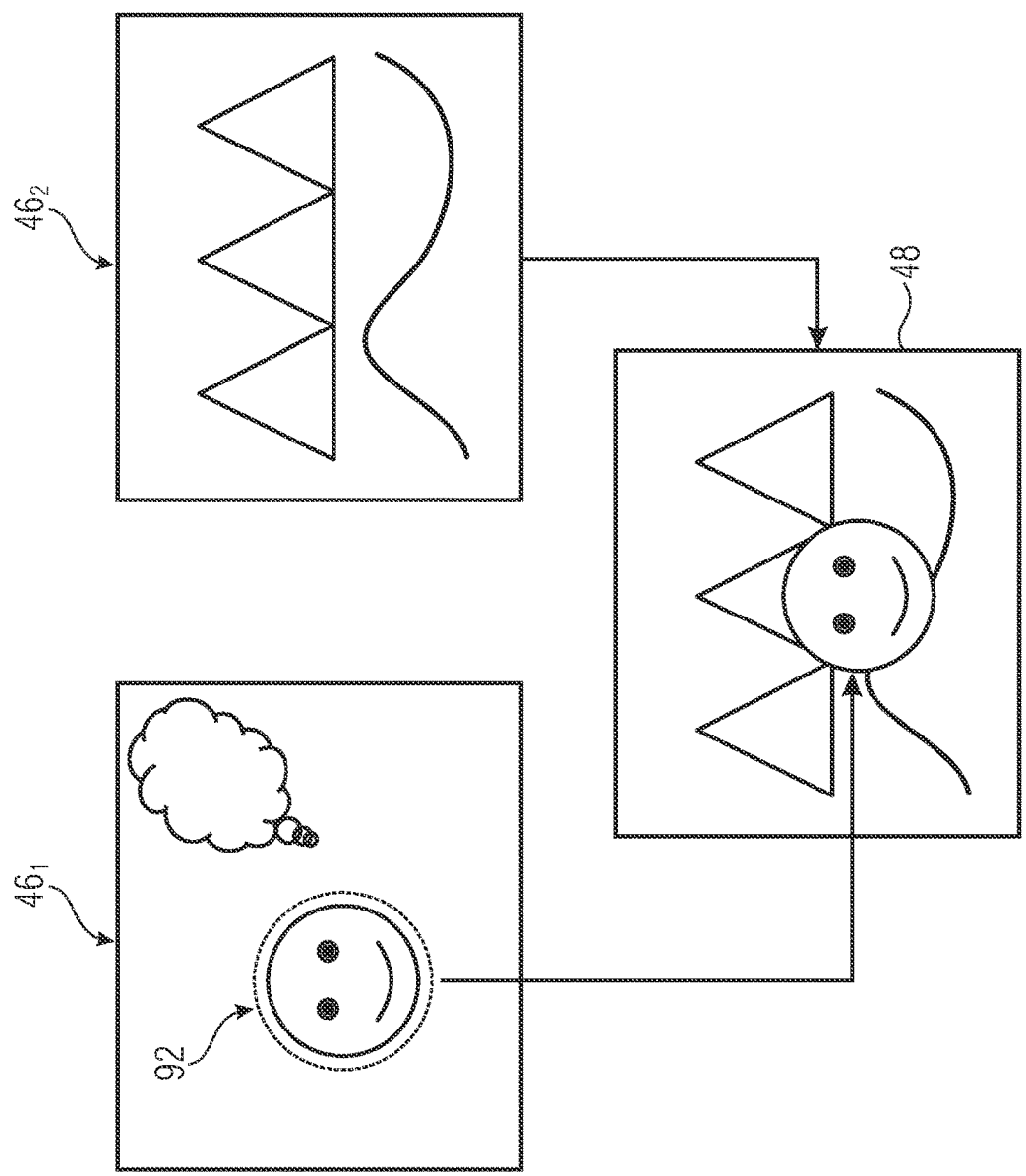

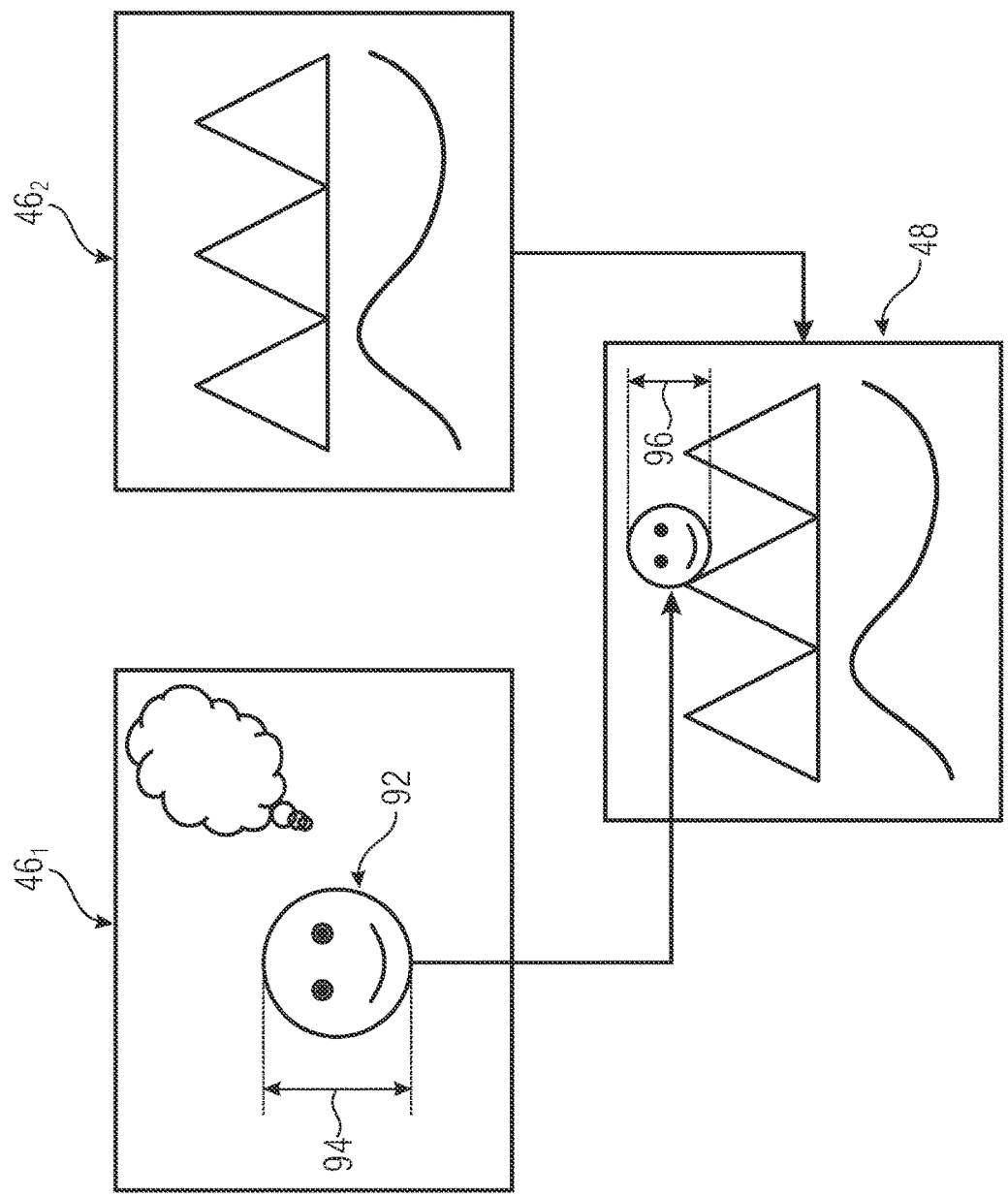

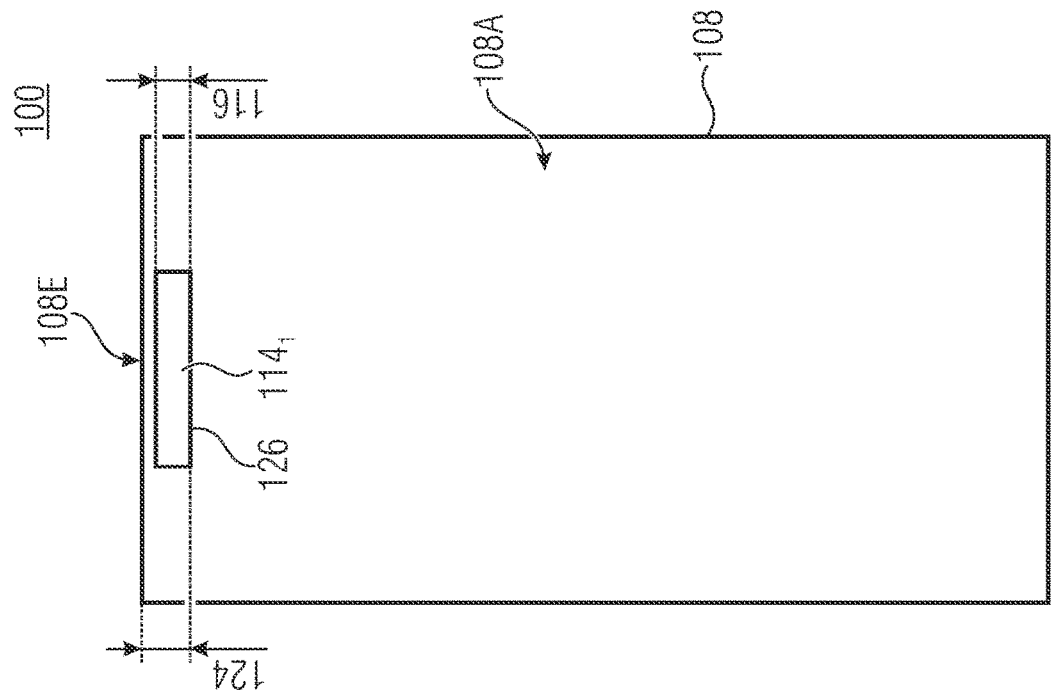
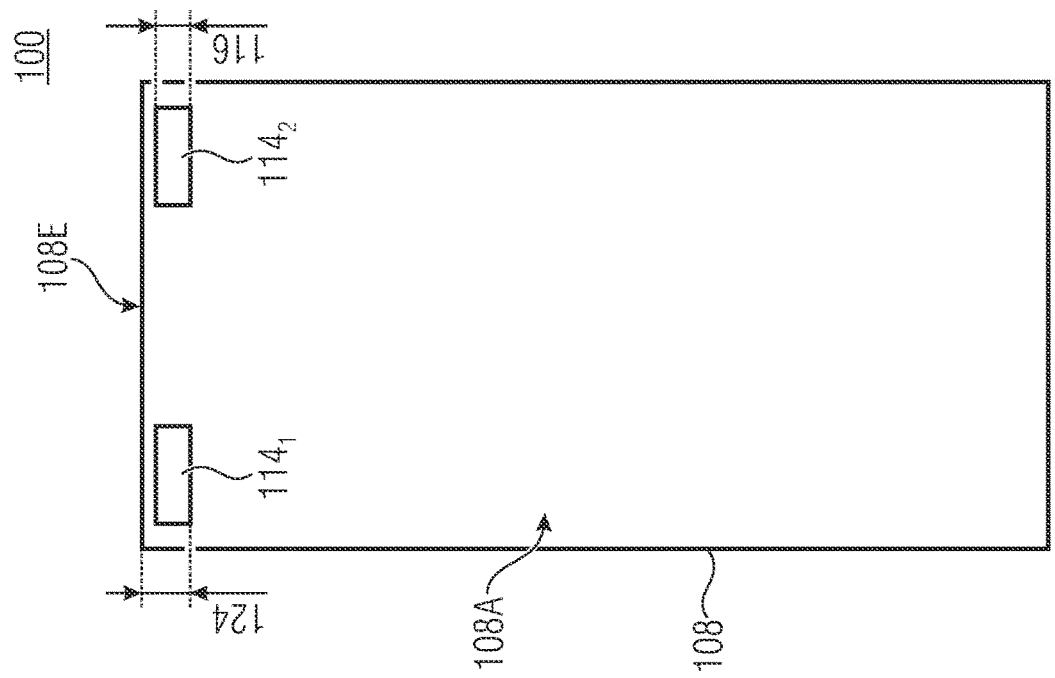

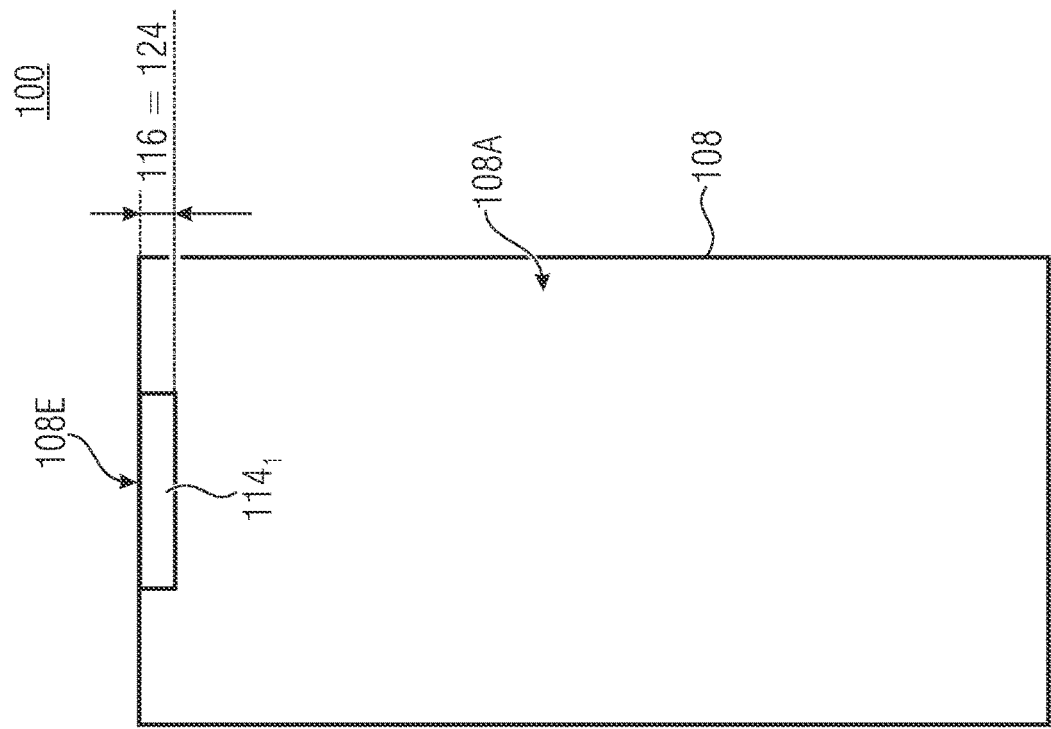
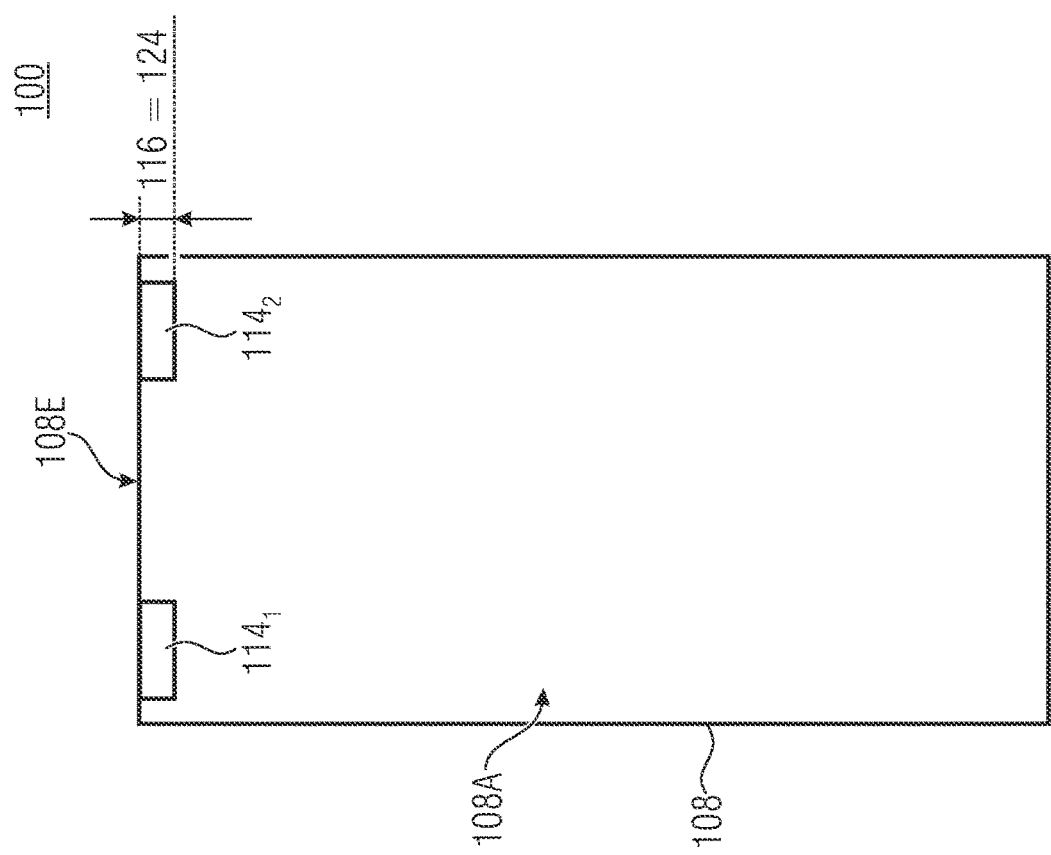

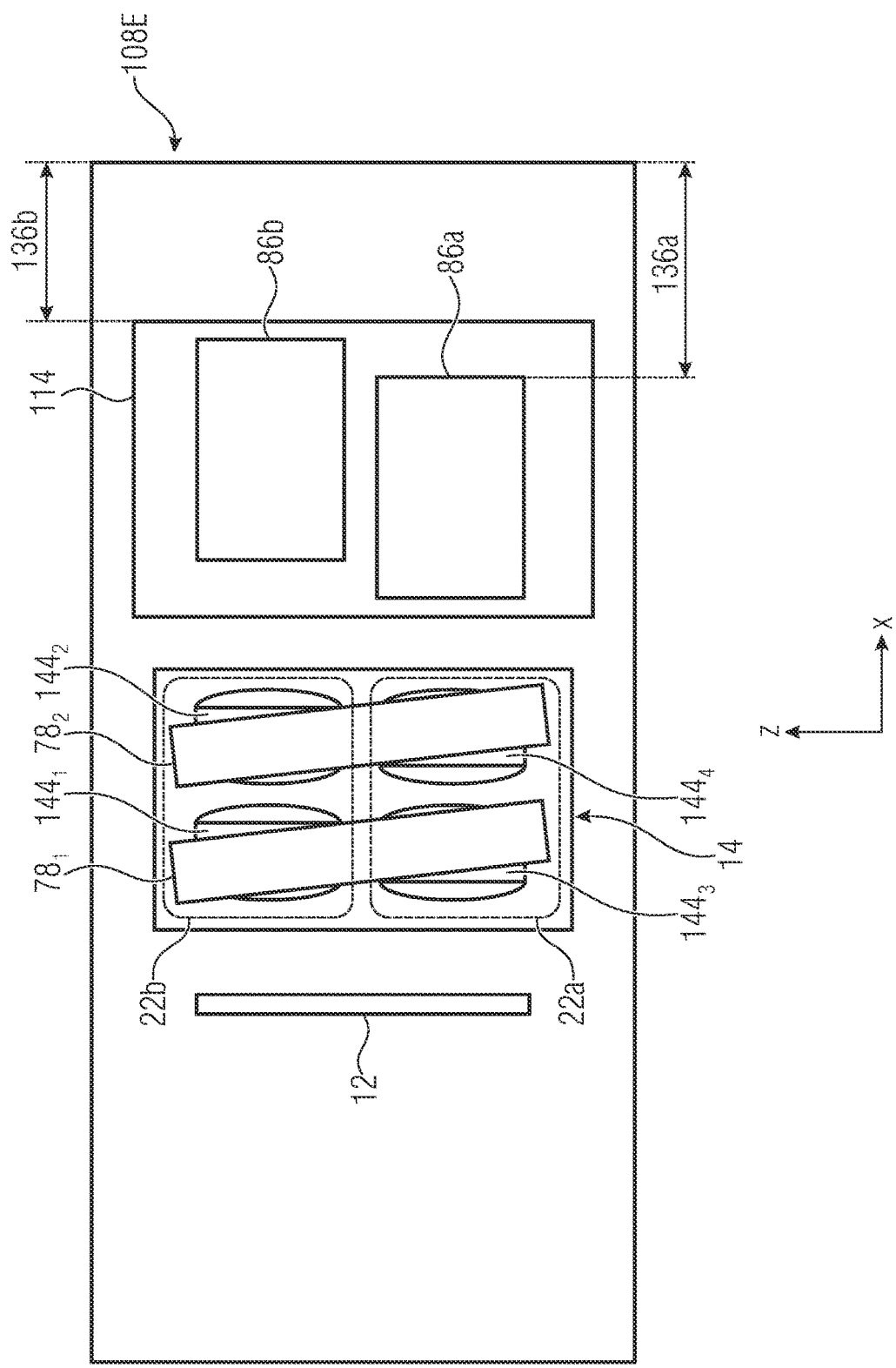

DEVICE COMPRISING A MULTI-APERTURE IMAGING DEVICE FOR GENERATING A DEPTH MAP

CROSS-REFERENCE TO RELATED APPLICATIONS

This application is a continuation of copending International Application No. PCT/EP2020/058222, filed Mar. 24, 2020, which is incorporated herein by reference in its entirety, and additionally claims priority from German Application No. 102019204075.6, filed Mar. 25, 2019, which is also incorporated herein by reference in its entirety.

BACKGROUND OF THE INVENTION

The present invention relates to devices comprising multi-aperture imaging devices inside a housing, in particular to devices comprising small passage areas which are narrow, in particular, or are arranged in a manner efficient in terms of surface area, for optical paths, so-called viewing windows or exit windows.

Multi-aperture cameras operating on the basis of the principle of channel-wise division of the field of view use mirror facets as beam deflection elements. Having passed the respective areas of the mirror facets, the individual optical paths run through an opening in the housing that may be referred to as an exit window.

What would be desirable are devices which exhibit low consumption of area for such windows and/or which do not utilize the consumption of area in a manner that would be disturbance.

Therefore, it is the object of the present invention to provide a device exhibiting low and/or non-disturbing area consumption of the exit windows used for the multi-aperture imaging device.

SUMMARY

According to an embodiment, a device may have: a housing having two oppositely located main sides which are connected to each other via at least one edge side; a multi-aperture imaging device arranged in an interior of the housing and having: an image sensor arrangement; an array of adjacently arranged optical channels, each optical channel including an optic for projecting at least one partial field of view of a total field of view onto an image sensor area of the image sensor arrangement, and a beam deflection means for deflecting an optical path of the optical channels, the beam deflection means having a plurality of facets, each optical channel having a facet associated with it; wherein one of the main sides has a passage area arrangement with at least one passage area, the passage area arrangement being set up to allow the optical paths to pass; wherein the optical channels have, in relation to the passage area arrangement and along an axial direction, along a course of the optical path of the optical channels between the image sensor arrangement and the beam deflection means, a channel-specific relative position of at least one of: the image sensor area; the optic; a reflecting surface of a facet associated with the optical channel as a distance between the reflecting surface of the facet and the optic of the optical channel, differing from another optical channel.

According to another embodiment, a device may have: a housing having two oppositely located main sides which are connected to each other via at least one edge side; a multi-aperture imaging device arranged in an interior of the housing and having: an image sensor arrangement; an array of adjacently arranged optical channels, each optical channel including an optic for projecting at least one partial field of view of a total field of view onto an image sensor area of the image sensor arrangement, a beam deflection means for deflecting an optical path of the optical channels, the beam deflection means having a plurality of facets, each optical channel having a facet associated with it; wherein one of the main sides has a passage area arrangement with at least one passage area, the passage area arrangement being set up to allow the optical paths to pass; wherein a position of the beam deflection means determines a size of the multi-aperture imaging device along an axial direction between the image sensor arrangement and the beam deflection means, and the beam deflection means is arranged adjacently to the edge side; and wherein the passage area arrangement is arranged within an edge area of the main side adjacently to the edge side.

According to still another embodiment, a method of providing a device may have the steps of: providing a housing having two oppositely located main sides which are connected to each other via at least one edge side, so that one of the main sides has a passage area arrangement having at least one passage area, the passage area arrangement being set up for allowing the optical paths to pass; arranging a multi-aperture imaging device in an interior of the housing, said arranged multi-aperture imaging device having: an image sensor arrangement; an array of adjacently arranged optical channels, each optical channel including an optic for projecting at least one partial field of view of a total field of view onto an image sensor area of the image sensor arrangement, a beam deflection means for deflecting an optical path of the optical channels, the beam deflection means having a plurality of facets, each optical channel having a facet associated with it; so that the optical channels has, in relation to the passage area arrangement and along an axial direction, along a course of the optical path of the optical channels between the image sensor arrangement and the beam deflection means, a channel-specific relative position of at least one of: the image sensor area; the optic; a reflecting surface of a facet associated with the optical channel as a distance between the reflecting surface of the facet and the optic of the optical channel, differing from another optical channel.

One finding of the present invention consists in that the inventive setup of a multi-aperture imaging device may be utilized such that channel-specific local arrangement of individual components of optical channels or of the entirety of individual components along an axial direction may be utilized for obtaining different relative positions so as to keep a required passage opening size for allowing optical paths to pass into a housing (which is equivalent to optical paths exiting the housing) to a minimum, so that small window sizes in housings are possible, which is advantageous, in particular, in mobile devices where a portion of at least one housing side covered by a display (display means) is as large as possible or is to be utilized in as area-efficient a manner as possible.

In accordance with an embodiment, a device includes a housing having two oppositely located main sides which are connected to each other via at least one edge side. The device includes a multi-aperture imaging device which is arranged in an interior of the housing and comprises: an image sensor arrangement; an array of adjacently arranged optical channels, each optical channel including an optic for projecting at least one partial field of view of a total field of view onto an image sensor area of the image sensor arrangement, and a beam deflection means for deflecting an optical path of the optical channels, the beam deflection means comprising a plurality of facets, each optical channel having a facet associated with it. One of the main sides comprises a passage area arrangement with at least one passage area, the passage area arrangement being set up to allow the optical paths to pass through. In relation to the passage area arrangement and along an axial direction along a course of the optical path of the optical channels between the image sensor arrangement and the beam deflection means, the optical channels comprise a channel-specific relative position of at least one of: the image sensor area; the optic; and a reflecting surface of a facet associated with the optical channel.

BRIEF DESCRIPTION OF THE DRAWINGS

Embodiments of the present invention will be explained below with reference to the accompanying figures, in which:

FIG. 1a shows a schematic perspective view of a device in accordance with an embodiment;

FIG. 3b shows a schematic sectional side view of the device of FIG. 3a in accordance with an embodiment, wherein the multi-aperture imaging device comprises a plurality of actuators;

FIG. 4b shows a schematic sectional side view of the device of FIG. 4a for illustrating the actuator being arranged between the levels of the cuboid that are described in connection with FIG. 3a;

FIG. 7a shows a schematic diagram for illustrating processing of the image information that may be obtained, in accordance with an embodiment, by imaging the total fields of view;

FIG. 7b shows a schematic representation of a scaling of part of imaging information in the accumulated image information in accordance with an embodiment;

FIG. 11a shows a schematic top view of an implementation of the device of FIG. 10 in accordance with an embodiment, wherein the main side of the housing comprises two passage areas, by way of example;

FIG. 11b shows a schematic top view of an alternative implementation of the device of FIG. 10 in accordance with an embodiment, wherein the passage area arrangement comprises only one single passage area which is arranged, for example, in a centered manner and adjacently to an edge side.

FIGS. 12a-c show implementations of the device of FIG. 10 in accordance with an embodiment which are equivalent or at least similar to FIGS. 11a to 11c, a window dimension of the passage areas may be equal to the distance from the outer edge;

FIG. 17b shows a schematic top view of a configuration wherein the substrate of an array of optical channels is tilted, as compared to the perpendicular arrangement shown in FIG. 17a, in a manner that is perpendicular to the axial direction.

DETAILED DESCRIPTION OF THE INVENTION

Figure 1B:
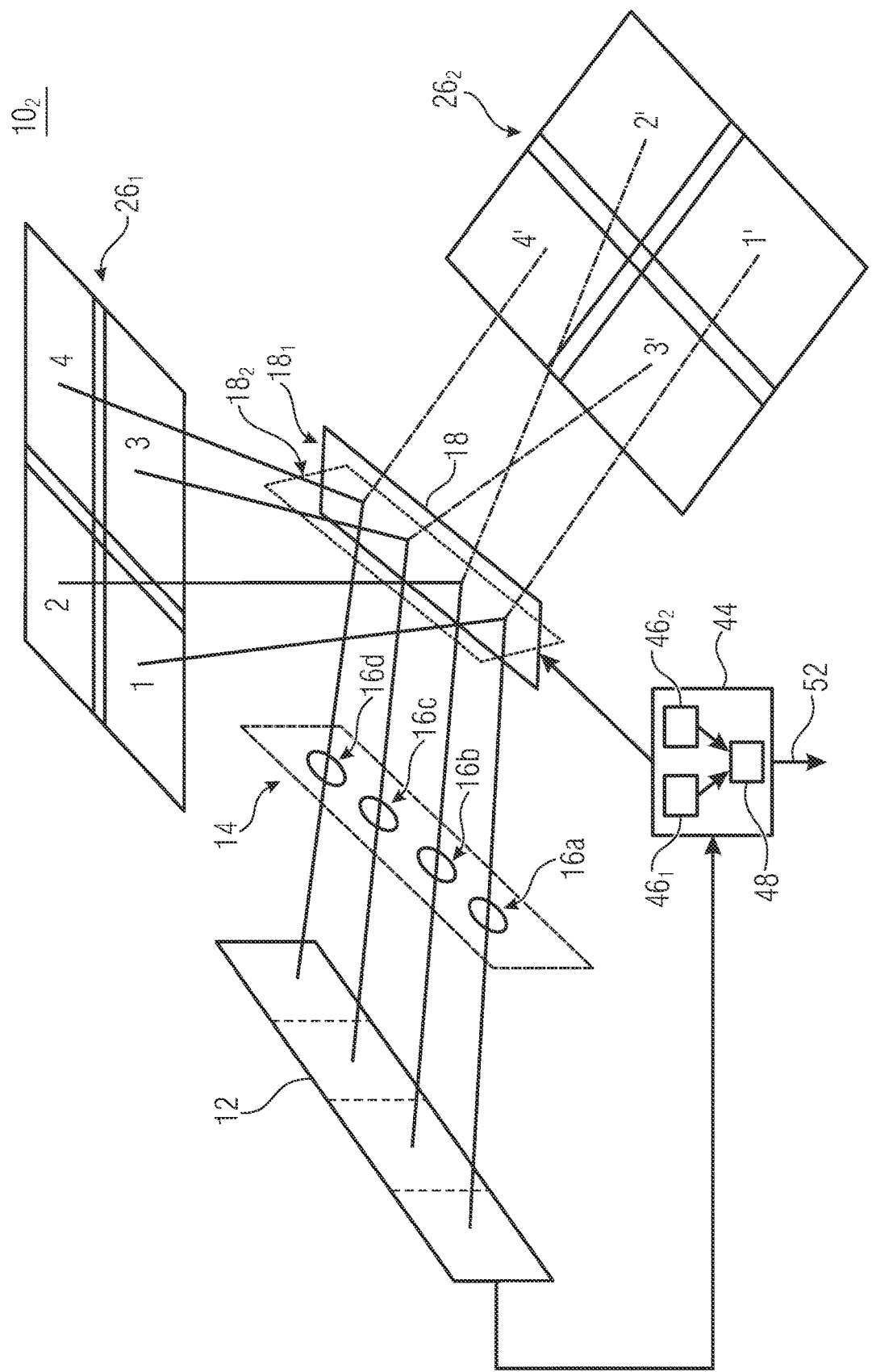
FIG. 1b shows a schematic perspective view of a device in accordance with an embodiment.

Before embodiments of the present invention will be explained in more detail below with reference to the drawings, it shall be noted that elements, objects and/or structures that are identical, identical in function or in action will be provided with identical reference numerals in the different figures, so that the descriptions of said elements which are provided in different embodiments are interchangeable and/or mutually applicable.

Some of the embodiments described herein relate to a channel-specific relative position of components of optical channels of a multi-aperture imaging device comprising an array of optical channels. What is understood by array is an arrangement, which consists of at least, and preferably, one line, of optical channels next to one another along a line direction. A multi-line array may comprise a number of more than one line, each of which may be arranged along the same line direction, and wherein the individual lines may be mutually offset along a column direction. Even if what can be understood as an optical channel is the course of beams of rays as a whole, said course may be at least partly determined by the arrangement of optical elements, e.g., lenses, associated with the respective channel, so that for the array of optical channels, it may be equivalent to arrange the optical elements next to one another.

Different relative positions therefore relate to different implementations within the optical channels and may disregard a lateral shift in the optical channels. The different relative positions may relate to different distances and/or relative inclinations/orientations of the individual components in relation to one another or within the same optical channel; different inclinations/orientations for facets of a faceted beam deflection means remain left out of consideration since their facets may already be inclined in a channel-specific manner. What is taken into account here, in particular, is that area of the course of the optical paths of the optical channels which is located between an image sensor area associated with the optical channel and a beam deflection which is associated with the optical channel and is caused by reflection or mirroring. The direction between the image sensor area and the beam deflection may be understood, in connection with embodiments described herein, as an axial direction which may be equal in quality notwithstanding possible directional divergences between the optical channels.

The divergences explained may be configured such that the optical channels within a shared plane are not parallel so as to obtain a preliminary divergence which may optionally be amplified (or, alternatively, merely caused) by the beam deflection so as to direct the optical paths towards different fields of view. The shared plane may be spanned open, e.g., by a vector along the axial direction and by a vector along the line extension direction, so that the divergences may occur within the shared plane (in-plane). Alternatively or additionally, provision is made, in inventive embodiments, for divergence to the obtained outside this plane (out-of-plane).

The above-mentioned beam deflection of the optical paths of the optical channels may be caused by a beam deflection means which comprises one or more reflecting areas, e.g., one facet per channel or group of channels, which enables implementing different setting angles between individual optical channels or groups.

The above-mentioned fields of view of an optical channel may be a total field of view or a partial field of view. Partial fields of view may possibly comprise a smaller angle of field or angle of view of the object area, i.e., they may cover a comparatively smaller area of the object area than a total field of view. This may be achieved by joining partial images of partial fields of view to form a total image of the total field of view, e.g. by means of stitching. A field of view of an optical channel may also be described as a total field of view. This total field of view may be captured, for example, by means of an optic that is different than an optic which images partial fields of view, and may enable capturing of the total field of view in addition to imaging of the total field of view that is obtained overall by the partial fields of view, but may also describe a total field of view that is different in terms of size and/or position in relation to the multi-aperture imaging device.

Some embodiments relate to devices comprising at least one multi-aperture imaging device and arranged inside a housing and looking to the outside from the inside through one or more passage areas. This is why potential, but non-limiting implementations of multi-aperture imaging devices will be explained at the beginning before their inventive arrangements within a device will be described.

FIG. 1a shows a schematic perspective view of a device $10_1$ in accordance with an embodiment. The device $10_1$ includes a multi-aperture imaging device comprising an image sensor 12 and an array 14 of adjacently arranged optical channels 16a-e. The multi-aperture imaging device further includes a beam deflection means 18 for deflecting an optical path of the optical channels 16a-d. In this manner, the optical paths of the optical channels 16a-d may be deflected, between a lateral course, between the image sensor 12 by optics 22a-d of the array 14 toward the beam deflection means 18 toward a non-lateral course. In total, different optical channels 16a-d are deflected such that each optical channel 16a-d projects a partial field of view 24a-d of a total field of view 26 onto an image sensor area 28a-d of the image sensor 12. The partial fields of view 24a-d may be distributed within the space in a one-dimensional or two-dimensional manner; on the basis of different focal widths of the optics 22a-d, they may be also distributed in a three-dimensional manner. To further understanding, the total field of view 26 will be described below such that the partial fields of view 24a-d exhibit two-dimensional distribution, it being possible for mutually adjacent partial fields of view 24a-d to overlap one another. A total area of the partial fields of view results in the total field of view 26.

The multi-aperture imaging device includes optional focusing means 32 for setting a focal position of the multi-aperture imaging device. This may be effected by changing a relative location or position between the image sensor 12 and the array 14; the focusing means 32 may be configured to change a position of the image sensor 12 and/or a position of the array 14 so as to obtain a variable relative position between the image sensor 12 and the array 14 so as to set the focal position of the multi-aperture imaging device.

Setting of the relative position may be effected in a channel-specific manner, for groups of optical channels or in a manner that is global to all the channels. For example, a single optic 22a-d, a group of the optics 22a-d or all of the optics 22a-d may be moved together. The same applies to the image sensor 12.

The device may include optical control means 34 configured to control the focusing means 32. In addition, the control means 34 is configured to receive image information 36 from the image sensor 12. Said image information 36 may be, e.g., the partial fields of view 24a-d projected onto the image sensor areas 28a-d, and/or information or data which correspond to said images. This does not rule out intermediate processing of the image information 36, for example with regard to filtering, smoothing or the like.

The control means 34 may be configured to control the multi-aperture imaging device to take a sequence of focal positions so as to capture a corresponding sequence of image information of the total field of view 26. The control means 34 is configured to create a depth map 38 for the total field of view 26 from the sequence of image information. The depth map 38 may be provided via a corresponding signal. The control means 34 may capture, on the basis of the different focal positions obtained due to different relative positions between the image sensor 12 and the array 14, different images of the same field of view 26 and/or differently focused partial images thereof in correspondence with the segmenting by the partial fields of view 24a-d.

Depth maps may be employed for different purposes, for example for image processing, but also for joining (stitching) of images. For example, the control means 34 may be configured to join individual images (frames), which are obtained of the image sensor areas 28a to 28d, while using the depth map 38 so as to obtain image information 42 which renders the image of the total field of view 26, i.e., a total image. For such methods of joining partial images, which is also referred to as stitching, utilization of a depth map is particularly advantageous.

While using the depth map, the control means 34 may be configured to stitch the partial images of a group of partial images to form a total image. This means that the depth map used for stitching may be generated from the partial images to be stitched themselves. For example, a sequence of total images rendering the total field of view may be generated on the basis of the sequence of image information. Each total image may be based on a combination of partial images of identical focal positions. Alternatively or additionally, at least two, several or all of the total images of the sequence may be combined so as to obtain a total image comprising expanded information, e.g., for creating Bokeh effect. Alternatively or additionally, the image may also be represented such that the entire image is artificially sharp-edged, i.e., a larger number of partial areas is put into focus than is the case in the individual images, e.g., the entire image.

In accordance with an embodiment, the device $10_1$ is configured to create the image of the total field of view as a mono image and to create the depth map 38 from the sequence of mono images. Even though multiple scanning of the total field of view 26 is also possible, the device 10 may create the depth map from one mono image alone, which may save additional pictures being taken from different viewing directions, e.g. while using multiple capturing with the same device or by means of a redundant arrangement of additional optical channels.

The multi-aperture imaging device $10_1$ may also be configured without the focusing means 32 and/or the control means 34, as a result of which the multi-aperture imaging device $10_1$ may be configured, e.g., as the multi-aperture imaging device of FIG. 1. Instead of the control means 34, different means may be provided to obtain the image information from the image sensor 12, or the control means 34 may be employed as having said function, but controlling of the focusing means may be dispensed with.

The depicted implementation of the multi-aperture imaging device is to be understood as being exemplary. In embodiments described herein, advantageous configurations of inventive multi-aperture imaging devices are explained. Several drawings, e.g., FIG. 1a, are depicted such that an image sensor having several image sensor areas, an array of optical channels having one shared substrate, and/or a beam deflection means are configured as a shared component, which, however, does not conflict with an inventive channel-specific implementation of the relative positions that will be explained later since the drawings are purely schematic in this respect. All of the embodiments described herein, without any restriction, relate to configuring the image sensor, the array of optical channels and/or the beam deflection means in the form of several individual paths that are positioned differently in relation to one another and/or along an axial direction of the optical paths, and/or to implement, instead of a depicted planar, or flat, implementation, a topography-related configuration of said components that is perpendicular to the axial direction e.g., tilted and/or stepped image sensors having different relative positions of the image sensor areas, tilted and/or stepped arrays comprising different relative positions of the optics, and/or tilted or stepped beam deflection means having different relative positions of the beam deflection areas, or facets.

FIG. 1b shows a schematic perspective view of a device $10_2$ in accordance with an embodiment. As compared to the device $10_1$, the device $10_2$ comprises, instead of the control means 34, a control means 44 configured to control the beam deflection means to take different positons $18_1$ and $18_2$. In the different positions $18_1$ and $18_2$, the beam deflection means 18 comprises mutually different relative positions, so that in the different positions, imaging information of different total fields of view $26_1$ and $26_2$ are obtained since the optical paths of the optical channels 16a-d are directed to take different directions which are influenced by the different positions $18_1$ and $18_2$. Alternatively or additionally to the control means 34, the device $10_2$ comprises control means 44 configured to control the beam deflection means to take the first position $18_1$ so as to obtain imaging information of the first total field of view $26_1$ from the image sensor 12. Before or after this, the control means 44 is configured to control the beam deflection means 18 to take the second position $18_2$ so as to obtain imaging information of the second total field of view $26_2$ from the image sensor 12. The control means 44 is configured to insert part of the first imaging information $46_1$ into the second imaging information $46_2$ so as to obtain shared or accumulated image information 48. The accumulated image information 48 may in parts render the first total field of view $26_1$ and, in parts, the second total field of view $26_2$, which also involves image-manipulating or image-processing steps. This means that the accumulated image information 48 is based, in places, on imaging of the total field of view $26_1$, and in other places, on the imaging of the total field of view $26_2$.

The control means 44 may be configured to provide a signal 52 which contains and reproduces the accumulated image information 48. Optionally, the image information $46_1$ and/or $46_2$ may also be output by the signal 52.

Figure 1C:
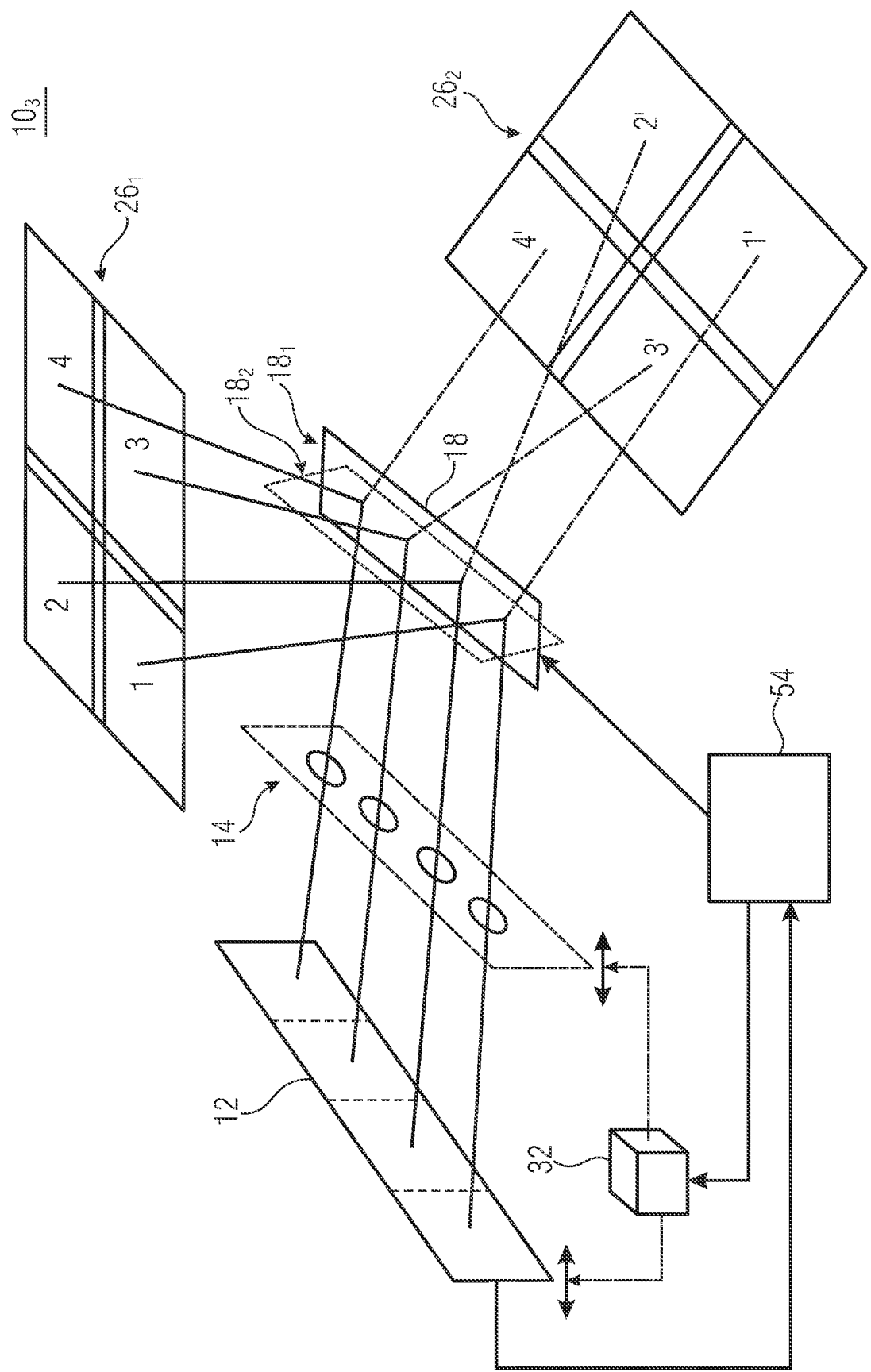
FIG. 1c shows a schematic perspective view of a device in accordance with an embodiment which combines features of FIG. 1a and FIG. 1b.

FIG. 1c shows a schematic view of a device $10_3$ in accordance with an embodiment, which instead of the control means 34 of FIG. 1a and instead of the control means 44 of FIG. 1b comprises a control means 54 which combines the functionalities of the control means 34 and of the control means 44 and is configured, on the basis of a variable focal position of the device $10_3$, to create the depth map 38 and to provide the accumulated image information 48 of FIG. 1b.

Figure 2A:
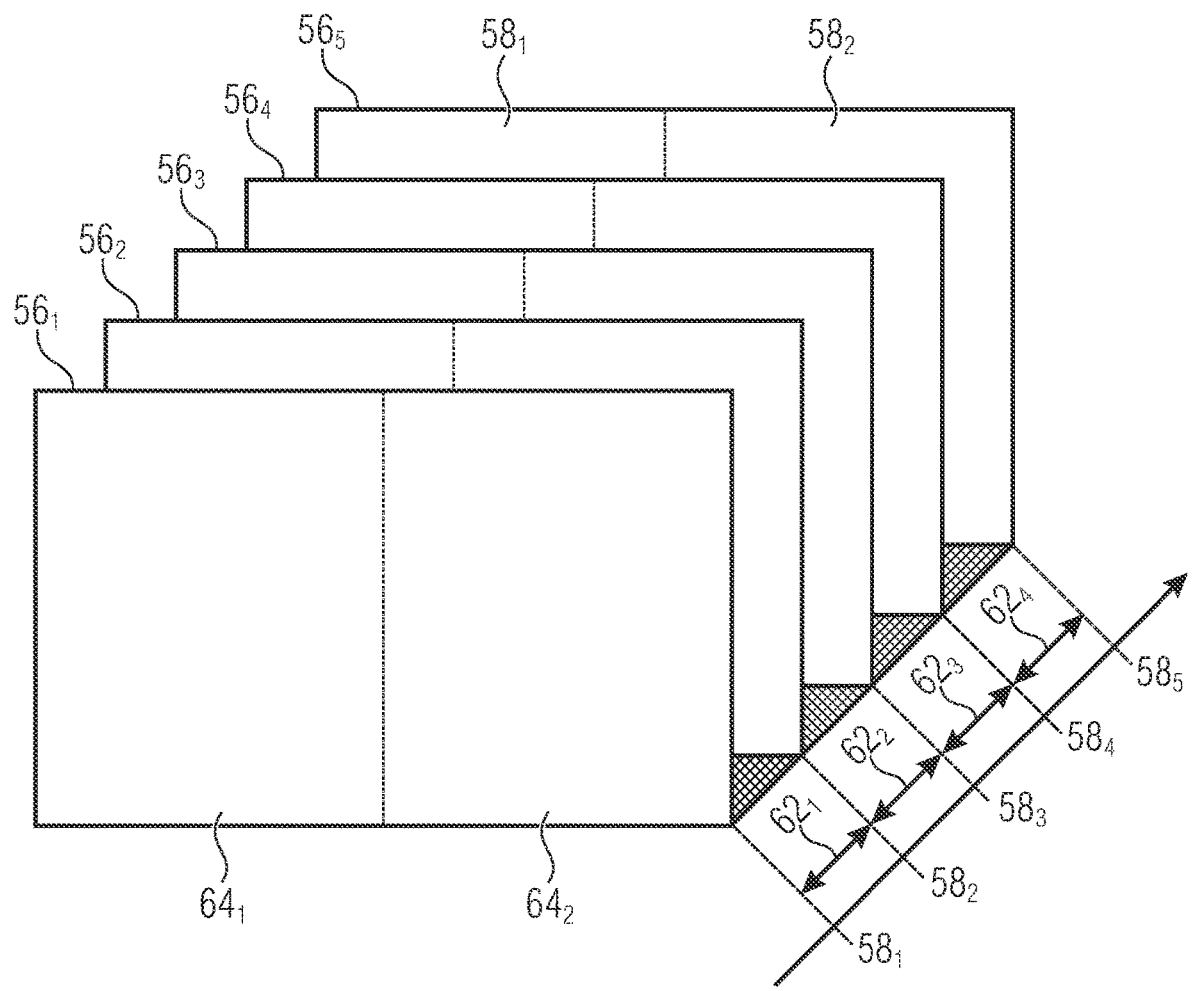
FIG. 2a shows a schematic view of different focal positions, in accordance with an embodiment, which a device in accordance with an embodiment may be controlled to take.

FIG. 2a shows a schematic view of different focal positions $56_1$ to $56_5$, which a device may be controlled to take in accordance with embodiments described herein, e.g., the device $10_1$ and the device $10_2$. The different focal positions $56_1$ to $56_5$ may be understood as being positions or distances $58_1$ to $58_5$ wherein objects within the captured total field of view are projected onto the image sensor 12 in a focused manner. In this context, a number of focal positions 56 may be arbitrary and exhibit a number larger than 1.

Distances $62_1$ to $62_4$ between adjacent focal positions may relate to distances within the image space; implementation or transferal of the explanation to distances within the object space are also possible. However, what is advantageous about considering the image space is that the properties of the imaging multi-aperture imaging device are taken into account, in particular with regard to a minimum and/or maximum object distance. The control means 34 and/or 54 may be configured to control the multi-aperture imaging device such that same comprises two or a higher number of focal positions 56$_1$ to 56$_5$. In the respective focal positions, individual images 64$_1$ and 64$_2$ may be captured in accordance with the number of captured partial fields of view 24. On the basis of the knowledge of which of the focal positions 56$_1$ to 56$_5$ was set to obtain the respective partial image 46$_1$ and 46$_2$, the control means may determine, by analyzing the image information in terms of which of the image parts are imaged in focus, the distance in which these objects imaged in a sharp-edged manner are arranged with regard to the device. Said information regarding the distance may be used for the depth map 38. This means that the control means may be configured to sense, in the sequence of focal positions 56$_1$ to 56$_5$, a corresponding number of groups of partial images, each partial image being associated with an imaged partial field of view. The group of partial images may thus correspond to those partial images which image the total field of view in the focal position that has been set.

The control means may be configured to create the depth map from a comparison of local image sharpness information in the partial images. The local sharpness information may designate the areas of the image in which objects are imaged in focus or are imaged in focus within a predefined tolerance range. For example, by determining the edge blurring function and by detecting the distances across which the edges extend one may determine whether a corresponding image area, a corresponding object or a part thereof is imaged in focus or is imaged on the image sensor in a blurred manner. In addition, the point image or line blurring function may be used as a criterion of quality of the sharpness of an image content. Alternatively or additionally, any known optical sharpness metric such as the known modulation transfer function (MTF), for example, may be used. Alternatively or additionally, the sharpness of the same objects may be used in adjacent images of the stack, association of the focus actuator position with the object distance via a calibrated look-up table and/or the direction of the through-focus scan may be used so as to obtain the depth information in a partially recursive manner from adjacent images of the stack and to avoid ambiguities. Thus, when one knows the set focal position, which unambiguously correlates with the sharply imaged object distance, one may therefore deduce, from the knowledge that the object is sharply imaged at least within the previously defined tolerance range, a distance of the area of the image, of the object or of the part thereof, which may be a basis for the depth map 38.

While using the depth map, the control means may be configured to stitch the partial images of a group of partial images to form a total image. This means that the depth map used for stitching may be generated from the partial images to be stitched themselves.

The device may be configured to control the focusing means 32 such that the sequence of focal positions 56$_1$ to 56$_5$ within a tolerance range of ±25%, ±15% or ±5%, preferably as close to 0% as possible, is equidistantly distributed, within the image space, between a minimum focal position and a maximum focal position. In order to save time for setting a focal position it is useful, but not mandatory, to sequentially control the focal positions 56$_1$ to 56$_5$ one after the other, at an increasing or decreasing distance. Rather, an order of the set focal positons 56$_1$ to 56$_5$ is arbitrary.

Figure 2B:
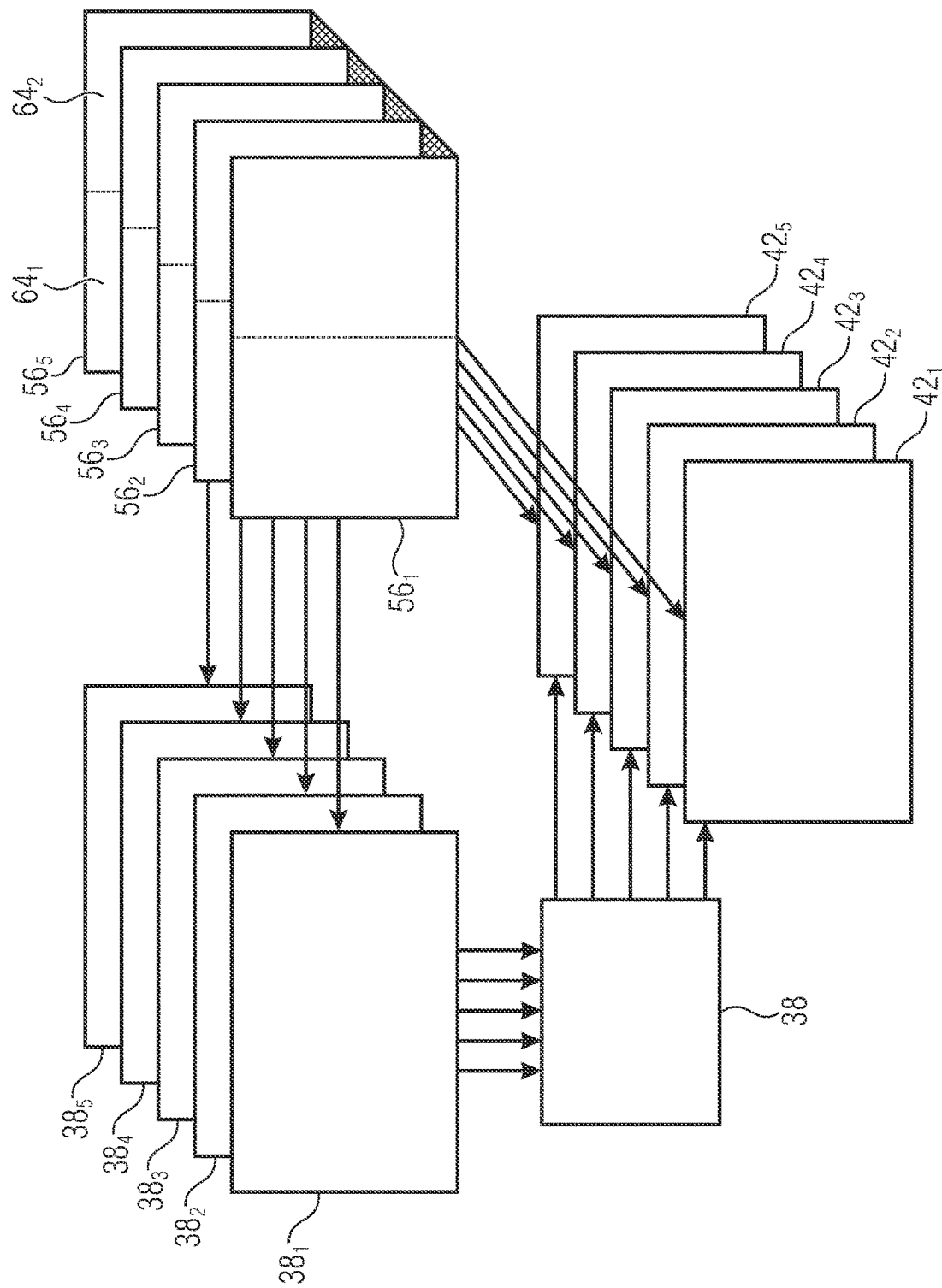
FIG. 2b shows a schematic representation of the utilization of a depth map created from different focal positions in accordance with an embodiment, as well as its generation.

FIG. 2b shows a schematic representation of the utilization of the depth map 38 and its generation. The partial images 64$_1$ and 64$_2$ may each be used for obtaining partial information 38$_1$ to 38$_5$ of the depth map 38 from the respective focal position 56$_1$ to 56$_5$ since in each case, the objects which are sharply depicted in the individual images 64$_1$ and 64$_2$ may be accurately determined with regard to their distance. In between the focal positions 56$_1$ and 56$_5$, interpolation methods may also be used, so that even with slightly blurred objects, one may still obtain sufficiently precise information for the depth map 38. The distance information contained in the partial information 38$_1$ to 38$_5$ may be combined by the control means to form the depth map 38. The depth map 38 may be used for combining the frames 64$_1$ and 64$_2$ from the different focal positions 56$_1$ to 56$_5$ to form a corresponding number of total images 42$_1$ to 42$_5$.

Figure 3A:
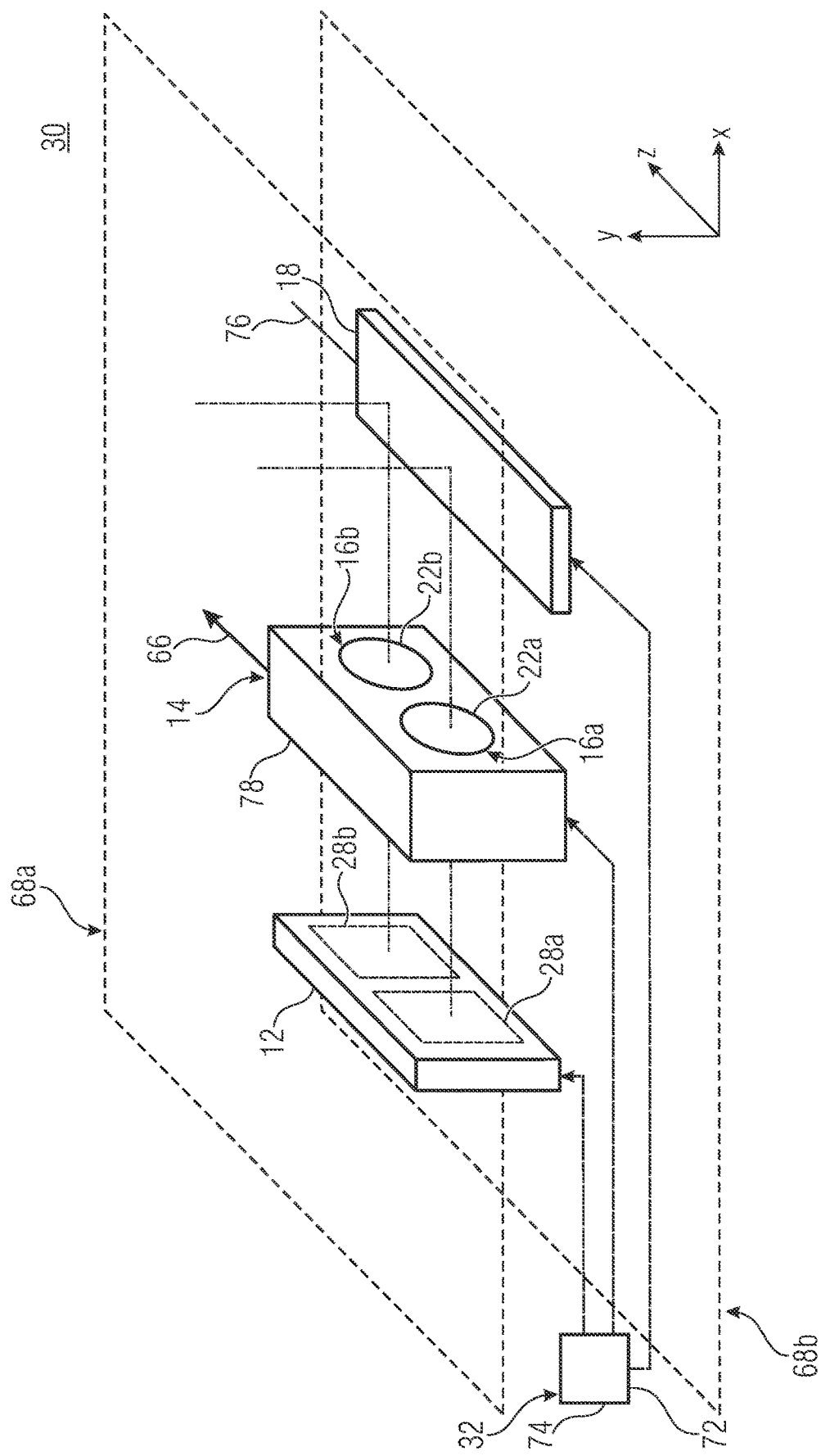
FIG. 3a shows a schematic perspective view of a device in accordance with an embodiment, wherein an image sensor spans an array of optical channels, and a beam deflection means spans a cuboid in space.

FIG. 3a shows a schematic perspective view of a device 30 in accordance with an embodiment. The image sensor 12, the array 14 and the beam deflection means 18 may span a cuboid within the space. The cuboid may also be understood to be a virtual cuboid and may comprise, e.g., a minimum volume, and in particular a minimum perpendicular extension along a direction parallel to a thickness direction y, which is parallel to a line extension direction 66. The line extension direction 66 extends along a z direction, for example, and perpendicularly to an x direction which is arranged in parallel with a course of the optical paths between the image sensor 12 and the array 14. The directions x, y and z may span a Cartesian coordinate system. The minimum volume of the virtual cuboid and/or its minimum perpendicular extension may be such that the virtual cuboid nevertheless includes the image sensor 12, the array 14 and the beam deflection means 18. The minimum volume may also be understood to mean that it describes a cuboid which is spanned by arranging and/or operatively moving the image sensor 12, the array 14 and/or the beam deflection means 18. The line extension direction 66 may be configured such that along the line extension direction 66, the optical channels 16a and 16b are arranged next to each other, possibly in parallel with each other. The line extension direction 66 may be arranged to be stationary within the space.

The virtual cuboid may comprise two sides which are mutually opposite and in parallel, in parallel with the line extension direction 66 of the array 14 and in parallel with a part of the optical path of the optical channels 16a and 16b between the image sensor 12 and the beam deflection means 18. In simplified terms, however without any limiting effect, said sides may be an upper side and a lower side of the virtual cuboid, for example. The two sides may span a first plane 68a and a second plane 68b. This means that the two sides of the cuboid may each be part of the plane 68a and/or 68b. Further components of the multi-aperture imaging device may be arranged to be located completely, but at least partly, within the area located between the planes 68a and 68b, so that an installation space requirement of the multi-aperture imaging device along the y direction, which is parallel to a surface normal of the planes 68a and/or 68b, may be small, which is advantageous. A volume of the multi-aperture imaging device may comprise a small or minimum installation space between the planes 68a and 68b. Along the lateral sides or extension directions of the planes 68a and/or 68b, an installation space of the multi-aperture imaging device may be large or of any size. The volume of the virtual cuboid is influenced, for example, by an arrangement of the image sensor 12, of the array 14 and of the beam deflection means 18; arrangement of said components in accordance with the embodiments described herein may be effected such that the installation space of said components along the direction perpendicular to the planes and, therefore, the mutual distance of the planes 68a and 68b becomes small or minimum. As compared to other arrangements of the components, the volume and/or the distance of other sides of the virtual cuboid may be increased.

The device 30 includes an actuator 72 for generating a relative movement between the image sensor 12, the single-line array 14 and the beam deflection means 18. This may include, e.g., actuation of the beam deflection means 18 for switching between the positions described in connection with FIG. 1b. Alternatively or additionally, the actuator 72 may be configured to perform the relative movement, explained in connection with FIG. 1a, for changing the relative position between the image sensor 12 and the array 14. The actuator 72 is at least partly arranged between the planes 68a and 68b. The actuator 72 may be configured to move at least one of the image sensor 12, the single-line array 14 and the beam deflection means 18, which may include rotational and/or translational movements along one or more directions. Examples thereof are a channel-specific change in a relative position between image sensor areas 28 of a respective optical channel 16, of the optic 22 of the respective optical channel 16 and of the beam deflection means 18 and/or of the corresponding segment or facet and/or for a channel-specific change in an optical property of the segment/facet which concerns the deflection of the optical path of the respective optical channel. Alternatively or additionally, the actuator 72 may at least partly implement auto-focus and/or optical image stabilization.

The actuator 72 may be part of the focusing means 32 and may be configured to provide a relative movement between at least one optic of at least one of the optical channels 16a and 16b and the image sensor 12. The relative movement between the optic 22a and/or 22b and the image sensor 12 may be controlled by the focusing means 32 such that the beam deflection means 18 performs a simultaneous movement. When a distance between the optic 22a and/or 22b and the image sensor is reduced, the distance between the beam deflection means 18 and the image sensor 12 may be reduced accordingly, so that a relative distance between the array 14 and/or the optic 22a and/or 22b and the beam deflection means 18 essentially remains the same. This enables the beam deflection means 18 to be implemented with small beam deflection faces since a cone of rays which grows because of a growing distance between the array 14 and the beam deflection means 18 may be compensated for by maintaining the distance from the beam deflection means 18.

The focusing means 32 and/or the actuator 72 are arranged to project by a maximum of 50% from the area located between the planes 68a and 68b. The actuator 72 may comprise a dimension or extension 74 that is parallel to the thickness direction y. A proportion of a maximum of 50%, a maximum of 30% or a maximum of 10% of the dimension 74 may project beyond the plane 68a and/or 68b, starting from an area located between the planes 68a and 68b, and may thus project out of the virtual cuboid. This means that the projection of the actuator 72 beyond the plane 68a and/or 68b is marginal at the most. In accordance with embodiments, the actuator 72 does not project beyond the planes 68a and 68b. What is advantageous about this is that an extension of the multi-aperture imaging device along the thickness direction y is not increased by the actuator 72.

Even though the beam deflection means 18 is depicted to be rotationally mounted about an axis of rotation 76, the actuator 72 may alternatively or additionally also generate a translational movement along one or more spatial directions. The actuator 72 may include one or more single actuators, possibly so as to generate different individual movements in an individually controllable manner. The actuator 72 or at least a single actuator thereof may be implemented as or may include, e.g., a piezo actuator, in particular a piezoelectric bending actuator, which is described in more detail in connection with FIG. 4. A piezo bender enables a fast and reproducible change in position. This property advantageously enables capturing of focus stacks in the sense of several or many images within a short time. Piezo benders as actuators configured to be long along a dimension or direction may be advantageously employed, in particular, in the architecture described since they comprise a form factor that is advantageous for this purpose, i.e., an extension particularly in one direction.

The array 14 may include a substrate 78 which has the optics 22a and 22b attached or arranged thereat. The substrate 78 may be at least partly transparent by means of recesses or by means of a suitable choice of materials for the optical paths of the optical channels 16a and 16b, which does not rule out that manipulations may be performed in the optical channels, e.g. by arranging filter structures or the like.

Several requirements placed upon the actuator 72, including fast adjustability for rapidly setting the different focal positions 56, a large force with a small requirement in terms of installation space, and the like may be met by using piezoelectric actuators.

FIG. 3b shows a schematic sectional side view of the device 30 in accordance with an embodiment. The multi-aperture imaging device of the device 30 may comprise, e.g., a plurality of actuators, e.g., more than one, more than two or a different number >0. For example, actuators $72_1$ to $72_5$ may be arranged which may be employed for different purposes, e.g., to adapt the focal position and/or to change the location or position of the beam deflection means 18 for setting the viewing direction of the multi-aperture imaging device and/or for providing optical image stabilization by means of rotational movement of the beam deflection means 18 and/or translational movement of the array 14.

The actuators $72_1$ to $72_5$ may be arranged to be arranged at least partly between the two planes 68a and 68b which are spanned by sides 69a and 69b of the virtual cuboid 69. The sides 69a and 69b of the cuboid 69 may be aligned in parallel with each other and in parallel with the line extension direction of the array and of part of the optical path of the optical channels between the image sensor 12 and the beam deflection means 18. The volume of the cuboid 69 is at a minimum and nevertheless includes the image sensor 12, the array 14 and the beam deflection means 18 as well as their operational movements. Optical channels of the array 14 comprise an optic 22 which may be configured to be identical for each channel or may be different.

A volume of the multi-aperture imaging device may comprise a small or minimal installation space between the planes 68a and 68b. Along the lateral sides or extension directions of the planes 68a and/or 68b, an installation space of the multi-aperture imaging device may be large or of any size. The volume of the virtual cuboid is influenced, for example, by an arrangement of the image sensor 12, of the single-line array 14 and of the beam deflection means; arrangement of these components in accordance with the embodiments described herein may be such that the installation space of said components along the direction perpendicular to the planes and, therefore, the distance of the planes 68a and 68b to each other becomes small or minimal. As compared to other arrangements of the components, the volume and/or the distance of other sides of the virtual cuboid may be increased.

The virtual cuboid 69 is depicted by dotted lines. The planes 68a and 68b may include or be spanned by two sides of the virtual cuboid 69. A thickness direction y of the multi-aperture imaging device may be arranged to be normal to the planes 68a and/or 68b and/or to be parallel to the y direction.

The image sensor 12, the array 14 and the beam deflection means 18 may be arranged such that a perpendicular distance between the planes 68a and 68b along the thickness direction y, which distance may be referred to, in simplified terms, however without limitation, as the height of the cuboid, is minimal; a minimization of the volume, i.e., of the other dimensions of the cuboid, may be dispensed with. An extension of the cuboid 69 along the direction y may be minimal and may essentially be determined by the expansion of the optical components of the imaging channels, i.e., of the array 14, of the image sensor 12 and of the beam deflection means 18 along the direction y.

A volume of the multi-aperture imaging device may comprise a small or minimal installation space between the planes 68a and 68b. Along the lateral sides or extension directions of the planes 68a and/or 68b, an installation space of the multi-aperture imaging device may be large or of any size. The volume of the virtual cuboid is influenced, for example, by an arrangement of the image sensor 12, of the single-line array 14 and of the beam deflection means; arrangement of these components in accordance with the embodiments described herein may be such that the installation space of said components along the direction perpendicular to the planes and, therefore, the distance of the planes 68a and 68b to each other becomes small or minimal. As compared to other arrangements of the components, the volume and/or the distance of other sides of the virtual cuboid may be increased.

The actuators $72_1$ to $72_5$ may each comprise a dimension or extension that is parallel to the thickness direction y. A proportion of a maximum of 50%, a maximum of 30% or a maximum of 10% of the dimension of the respective actuator $72_1$ to $72_5$ may project beyond the plane 68a and/or 68b, starting from an area located between the planes 68a and 68b or may project out of the area. This means that projection of the actuators $72_1$ to $72_5$ beyond the plane 68a and/or 68b is marginal at the most. In accordance with embodiments, the actuators do not project beyond the planes 68a and 68b. What is advantageous about this is that an extension of the multi-aperture imaging device along the thickness direction, or direction y, is not increased by the actuators.

Even though terms such as top, bottom, left, right, front, or back are used here to improve clarity, these terms are not to have any limiting effect. It shall be understood that said terms are interchangeable on the basis of a rotation or tilting within the space. For example, the x direction from the image sensor 12 toward the beam deflection means 18 may be understood to mean at the front or forward. A positive y direction may be understood to be at the top, for example. An area along the positive or negative z direction apart from or adjacent to the image sensor 12, the array 14 and/or the beam deflection means 18 may be understood as being located next to the respective component. In simplified terms, an image stabilizer may include at least one of the actuators $72_1$ to $72_5$. The at least one actuator may be arranged within a plane 71 or between the planes 68a and 68b.

In other words, the actuators $72_1$ to $72_5$ may be arranged in front of, behind or next to the image sensor 12, the array 14 and/or the beam deflection means 18. In accordance with embodiments, the actuators 36 and 42 having a maximum circumference of 50%, 30% or 10% are arranged outside the area located between the planes 68a and 6b.

Figure 3C:
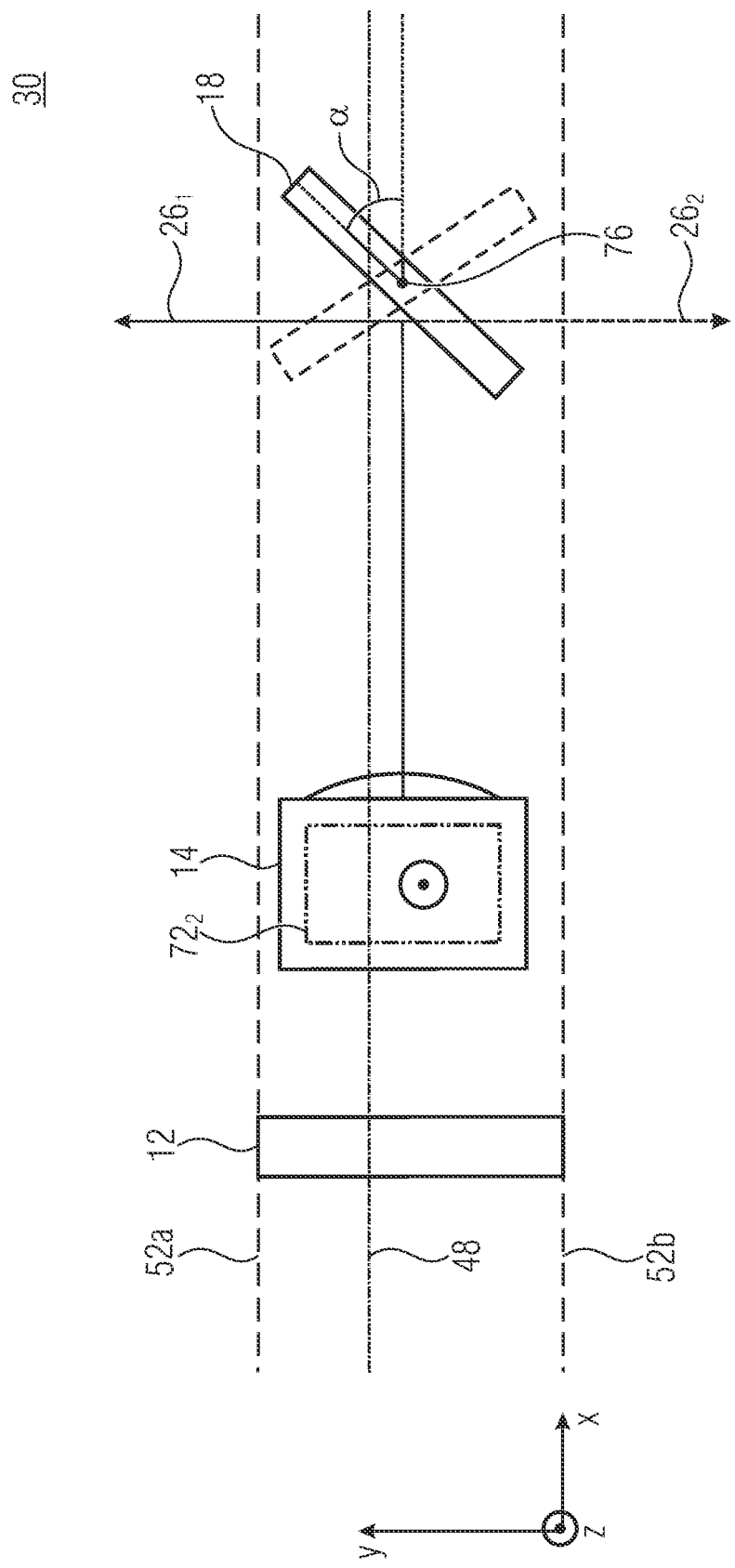
FIG. 3c shows a schematic sectional side view of the multi-aperture imaging device of FIG. 3a and/or 3b, wherein different total fields of view may be captured on the basis of different positions of the beam deflection means.

FIG. 3c shows a schematic sectional side view of the multi-aperture imaging device, wherein different total fields of view $26_1$ and $26_2$ may be captured on the basis of different positions of the beam deflection means 18 since the multi-aperture imaging device then exhibits different viewing directions. The multi-aperture imaging device may be configured to change tilting of the beam deflection means by an angle α, so that alternately, different main sides of the beam deflection means 18 are arranged to face the array 14. The multi-aperture imaging device may include an actuator configured to tilt the beam deflection means 18 by the axis of rotation 76. For example, the actuator may be configured to move the beam deflection means 18 to a first position in which the beam deflection means 18 deflects the optical path 26 of the optical channels of the array 14 to the positive y direction. To this end, in the first position, the beam deflection means 18 may exhibit, e.g., an angle α of >0° and <90°, of at least 10° and at the most 80°, or at least 30° and at the most 50°, e.g., 45°. The actuator may be configured to deflect the beam deflection means, in a second position, about the rotational axis 76 such that the beam deflection means 18 deflects the optical path of the optical channels of the array 14 toward the negative y direction, as is depicted by the viewing direction toward the total field of view 262 and the dashed representation of the beam deflection means 18. For example, the beam deflection means 18 may be configured to be reflecting on both sides, so that in the first position, the viewing direction points toward the total field of view $26_1$.

Figure 4A:
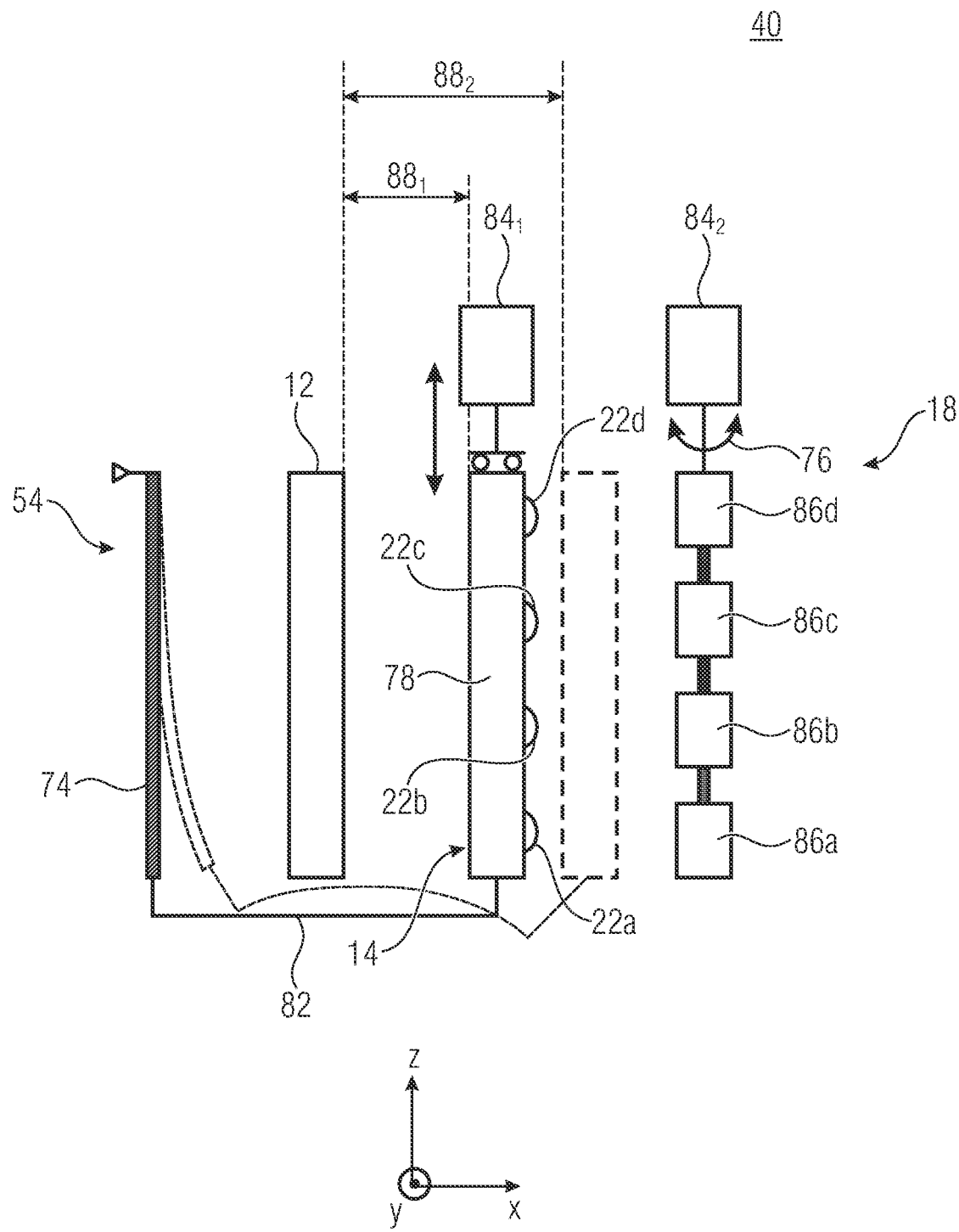
FIG. 4a shows a schematic top view of a device in accordance with an embodiment, wherein the actuator is formed as a piezoelectric bending actuator.

FIG. 4a shows a schematic top view of a device 40 in accordance with an embodiment, wherein the actuator 72 is configured as a piezoelectric bending actuator. The actuator 72 is configured to perform bending within the x/z plane, as depicted by the dashed lines. The actuator 72 is connected to the array 14 via a mechanical deflection means 82, so that upon bending of the actuator 72, a lateral shift of the array 14 along the x direction may occur, so that the focal position may be changed. For example, the actuator 72 may be connected to the substrate 78. Alternatively, the actuator 72 may also be arranged at a housing which houses at least some of the optics 22a to 22d, so as to move the housing. Other variants are also possible.

Optionally, the device 40 may comprise further actuators $84_1$ and $84_2$ configured to generate a movement at the array 14 and/or at the beam deflection means 18, for example for placing the beam deflection means 18 into different positions and/or for the purpose of optical image stabilization by translational shifting of the array 14 along the z direction and/or by generating a rotational movement of the beam deflection means 18 about the axis of rotation 76.

Unlike the description given in the previous figures, the beam deflection means 18 may comprise several facets 86a to 86d which are spaced apart from one another but may be moved together, each optical channel being associated with a facet 86a to 86d. The facets 86a to 86d may also be directly adjacent to one another, i.e., may be arranged with little or no distance from one another. Alternatively, a planar mirror may also be arranged.

By actuating the actuator 72, a distance 88₁ between at least one of the optics 22a-d and the image sensor 12 may be changed, e.g. increased or reduced, from a first value 88₁ to a second value 88₂.

Figure 4B:
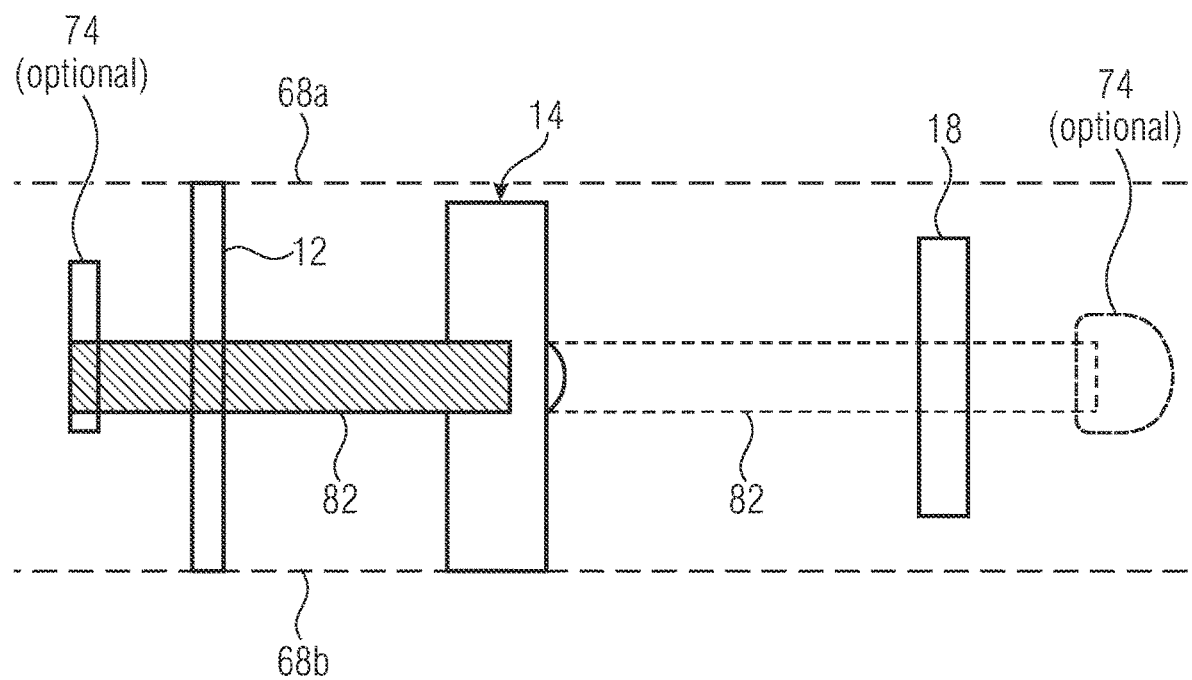

FIG. 4b shows a schematic sectional side view of the device 40 for illustrating the arrangement of the actuator 72 between the planes 68a and 68b, which are described in connection with FIG. 3a. For example, the actuator 72 is arranged fully between the planes 68a and 68b, as is the mechanical deflection means 82, which may comprise several force-transmitting elements, e.g., connecting bridges, wires, ropes or the like and mechanical bearings or deflection elements.

The mechanical deflection means and/or mechanical means for transmitting the movement to the array 14 may be arranged on one side of the image sensor 12 which faces away from the array 14, i.e., behind the image sensor 12, when starting from the array 14. The mechanical means 82 may be arranged such that a flux of force laterally passes the image sensor 12. Alternatively or additionally, the actuator 72 or a different actuator may be arranged on a side of the beam deflection means 18 which faces away from the array 14, i.e., behind the beam deflection means 18, when starting from the array 14. The mechanical means 82 may be arranged such that a flux of force laterally passes the beam deflection means 18.

Even though only one actuator 72 is depicted, it is also possible for a larger number of actuators to be arranged and/or for more than one side of the actuator 72 to be connected to a mechanical deflection means 82. For example, a centrally mounted or supported actuator 72 may be connected to one mechanical deflection means 82 on two sides, respectively, and may be effective, e.g., on both sides of the array 14 so as to enable a homogenous movement.

Figure 5A:
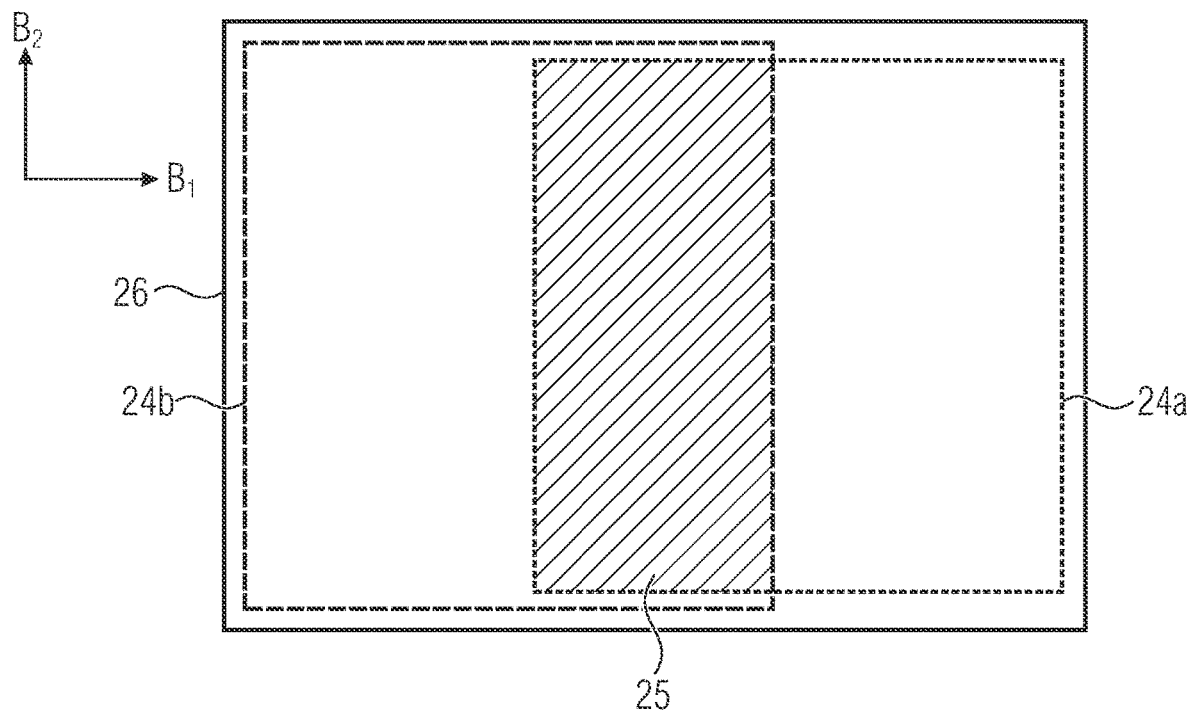
FIGS. 5a-c show schematic representations of arrangement of partial fields of view within a total field of view, in accordance with an embodiment.

FIG. 5a shows a schematic representation of an arrangement of partial fields of view 24a and 24b within a total field of view 26 which may be captured, for example, by a multi-aperture imaging device described herein, e.g., the multi-aperture imaging device 10₁, 10₂, 10₃, 30 and/or 40 and may correspond, e.g., to the total field of view 26₁ and/or 26₂. For example, the total field of view 26 comprising the optical channel 16b may be projected onto the image sensor area 28b. For example, the optical channel 16a may be configured to capture the partial field of view 24a and to project it onto the image sensor area 28a. A different optical channel, e.g., the optical channel 16c, may be configured to capture the partial field of view 24b and to project it onto the image sensor area 28c. This means that a group of optical channels may be configured to capture precisely two partial fields of view 24a and 24b. Thus, simultaneous capturing of the total field of view and of the partial fields of view, which in turn together image the total field of view 26, may occur.

Even though the partial fields of view 24a and 24b are depicted with different extensions to improve distinction, they may have identical or comparable extensions along at least one image direction $B_1$ or $B_2$, e.g., along the image direction $B_2$. The extension of the partial fields of view 24a and 24b may be identical to the extension of the total field of view 26 along the image direction $B_2$. This means that the partial fields of view 24a and 24b may fully capture the total field of view 26 along the image direction $B_2$ or may capture the total field of view 26 only partly along a different image direction $B_1$ arranged perpendicularly thereto, and may be arranged to be mutually offset, so that in combinatorial terms, complete capturing of the total field of view 26 results also along the second direction. In this context, the partial fields of view 24a and 24b may be mutually disjoint or may mutually overlap in an incomplete manner, at the most, in an overlap area 25 which possibly fully extends along the image direction $B_2$ in the total field of view 26. A group of optical channels including the optical channels 16a and 16c may be configured to jointly fully image the total field of view 26, e.g., by means of complete capturing in combination with partial captures, which jointly image the total field of view. The image direction $B_1$ may be a horizontal of an image to be provided, for example. In simplified terms, the image directions $B_1$ and $B_2$ represent two different image directions that have any arbitrary alignments within the space.

Figure 5B:
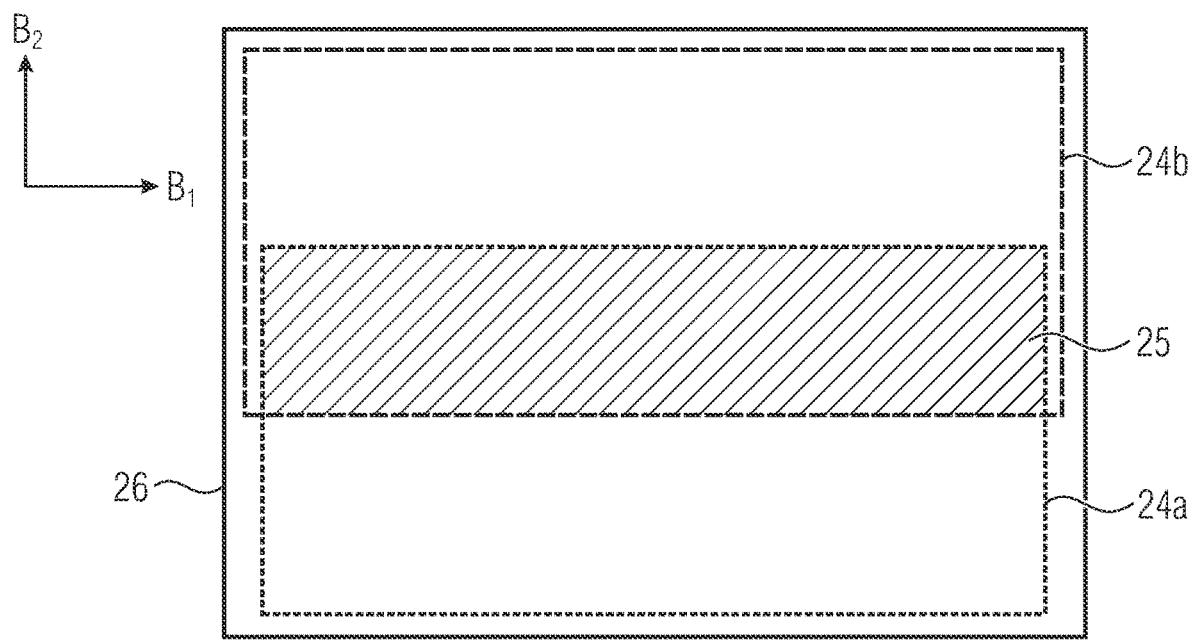

FIG. 5b shows a schematic representation of an arrangement of the partial fields of view 24a and 24b, which are arranged in a mutually offset manner along a different image direction, the image direction $B_2$, and mutually overlap. The partial fields of view 24a and 24b may capture the total field of view 26 in a complete manner along the image direction $B_1$, and in an incomplete manner along the image direction $B_2$. The overlap area 25 is arranged entirely within the total field of view 26 along the image direction $B_1$.

Figure 5C:
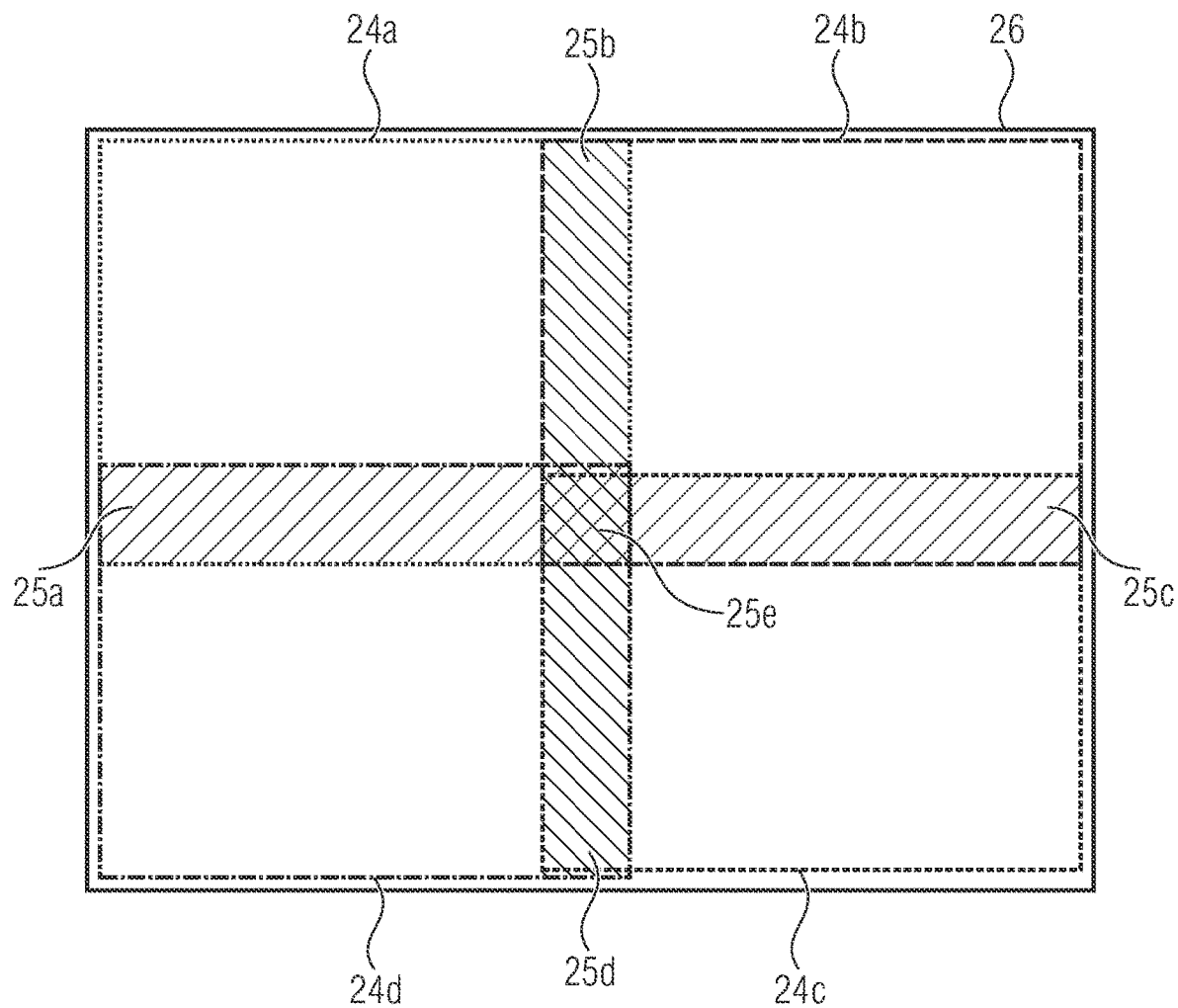

FIG. 5c shows a schematic representation of four partial fields of view 24a to 24b, which capture the total field of view 26 in an incomplete manner in both directions $B_1$ and $B_2$ in each case. Two adjacent partial fields of view 24a and 24b overlap within an overlap area 25b. Two overlapping partial fields of view 24a and 24c overlap within an overlap area 25c. Similarly, partial fields of view 24c and 24d overlap within an overlap area 25d, and the partial field of view 24d overlaps with the partial field of view 24a within an overlap area 25a. All four partial fields of view 24a to 24d may overlap within an overlap area 25e of the total field of view 26.

For capturing the total field of view 26 and the partial fields of view 24a-d, a multi-aperture imaging device may be configured in a manner similar as that described in connection with FIGS. 1a-c, wherein the array 14 may comprise five optics, for example—four for capturing partial fields of view 24a-d and one optic for capturing the total field of view 26. Accordingly, the array may be configured with three optical channels in connection with FIGS. 5a-b.

There is a large amount of image information available within the overlap areas 25a to 25e. For example, the overlap area 25b is captured via the total field of view 26, the partial field of view 24a and the partial field of view 24b. An image format of the total field of view may correspond to a redundancy-free combination of the imaged partial fields of view, for example of the partial fields of view 24a-d in FIG. 5c, the overlap areas 25a-e being counted once only in each case. In connection with FIGS. 5a and 5b, this applies to the redundancy-free combination of the partial fields of view 24a and 24b.

An overlap within the overlap areas 25 and/or 25a-e may include, e.g., a maximum of 50%, a maximum of 35% or a maximum of 20% of the respective partial images.

In other words, in accordance with embodiments described herein, a reduction of the number of optical channels may be obtained, which enables saving costs and reducing the lateral installation-space requirement. In accordance with embodiments described herein, a form of depth information retrieval is enabled which is an alternative to stereoscopic capturing and which makes do without corresponding additional sensors such as Time of Flight, Structured or Coded Light and the like. Time-of-flight sensors enabling low resolution as well as structured-light sensors exhibiting high energy requirements may thus be avoided. Both approaches further exhibit problems with intense ambient lighting, in particular sunlight. Embodiments provide for the corresponding device to be configured without such sensors. In accordance with an embodiment, a piezo bender serves as an extremely fast focus factor with little power consumption. The described architecture of the multi-aperture imaging device enables utilizing such piezo benders since an otherwise cubic form factor of the camera module impedes, or even rules out, utilization of long piezo benders. With short exposure times, this enables capturing of focus stacks, i.e., of numerous images quickly captured one after the other with slightly different focusing of the scene. Embodiments provide for the entire depth of the scene to be sensibly scanned, e.g., from macro, the closest possible way of capturing, to infinitely, which means the furthest possible distance. The distances may be equidistantly arranged within the object space, but preferably within the image space. Alternatively, a different sensible distance may be selected. A number of focal positions is, e.g., at least two, at least three, at least five, at least ten, at least 20 or any other random number.

Other embodiments, however, provide provision of a source of illumination configured to emit an illumination signal within a wavelength range not visible to the human eye, i.e., within wavelengths of less than about 380 nm and/or more than about 700 nm, preferably an infrared range of at least 0.7 µm and at the most 1,000 µm in wavelength, and particularly preferably a near-infrared range of a wavelength of at least 0.75 µm and at the most 3 µm, in the direction of the total field of view to be captured. The multi-aperture imaging device may be configured to image the total field of view within the non-visible wavelength range that is used. To this end, in particular the image sensor may be adapted to the wavelength used by the source of illumination.

Several images 42 may be presented to the user. Alternatively or additionally, embodiments provide combining the individual image information, so that the user may be presented with an image comprising combined image information. For example, an image comprising depth information, which offers the possibility of digital re-focusing, for example. The image presented may offer a so-called Bokeh effect, a setting to induce a blur. Alternatively, the image may also be presented such that the entire image is artificially in focus, which means that a larger range of distance is put into focus than is the case in the individual images of partial areas, e.g., the entire image. With a small f-number of the used objectives, the object distance of the individual elements of the scene may be reconstructed, and a depth map in image resolution may be created from this, on the basis of the acuity and/or blurriness measured in the individual images and of further information, e.g., the acuity of the same objects in adjacent images of the stack, association of the focus actuator position with an object distance, e.g., while using a calibrated look-up table, a direction of the sequence of focal positions (through-focus scan) in itself but also, in a recursive manner, from other images, so as to avoid any ambiguities.

In accordance with embodiments described herein, one achieves that duplication of the channels for stereo imaging may be dispensed with, while nevertheless a depth map may be created. Said depth map enables image stitching of the different partial images of the multi-aperture imaging device. By, e.g., reducing the number of optical channels by half, one may obtain a clear reduction of the lateral dimensions, e.g., along the line extension direction, and thus, one may achieve a reduction in price as well. By means of other steps, image processing may provide images that are at least as good.

The three optical channels for capturing both partial fields of view 24a and 24b and the total field of view 26 may be arranged, within the array 14, along the line extension direction. The line extension direction may be arranged in parallel with the image direction $B_1$, for example, so that the partial fields of view of the total field of view are arranged in a direction parallel to the line extension direction (FIG. 5a) of the array or perpendicular thereto (FIG. 5b).

Figure 6:
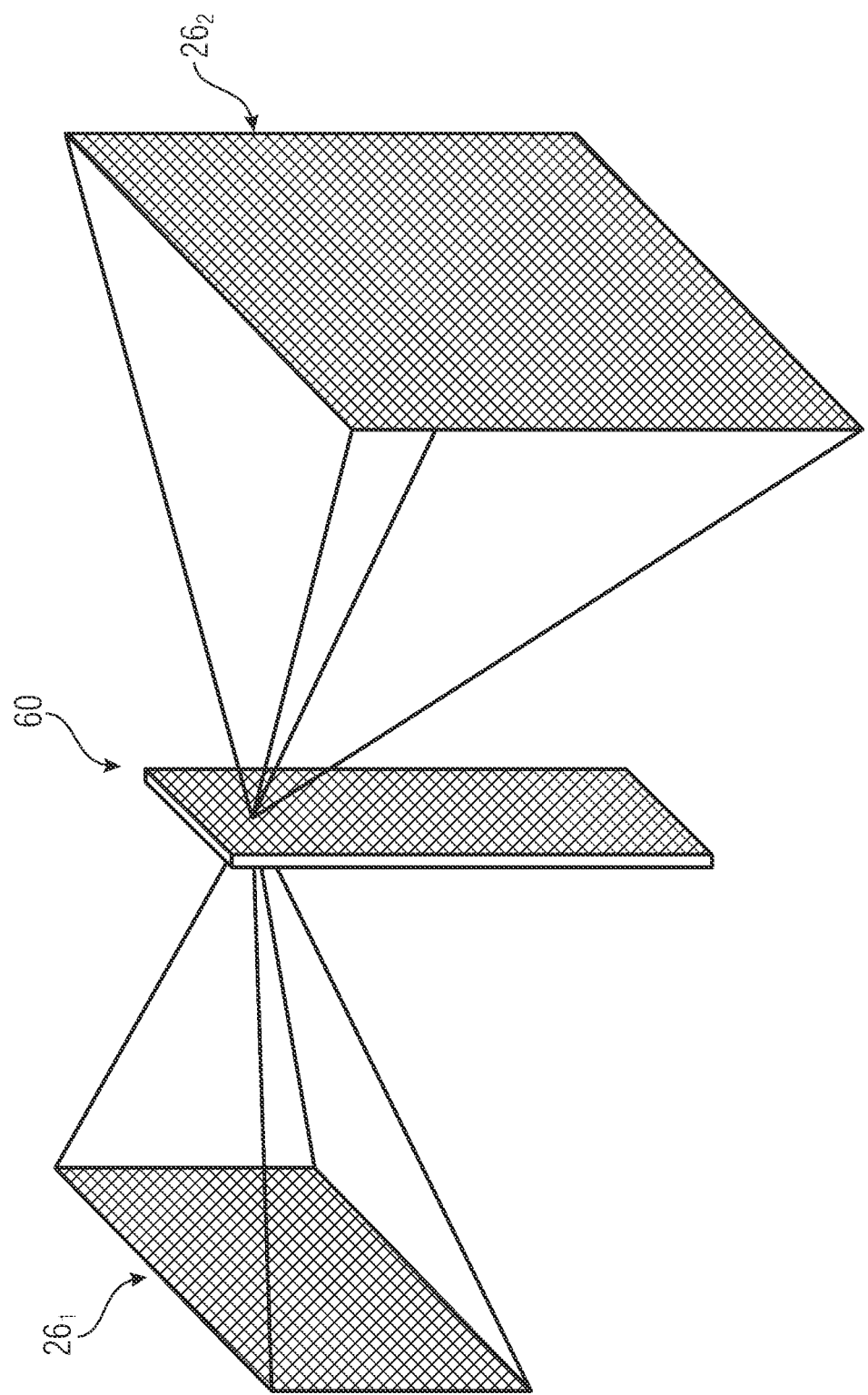
FIG. 6 shows a schematic perspective view of a device in accordance with an embodiment.

FIG. 6 shows a schematic perspective view of a device 60 in accordance with an embodiment. The implementations described readily also apply to the devices $10_1$, $10_3$, 30 and/or 40. By controlling the beam deflection means to enter into different positions, the device 60, or the multi-aperture imaging device of the device 60, may capture two mutually spaced-apart total fields of view $26_1$ and $26_2$.

For example, the device 60 is configured as a portable or mobile device, in particular a tablet computer or a mobile phone, in particular a smartphone.

One of the fields of view $26_1$ and $26_2$ may be arranged, e.g., along a user direction of the device 60, as is customary, for example, within the context of taking pictures of oneself (selfies) for photos and/or videos.

The other total field of view may be arranged, e.g., along an opposite direction and/or a world direction of the device 60 and may be arranged, e.g., along that direction along which the user looks when he/she looks at the device 60, starting from the total field of view, along the user direction. For example, the beam deflection means 18 in FIG. 1b may be formed to be reflective on both sides and may deflect the optical path of the optical channels 16a-d with different main sides in different positions, for example, so that starting from the device 60, the total fields of view $26_1$ and $26_2$ are arranged to be mutually opposite and/or at an angle of 180°.

FIG. 7a shows a schematic diagram for illustrating processing of the image information $46_1$ and $46_2$, which may be obtained by imaging the total fields of view $26_1$ and $26_2$. The control means is configured to separate part 92 of the imaging information $46_1$ of the field of view $26_1$, e.g., to cut it out, to isolate it or to copy exclusively part 92. In addition, the control means is configured to combine the separated or segmented part 92 with the imaging information $46_2$, i.e., to insert the part 92 into the imaging information $46_2$ so as to obtain the accumulated image information 48. Said image information 48 comprises, in parts, the total field of view $26_2$ and comprises, in parts, namely where the part 92 has been inserted, the image information $46_1$. It shall be noted that obtaining the accumulated image information 48 is not limited to inserting a single part 92, but that any number of parts 92 may be segmented from the image information $46_1$ and that one, several or all of said parts may be inserted into the image information $46_2$.

A location or position where the part 92 is inserted into the second imaging information $46_2$ may be automatically determined by the control means, e.g., by projecting the part 92 through the device 60 into the second field of view 262, but may alternatively or additionally also be selected by a user.

In accordance with an embodiment, the control means is configured to identify and segment a person in the first imaging information $46_1$, for example via a pattern comparison and/or edge detection, in particular, however, on the basis of the depth map created by the device itself. The control means may be configured to insert the image of the person into the second imaging information $46_2$ to obtain the accumulated image information 48. This means that the part 92 may a person, e.g., a user of the device 60. Embodiments provide for the device to be configured to automatically identify the person and to automatically insert the image of the person, i.e., the part 92, into the second imaging information $46_2$. This enables automatic creation of a self-portrait or a selfie in front of the or in the second total field of view $26_2$ without having to go through great effort in terms of positioning the device 60 and/or the user.

Embodiments provide for the control means to use a depth map, e.g., the depth map 38, so as to position the part 92 in the second imaging information $46_2$. The depth map 38 may comprise a plurality or multitude of depth planes, for example in accordance with the number of focal positons taken into account or with a reduced number obtained therefrom or a larger number interpolated therefrom. The control means may be configured to insert the part 92 within the predetermined depth plane of the second imaging information $46_2$ so as to obtain the accumulated image information 48. The predetermined depth plane may correspond essentially, i.e., within a tolerance range of ±10%, ±5% or ±2%, to a distance of the first total field of view $26_2$ from the device 60 and/or to the distance of the segmented part 92 from the device 60. This may also be referred to as depth-correct insertion of the part 92 into the second imaging information $46_2$.

FIG. 7b shows a schematic representation of a scaling of the part 92 in the accumulated image information 48. Alternatively, one may also select a different depth plane, various possibilities of embodiments being provided for this purpose. For example, the predetermined depth plane may be influenced or determined by the placement of the part 92 in the second imaging information $46_2$. Said placement may be automatic or may be effected by a user input. For example, if the user selects a specific place or location within the second imaging information $46_2$ to insert the part 92, the control means may be configured to determine, in the second imaging information $46_2$, a distance of that area into which the part 92 is to be inserted. Having knowledge of the distance of the part 92 from the device and from the objects in the second imaging information $46_2$, for example while using depth maps, a virtual change in distance of the part 92, which is caused by the user input, may be compensated for by scaling of the part 92.

Thus, a one-dimensional, two-dimensional or three-dimensional size 94 of the part 92 may be changed to a size 96, e.g., may be reduced, when the distance of the part 92 from the first imaging information $46_1$ to the second imaging information $46_2$ is increased, or may be increased when the distance from the first imaging information $46_1$ to the second imaging information $46_2$ is reduced. Irrespective of, but also in combination with, the placement of the part 92 in the first imaging information $46_1$ on the basis of an associated user input, the device may be configured to scale the imaging information $46_1$ so as to obtain scaled imaging information. This scaled imaging information may be inserted into the imaging information $46_2$ by the control means so as to obtain the accumulated image information 48. The device may be configured to determine a distance of an object, which represents the part 92 and is imaged in the first imaging information $46_1$, with regard to the device 60. The device may scale the imaging information $46_1$ and/or the part 92 thereof on the basis of a comparison of the determined distance with the predetermined depth plane in the second imaging information $46_2$. It is advantageous for the two items of imaging information $46_1$ and $46_2$ to be captured within short time lags. Advantageously, this time lag within a time interval amounts to 30 ms at the most, 10 ms at the most, 5 ms at the most, or 1 ms at the most, e.g., 0.1 ms. This time may be exploited, for example, for switching or re-positioning of the beam deflection means and may be determined at least partly by a duration of said process.

The accumulated image information 48 may be obtained as an individual image; however, alternatively or additionally, it may be obtained as a video data stream, e.g. as a multitude of individual images.

In accordance with an embodiment, a device is configured such that the first imaging information $46_1$ includes an image of a user, and the second imaging information $46_2$ includes a world view of the device. The control means is configured to segment an image of the user from the first imaging information $46_1$ and to insert it into the world view. For example, the device may be configured to insert the image of the user into the world view in a manner that is correct in terms of depth.

In other words, in connection with embodiments described herein, taking a selfie picture or making a selfie video may include a depth-based combination of quasi-simultaneous pictures taken with a front-facing camera/view and a rear-side camera/view (main camera/view) of a device, in particular of a mobile phone. In this context, the foreground of the selfie picture, i.e., the self-portrait, may be transferred to the foreground of the picture taken by the main camera. Very fast switching between front-side and main-side picture-taking by changing the position of the beam deflection means enables said quasi-simultaneous capturing of the world-side and the user-side camera image with the same image sensor. Even though in accordance with embodiments described herein, a one-channel imaging device may also be used, embodiments described herein provide advantages in particular with regard to multi-aperture imaging devices since they may already create or use a depth map so as to join (stitch) the individual images. Said depth map may also be used for determining depth information for synthesizing the accumulated imaging information 48. A sequence of events is enabled which may be described as follows:

1. Use depth map of the selfie picture so as to segment the foreground, i.e., the person(s) taking (a) picture(s) of themselves, from the background;
2. Use the depth map of the world-side picture taken so as to ascertain a foreground and a background therefrom, i.e., to separate depth information; and
3. Insert the foreground, i.e., the person(s) taking (a) picture(s) of themselves, from the selfie picture into the image of the world-side picture, in particular its foreground.

What is advantageous about this is that the selfie picture may be combined with the world-side picture as the background without having to rotate the phone, as is otherwise necessary by 180° so as to take a picture of oneself in front of said scene. Alternatively or additionally, one avoids picture being taken past oneself in a backward manner, which requires that one always has to think in mirror-inverted terms with regard to the alignment of the phone in relation to the scene. It is possible to create the depth map itself, as is described in connection with embodiments described herein, so that additional arrangement of time-of-flight sensors or structured-light sensors may be dispensed with.

In the following, several advantageous implementations of the multi-aperture imaging device will be addressed in order to illustrate inventive advantages.

Figure 8:
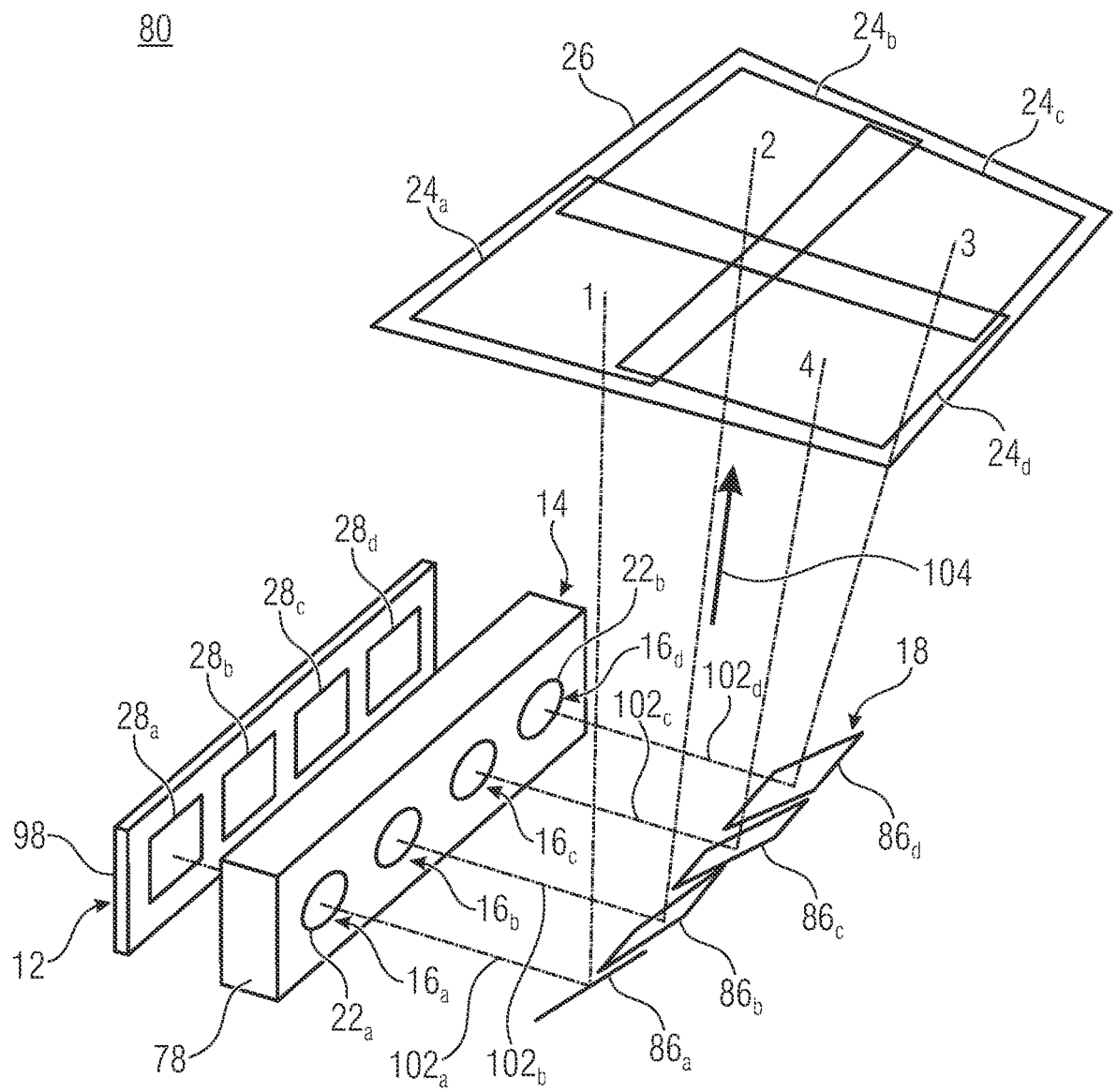
FIG. 8 shows parts of a multi-aperture imaging device in accordance with an embodiment, which may be employed in inventive devices.

FIG. 8 shows parts of a multi-aperture imaging device 80 which may be employed in inventive devices; possible focusing means and/or actuating elements for implementing optical image stabilization are not depicted but may be readily implemented.

The multi-aperture imaging device 80 of FIG. 8 includes an array 14, which is formed in several lines or preferably is formed in a single line, of adjacently arranged optical channels 16a-d. Each optical channel 16a-d includes an optic 22a-d for imaging a respective partial field of view 24a-d of a total field of view 26, possibly also a total field of view as described in connection with FIG. 5. The imaged field of view of the multi-aperture imaging device 80 is projected onto a respectively associated image sensor area 28a-d of an image sensor 12.

The image sensor areas 28a-d may be formed of a chip, for example, which includes a corresponding pixel array; as indicated in FIG. 8, the chips may be mounted on a shared substrate or circuit board 98. Alternatively, it would also be possible, for example, for the image sensor areas 28a-d to be formed, respectively, from a part of a shared pixel array which extends across the image sensor areas 28a-d in a continuous manner or with interruptions, the shared pixel array being formed on a single chip, for example. For example, only the pixel values of the shared pixel array will then be read out in the image sensor areas 28a-d. Various combinations of said alternatives are also possible, of course, e.g., the presence of one chip for two or more channels and of a further chip for yet other channels, or the like. In the event of several chips of the image sensor 12, said chips may be mounted, e.g., on one or more circuit boards, e.g., all of them together or in groups or the like.

In the embodiment of FIG. 8, four optical channels 16a-d are arranged, in a single-line manner, next to one another in the line extension direction of the array 14; however, the number "four" is only exemplary and might also be any number larger than one, i.e., N optical channels may be arranged, wherein N>1. In addition, the array 14 may also comprise further lines which extend along the line extension direction. An array 14 of optical channels 16a-d is understood to mean a combination of the optical channels, or a spatial grouping thereof. The optics 22a-d may each comprise a lens or a group of lenses or a stack of lenses as well as a combination of an imaging optic with further optical elements, including filters, diaphragms, reflective or diffractive elements or the like. The array 14 may be configured such that the optics 22a-d are arranged, fixed or mounted on the substrate 78 in a channel-specific manner, in groups or in a manner that is global to all the channels, i.e., all channels together. This means that one single substrate 78, several parts thereof or even no substrate 78 may be arranged, e.g. when the optics 22a-d are fastened at a different location.

Optical axes and/or the optical paths 102a-d of the optical channels 16a-d may extend in parallel with one another in between the image sensor areas 28a-d and the optics 22a-d, in accordance with an example. To this end, the image sensor areas 28a-d are arranged within a shared plane, for example, as are the optical centers of the optics 22a-d. Both planes are parallel to each other, i.e., parallel to the shared plane of the image sensor areas 28a-d. In addition, with projection perpendicular to the plane of the image sensor areas 28a-d, optical centers of the optics 22a-d coincide with centers of the image sensor areas 28a-d. In other words, said parallel planes have the optics 22a-d arranged therein, on the one hand, and have the image sensor areas 28a-d arranged therein at identical pitches in the line extension direction.

An image-side distance between image sensor areas 28a-d and the associated optics 22a-d is set such that the projections onto the image sensor areas 28a-d are set to a desired object distance. The distance preferably lies within a range equal to or larger than the focal width of the optics 22a-d or, for example, within a range between the focal width and double the focal width of the optics 22a-d, including both. The image-side distance along the optical axis 102a-d between the image sensor area 28a-d and the optic 22a-d may also be settable, e.g., manually by a user and/or automatically via a focusing means and/or autofocusing control.

Without any additional measures, the partial fields of view 24a-d of the optical channels 16a-d overlap essentially completely on the grounds of the parallelism of the optical paths and/or the optical axes 102a-d. For covering a larger total field of view 26, and in order for the partial fields of view 24a-d to only partly overlap in terms of space, provision is made of the beam deflection means 18. The beam deflection means 18 deflects the optical paths 102a-d and/or optical axes, for example with channel-specific deviation, to a direction of the total field of view 104. The direction of the total field of view 104 extends, for example, in parallel with a plane which is perpendicular to the line extension direction of the array 14 and is parallel to the course of the optical axes 102a-d prior to, or without any, beam deflection. For example, the direction of the total field of view 104 results from the optical axes 102a-d by a rotation about the line extension direction by an angle which amounts to >0° and <180° and preferably ranges between 80 and 100° and may amount to 90°, for example. The total field of view 26 of the multi-aperture imaging device 80, which corresponds to the total coverage of the partial fields of view 24a-d, therefore does not lie in the direction of an extension of the series connection of the image sensor 12 and the array 14 in the direction of the optical axes 102a-d, but due to the beam deflection, the total field of view is located laterally to the image sensor 12 and the array 14 in a direction in which the installation height of the multi-aperture imaging device 80 is measured, i.e., the lateral direction perpendicular to the line extension direction.

In addition, however, the beam deflection means 18 deflects, e.g., each optical path, or the optical path of each optical channel 16a-d, with a channel-specific deviation from the deflection which has just been mentioned and leads to the direction 104. To this end, the beam deflection means 18 includes, for each channel 16a-d, e.g., an element set up individually, e.g., a reflecting facet 86a-d and/or a reflecting surface. These are mutually slightly tilted. Said mutual tilting of the facets 86a-d is selected such that upon beam deflection by the beam deflection means 18, the partial fields of view 24a-d are provided with a slight divergence such that the partial fields of view 24a-d will only partly overlap. As is indicated by way of example in FIG. 8, said individual deflection may also be such that the partial fields of view 24a-d cover the total field of view 26 in a two-dimensional manner, i.e., are arranged within the total field of view 26 such that they are two-dimensionally distributed.

In accordance with a further embodiment, the optic 22a-d of an optical channel may be set up to fully or partly generate the divergence in the optical paths 102a-d, which enables fully or partly dispensing with the tilting between individual facets 86a-d. If the divergence is provided fully, e.g., by the optics 22a-d, the beam deflection means may also be formed as a planar mirror.

It shall be noted that many of the details described so far regarding the multi-aperture imaging device 80 have been selected to be exemplary only. This refers to, e.g., the above-mentioned number of optical channels. The beam deflection means 18 may also be formed differently than was described so far. For example, the beam deflection means 18 does not necessarily act in a reflective manner. It may also be configured differently than being in the form of a facet mirror, such as in the form of transparent prism wedges, for example. In this case, for example, the average beam deflection might amount to V, i.e., the direction 104 might, e.g., be parallel to the optical paths 102*a-d* even prior to or without any beam deflection, or, in other words, the multi-aperture imaging device 18 might continue to "look straight ahead" despite the beam deflection means 18. Channel-specific deflection by the beam deflection means 18 in turn would result in that the partial fields of view 24*a-d* only slightly overlap, e.g., in a pairwise manner with an overlap of <10% in relation to the solid-angle ranges of the partial fields view 24*a-d*.

Also, the optical paths 102*a-d*, or the optical axes, might deviate from the parallelism described, and nevertheless, the parallelism of the optical paths of the optical channels might still be sufficiently pronounced so that the partial fields of view, which are covered by the individual channels 16*a*-N and/or are projected onto the respective image sensor areas 28*a-d*, would overlap, for the most part, without any further measures such as, specifically, beam deflection, so that in order to cover a larger total field of view by the multi-aperture imaging device 80, the beam deflection means 18 provides the optical paths with an additional divergence such that the partial fields of view of N optical channels 16*a*-N exhibit less mutual overlap. The beam deflection means 18, for example, provides for the total field of view to comprise an aperture angle larger than 1.5 times the aperture angle of the individual partial fields of view of the optical channels 16*a*-N. With some kind of pre-divergence of the optical paths 102*a-d*, it would also be possible that, e.g., not all facet inclinations differ from one another, but that some groups of channels comprise the facets which have identical inclinations, for example. The latter may then be formed in one piece and/or may be formed to continually merge into one another, as a facet, as it were, which is associated with this group of channels which are adjacent in the line extension direction.

The divergence of the optical axes 102*a-d* of said channels 16*a-d* might then stem from the divergence of these optical axes 102*a-d* as is achieved by the lateral offset between optical centers of the optics 22*a-d* and image sensor areas 28*a-d* of the channels 16*a-d* or prism structures or decentered lens sections. The pre-divergence might be restricted to one plane, for example. For example, the optical axes 102*a-d* might extend, e.g., prior to or without any beam deflection 18, within a shared plane, but may extend in a divergent manner within said plane, and the facets 86*a-d* only cause additional divergence within the other transversal plane, i.e., they are all parallel to the line extension direction and are mutually inclined only in a manner that differs from the above-mentioned shared plane of the optical axes 102*a-d*; again, several facets 86*a-d* may have the same inclination and/or might be jointly associated with one group of channels whose optical axes differ, in a pair-wise manner, for example as early as in the previously mentioned shared plane of the optical axes, prior to or without any beam deflection.

When the beam deflection means 18 is dispensed with or is configured as a planar mirror or the like, the entire divergence might be accomplished by the lateral offset between optical centers of the optics 22*a-d*, on the one hand, and centers of the image sensor areas 28*a-d*, on the other hand, or by prism structures or by decentered lens sections.

The above-mentioned pre-divergence which may possibly exist may be achieved, e.g., in that the optical centers of the optics 22*a-d* are located on a straight line along the line extension direction, whereas the centers of the image sensor areas 28*a-d* are arranged to deviate from the projection of the optical centers along the normal of the plane of the image sensor areas 28*a-d* onto points located on a straight line within the image sensor plane, e.g. at points which deviate from the points located on the above-mentioned straight line within the image sensor plane, in a channel-specific manner, along the line extension direction and/or along the direction perpendicular both to the line extension direction and to the image sensor normal. Alternatively, pre-divergence may be achieved, e.g., in that the centers of the image sensors 28*a-d* are located on a straight line along the line extension direction, whereas the centers of the optics 22*a-d* are arranged to deviate from the projection of the optical centers of the image sensors along the normal of the plane of the optical centers of the optics 22*a-d* onto points located on a straight line within the optical center plane, e.g. at points which deviate from the points located on the above-mentioned straight line within the optical center plane, in a channel-specific manner, along the line extension direction and/or along the direction perpendicular both to the line extension direction and to the normal of the optical center plane.

It is preferred for the above-mentioned channel-specific deviation from the respective projection to occur only in the line extension direction, i.e., for the optical axes 102*a-d* which are located only within one shared plane to be provided with a pre-divergence. Both optical centers and image sensor area centers will then each be located on a straight line parallel to the line extension direction, but with different intermediate distances. A lateral offset between lenses and image sensors in the direction that is perpendicular and lateral to the line extension direction would result in an increase of the installation height, in contrast. A pure in-plane offset in the line extension direction does not result in a change in the installation height, but will possibly result in fewer facets and/or in that the facets will exhibit a tilt only in one angle orientation, which simplifies the architecture.

Advantageous implementations of the beam deflection means 18 will be described with reference to FIGS. 9*a-f*. The explanations present a number of advantages which may be effected individually or in any combination, but which are not to have a limiting effect. In particular, it will become clear that the channel-specific relative position may be obtained by means of channel-specific positioning by means of channel-specific axial positioning of the individual facets which may be arranged rigidly, or may be jointly moved via individual axes and/or via a kinked or bent shared axis.

Figure 9A:
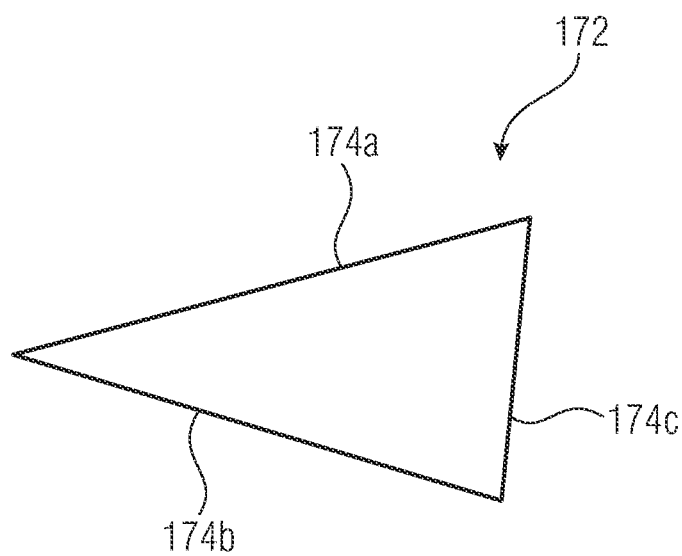
FIGS. 9a-f show advantageous implementations of a beam deflections means in accordance with an embodiment.

FIG. 9*a* shows a schematic sectional side view of a beam deflection element 172 as may be employed for a beam deflection means described herein, e.g., the beam deflection means 18. For example, the beam deflection element 172 is a facet 86. The beam deflection element 172 may be operative for one, for a plurality of, or for all of the optical channels 16*a-d* and may comprise a cross-section of the type of a polygonal chain. Even though a triangular cross-section is shown, said cross-section may also be any other polygon. Alternatively or additionally, the cross-section may also comprise at least one curved surface; in particular with reflecting surfaces, it may be advantageous to have an implementation that is planar at least in portions so as to avoid aberrations.

For example, the beam deflection element 172 comprises a first side 174*a*, a second side 174*b* and a third side 174*c*.

At least two sides, e.g., sides 174a and 174b, are configured to be reflective, so that the beam deflection element 172 is formed to be reflective on both sides. The sides 174a and 174b may be main sides of the beam deflection element 172, i.e., sides whose surface area is larger than that of the side 174c. For example, the side 174c may be curved, i.e., may be convex starting from the axis 176, so that due to the curvature, adaptation of the element to the rotation will occur, which will enable positioning the side 174c even closer to the edge side of the housing, which is advantageous with regard to the position of the passage area arrangement.

In other words, the beam deflection element 172 may be in the shape of a wedge and may be formed to be reflective on both sides. The face 174c may have a further face arranged opposite it, i.e., between faces 174a and 174b, which is substantially smaller than the face 174c, however. In other words, the wedge formed by the faces 174a, b and c does not taper in any random manner but is provided with a face at the pointed side and is therefore truncated.

When switching of the viewing directions is dispensed with, it is also possible to arrange a prism or a channel-specific mirror which has only one reflecting side.

Figure 9B:
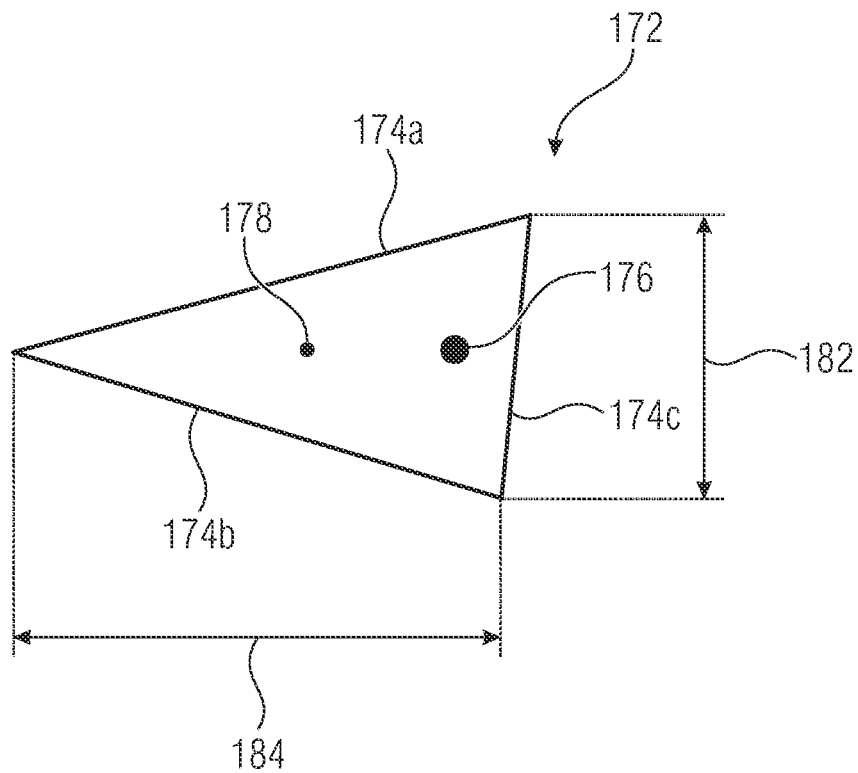

FIG. 9b shows a schematic sectional side view of the beam deflection element 172, wherein a suspension or displacement axis 176 of the beam deflection element 172 is described.

The displacement axis 176 about which the beam deflection element 172 may be rotationally and/or translationally moveable within the beam deflection means 18 may be eccentrically shifted with regard to a centroid 178 of the cross-section. The centroid may alternatively also be a point which describes half of the dimension of the beam deflection element 172 along a thickness direction 182 and along a direction 184 perpendicular thereto.

The displacement axis may be unchanged, e.g., along a thickness direction 182 and may comprise any offset in a direction perpendicular thereto. Alternatively, an offset along the thickness direction 182 is also feasible. The displacement may be effected, e.g., such that upon rotation of the beam deflection element 172 about the displacement axis 176, a longer adjustment travel is obtained than with rotation about the centroid 178. Thus, the distance by which the edge between the sides 174a and 174b is moved upon rotation may increase, due to the displacement of the displacement axis 176, given the same rotational angle as compared to a rotation about the centroid 178. Preferably, the beam deflection element 172 is arranged such that the edge, i.e., the pointed side of the wedge-shaped cross-section, between the sides 174a and 174b faces the image sensor. Thus, by means of small rotational movements, a respectively other side 174a or 174b may deflect the optical path of the optical channels. Here it becomes clear that the rotation may be performed such that a spatial requirement of the beam deflection means along the thickness direction 182 is small since movement of the beam deflection element 172 in such a manner that a main side be perpendicular to the image sensor is not required.

The side 174c may also be referred to as a secondary side or rear side. Several beam deflection elements may be connected to one another such that a connecting element is arranged on the side 174c or extends through the cross-section of the beam deflection elements, i.e., is arranged inside the beam deflection elements, e.g., in the area of the displacement axis 176. In particular, the holding element may be arranged so as not to project, or to project to a small extent only, i.e., by a maximum of 50%, a maximum of 30% or a maximum of 10%, beyond the beam deflection element 172 along the direction 182, so that the holding element does not increase or determine the extension of the overall setup along the direction 182. Alternatively, the extension in the thickness direction 182 may be determined by the lenses of the optical channels, i.e., they have the dimension defining the minimum of the thickness.

The beam deflection element 172 may be formed of glass, ceramic, glass ceramic, plastic, metal or a combination of said materials and/or further materials.

In other words, the mean deflection element 172 may be arranged such that the tip, i.e., the edge between the main sides 174a and 174b, points toward the image sensor. A posture of the beam deflection elements may be such that it is effected only on the rear side or inside the beam deflection elements, i.e., the main sides are not covered up. A shared holding or connecting element may extend across the rear side 174c. The rotational axis of the beam deflection element 172 may be arranged to be eccentric.

Figure 9C:
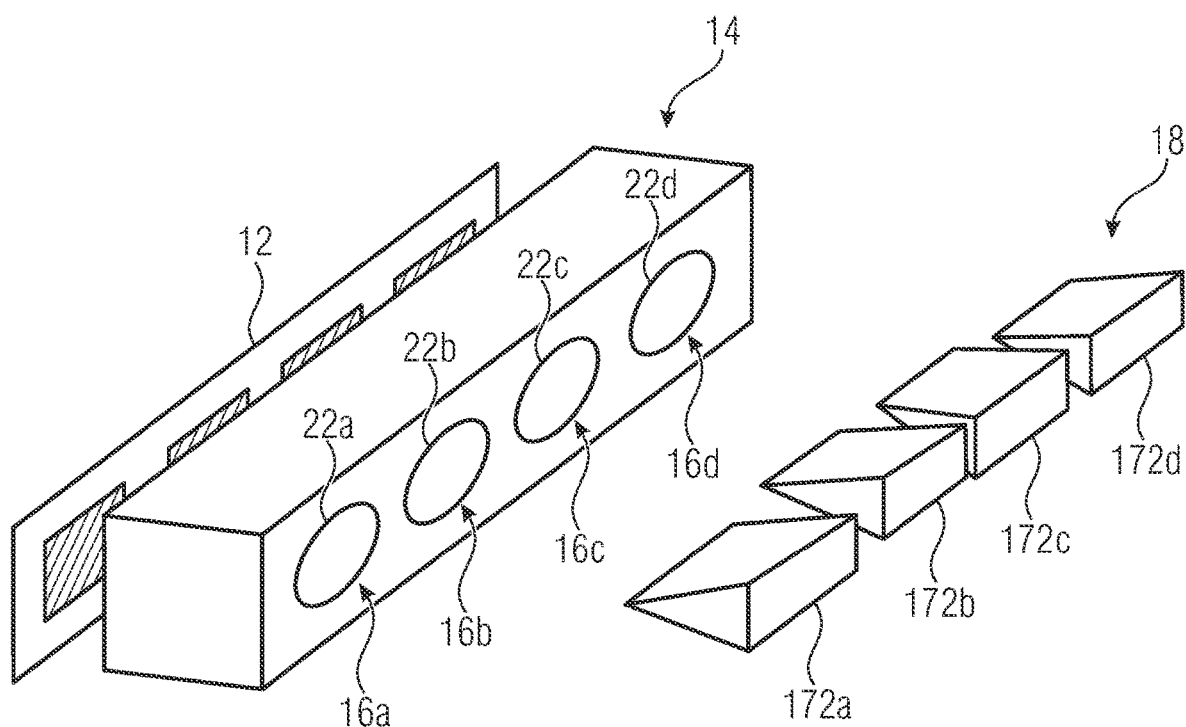

FIG. 9c shows a schematic perspective view of a multi-aperture imaging device 190 including an image sensor 12 and a single-line array 14 of adjacently arranged optical channels 16a-d. The beam deflection means 18 includes a number of beam deflection elements 172a-d, which may correspond to the number of optical channels. Alternatively, a smaller number of beam deflection elements may be arranged, for example when at least one beam deflection element is used by two optical channels. Alternatively, it is also possible for a larger number to be arranged, for example when switching of the deflection direction of the beam deflection means 18 is effected by a translational movement. Each beam deflection element 172a-d may be associated with an optical channel 16a-d. The beam deflection elements 172a-d may be imaged as a multitude of elements 172 in accordance with FIG. 11. Alternatively, at least two, several or all of the beam deflection elements 172a-d may be formed to be integral with one another.

Figure 9D:
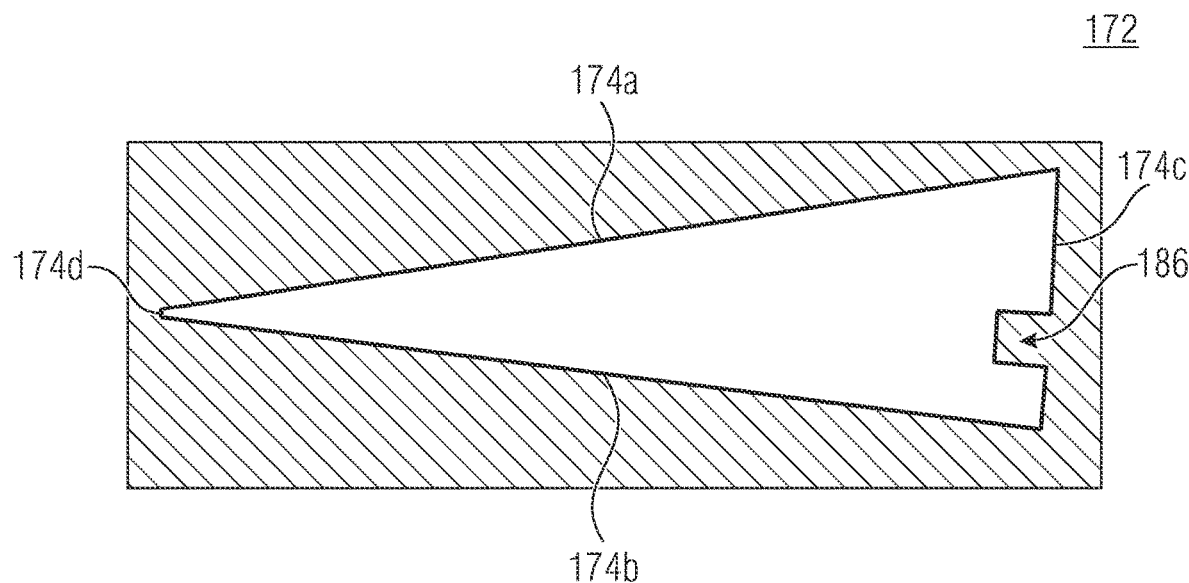

FIG. 9d shows a schematic sectional side view of the beam deflection element 172, the cross-section of which is formed as a freeform surface. Thus, the side 174c may comprise a recess 186 enabling attachment of a holding element; the recess 186 may also be formed as a protruding element, e.g., as a key of a slot-and-key system. In addition, the cross-section comprises a forth side 174d comprising a smaller area extension than the main sides 174a and 174b and connecting the latter to each other.

Figure 9E:
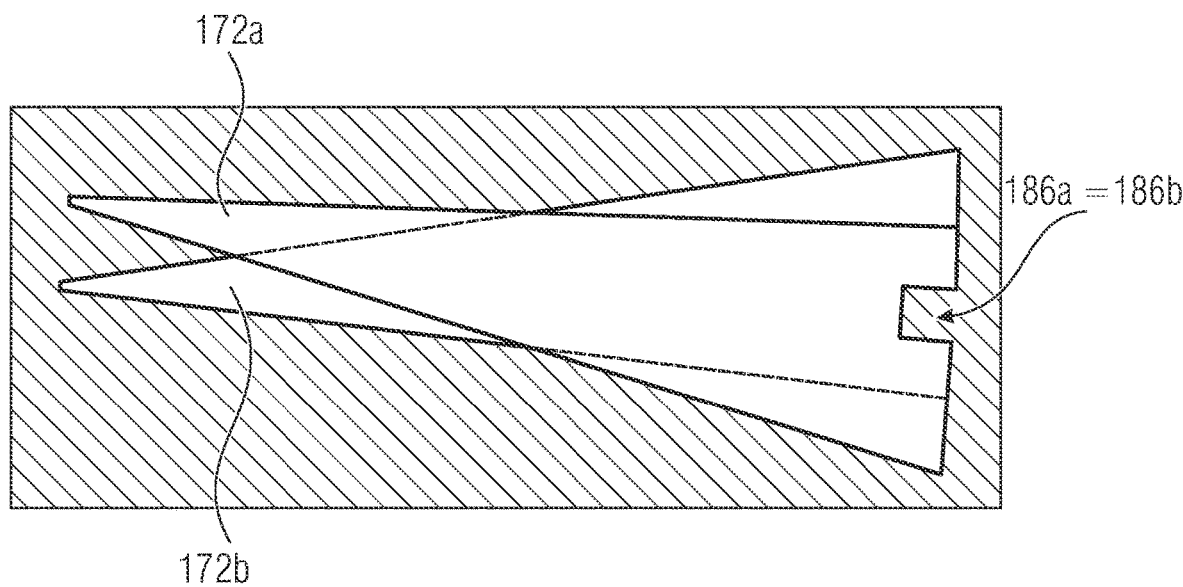

FIG. 9e shows a schematic sectional side view of a first beam deflection element 172a and of a second beam deflection element 172b, which is located behind the former in the representation direction. The recesses 186a and 186b may be arranged to be essentially congruent, so that it is possible to arrange a connecting element in the recesses.

Figure 9F:
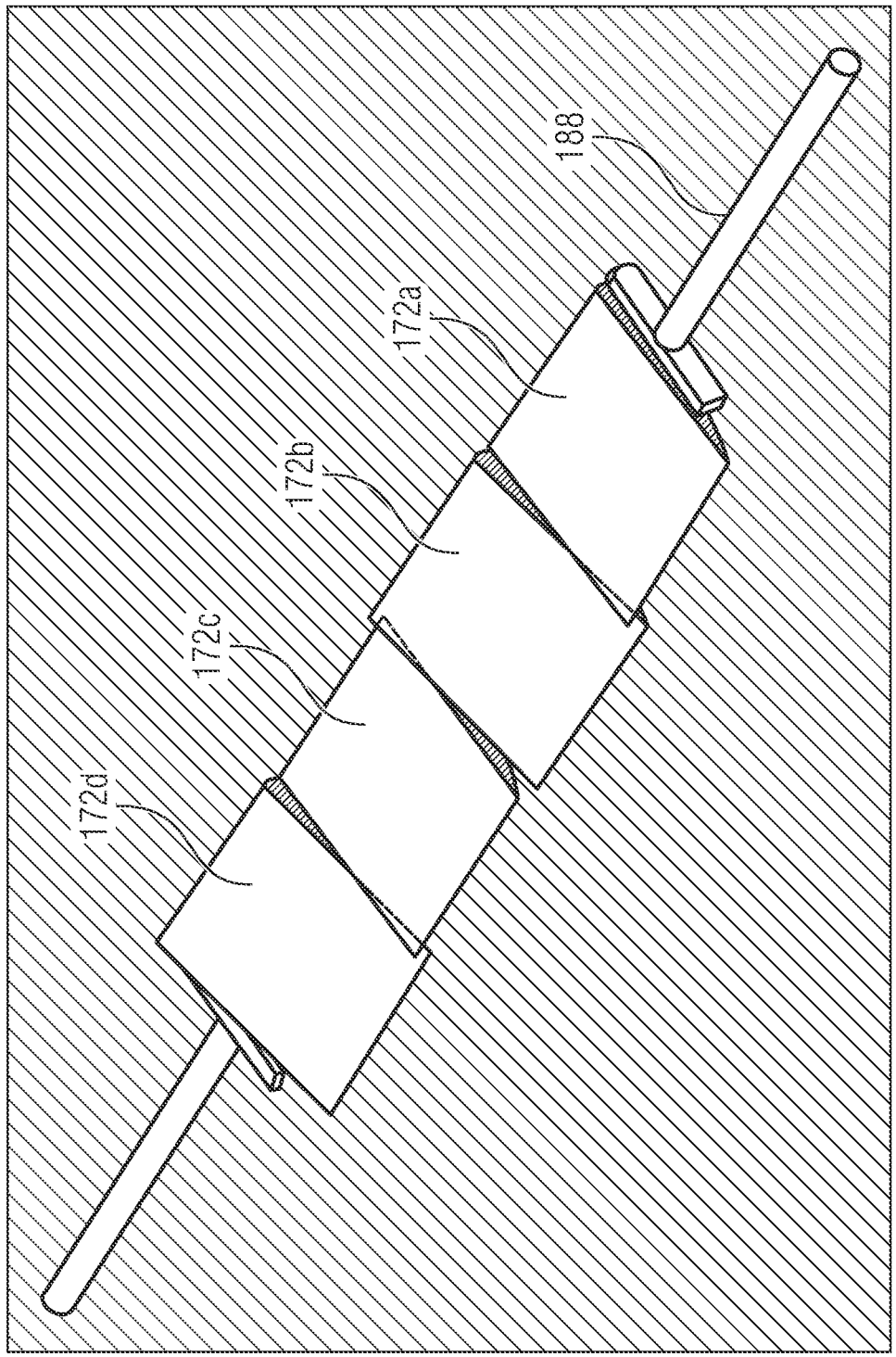

FIG. 9f shows a schematic perspective view of the beam deflection means 18 comprising, e.g., four beam deflection elements 172a-d which are connected to a connecting element 188. The connecting element 188 may be used for being translationally and/or rotationally moveable by an actuator. The connecting element 188 may be configured to be in one piece and may extend at or within the beam deflection elements 172a-d across an extension direction, e.g., the y direction. Alternatively, the connecting element 188 may be connected only to at least one side of the beam deflection means 18, e.g., when the beam deflection elements 172a-d are formed in one piece. Alternatively, connection to an actuator and/or connection of the beam deflection elements 172a-d may also be effected in any other manner, e.g., by means of bonding, wringing or welding. It is also possible for the connecting element 188 to exhibit kinks or curvatures so as to set different relative positions of the beam deflection elements 172a-d with regard to a reference position (e.g., a distance from the edge side or the image sensor).

Inventive implementations will be explained in more detail with reference to the following embodiments.

Figure 10:
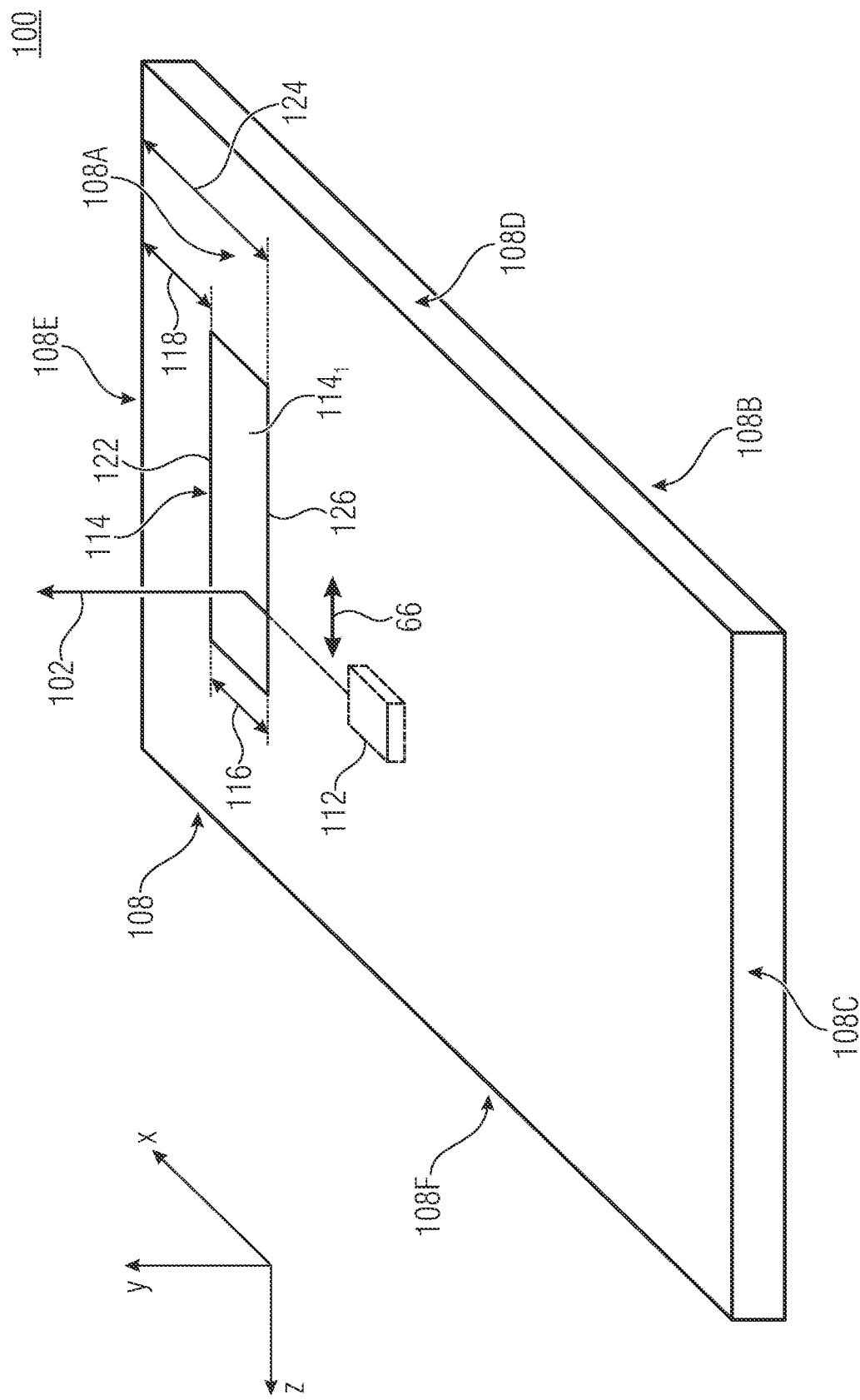
FIG. 10 shows a schematic perspective view of a device in accordance with an embodiment.

FIG. 10 shows a schematic perspective view of a device 100 in accordance with an embodiment. The device 100 includes a housing 108 which completely or partly encloses or houses an inner volume. The housing 108 includes two oppositely located main sides 108A and 108B, which are spaced apart from each other by one or more secondary sides 108C. In the case, depicted by way of example, of a cuboidal housing 108, e.g., four secondary sides 108C to 108F may be arranged to connect and to space apart the main sides 108A and 108B. However, embodiments are not limited to cuboidal housings but may also comprise different shapes, e.g., a type of cylinder, which may result in one individual secondary side, a triangle with three secondary sides or a different polygonal chain having a random number of edge sides.

The device 100 includes a multi-aperture imaging device 112 which is arranged inside the housing 108 and may be configured in line with multi-aperture imaging devices described herein and which includes an image sensor arrangement comprising image sensor areas, the image sensor areas being associated with the respective optical channels. To this end, the multi-aperture imaging device 112 includes an array of adjacently arranged optical channels, each optical channel including an optic for projecting at least one partial field of view of a total field of view onto an image sensor area of the image sensor arrangement. The multi-aperture imaging device 112 further includes a beam deflection means for deflecting an optical path 102 of the optical channels, the beam deflection means comprising a plurality of facets, and each optical channel having a facet associated with it.

At least one of the main sides 108A and/or 108B comprises a passage area arrangement 114. The passage area arrangement 114 includes one or more passage areas 114$_i$, wherein i≥1. What is depicted by way of example is the arrangement of one single passage area 114$_1$. The passage area arrangement 114 is configured to allow the optical paths 102 to pass. Thus, the passage area 114 may be at least partly transparent, e.g., for a wavelength relevant to the multi-aperture imaging device 112. This means that the multi-aperture imaging device 112 may look through the housing 108, which otherwise might be formed to be opaque, because of the passage area arrangement 114. In total, this does not rule out the arrangement of diaphragms, filters or other optically effective elements within the passage area 114$_1$ or the passage area arrangement 114.

What is achieved in accordance with the invention is that the space requirement of the passage area arrangement 114 in the main side 108A is small, preferably within a plane of the main side 108A and perpendicular to the line extension direction 66, so that a dimension 116, e.g., in parallel with the x direction, is small. Alternatively or additionally, a distance 118 of a proximal edge 122 and/or a distance 124 of a distal edge 126 may be small in relation to the edge side 108E so as to provide as large a measure as possible or as large a proportion as possible in terms of surface area of the main side 108A for other purposes, e.g., for arranging a display or a display means. The proximal and distal edges 122 and 126 in this context relate to edges extending in approximately the same direction as the edge side related thereto, here 108E, for example, and which are different from edges extending perpendicular thereto.

To this end, the multi-aperture imaging device 112 is configured, in accordance with the invention, such that the optical channels, with regard to the passage area arrangement 114 and along an axial direction, e.g., in parallel with the x direction, of the course of the optical path of the optical channels between the image sensor arrangement and the beam deflection means comprise a channel-specific relative position of the image sensor area of the optical channel, of the optic of the optical channel and/or of a position of the reflecting surface of the facet associated with the optical channel.

Several advantageous embodiments of this invention will be explained below in more detail.

FIG. 11a shows a schematic top view of an implementation of the device 100, wherein the main side 108A of the housing 108 comprises two passage areas 114$_1$ and 114$_2$, by way of example. Each of the passage areas 114$_1$ and 114$_2$ may be effective for at least one, but also for several or all of the optical channels, for example by subdividing the channels, so that one looks through at least two of the passage areas 114$_1$ and 114$_2$ (or further possible passage areas) at the same time. Alternatively, it is also possible to associate different passage areas 114$_1$ and 114$_2$ with different viewing directions or picture-taking modes, so that several or all of the optical channels at one point in time only look through a subset of all passage areas 114$_i$, for example one single passage area.

The passage areas 114$_1$ and 114$_2$ may comprise identical dimensions 116, but may also be formed to differ from each other, as need may be, for example when a smaller dimension may be implemented for one of the passage areas 114$_1$ or 114$_2$, without limiting the visual range of the multi-aperture imaging device. For example, the dimension 124 is larger than the dimension 116, so that the passage areas 114$_1$ and 114$_2$ may exhibit a distance from the edge side 108E.

FIG. 11b shows a schematic top view of an alternative implementation of the device 100, wherein the passage area arrangement comprises only one single passage area 114$_1$, which is arranged, e.g., to be centered and adjacent to the edge side 108E. Here, too, the distance 124 between the edge side 108E and the distal edge 126 may be larger than the dimension 116 of the passage area 114$_1$.

It is to be noted that the housing 108 is depicted as a cuboid, for example, so that the at least one edge side 108C to 108F may also be implanted to be straight. Alternative implementations comprise curved edge sides 108C to 108F, e.g., edge sides that are curved in a convex manner, i.e., toward the outside, in relation to the housing 108. The distances 118 and 124 in this case relate to the edge or to the end of the main side 108A, irrespective of how much the top view is increased by convexly curved edge sides.

As compared to the implementation in FIG. 11a, the passage area 114$_1$ may be configured to be larger, along the z direction, i.e., the line extension direction, than the passage areas 114$_1$ and 114$_2$ in FIG. 11a, e.g., so as to allow a larger number of optical channels to pass at the same time.

Figure 11C:
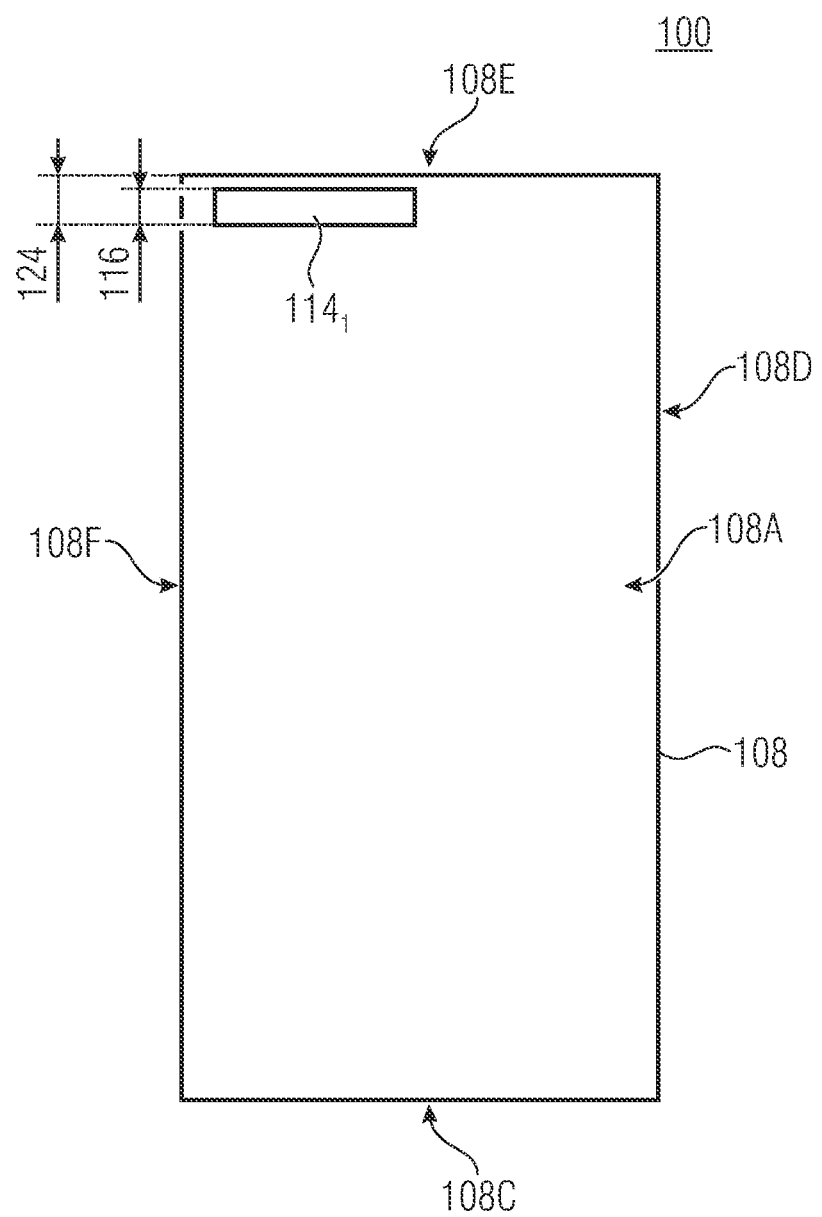
FIG. 11c shows a schematic top view of a further alternative implementation of the device of FIG. 10 in accordance with an embodiment, wherein the total passage area is, unlike in FIG. 11b, not centered but is offset from an edge side.

FIG. 11c shows a schematic top view of a further alternative implementation of the device 100, wherein the total passage area 114$_1$ is not arranged to be centered, unlike in FIG. 11b, but to be offset from the edge side 108F. In accordance with further alternative implementations, a passage area or several passage areas may be shifted toward any edge side when one uses the configuration of FIG. 11b as the basis. Preferably, the distance 124 is kept small, and a further additional distance from the edge side 108F or from the edge side 108D is small or is symmetric in relation to the edge sides 108D and 108F. This enables a remaining surface area of the main side 108A to be either symmetric or largely uninterrupted, which results in a large amount of representable information when said remaining surface area is used as a display.

This means that the effects of the display recess which are referred to as notches may be kept small and may be shifted to a corner of the display or may be at least symmetrically arranged at an edge side.

It shall further be noted that the implementation that the edge sides 108C and 108E are smaller than the edge sides 108D and 108F may also be switched or turned around as desired.

Figure 12C:
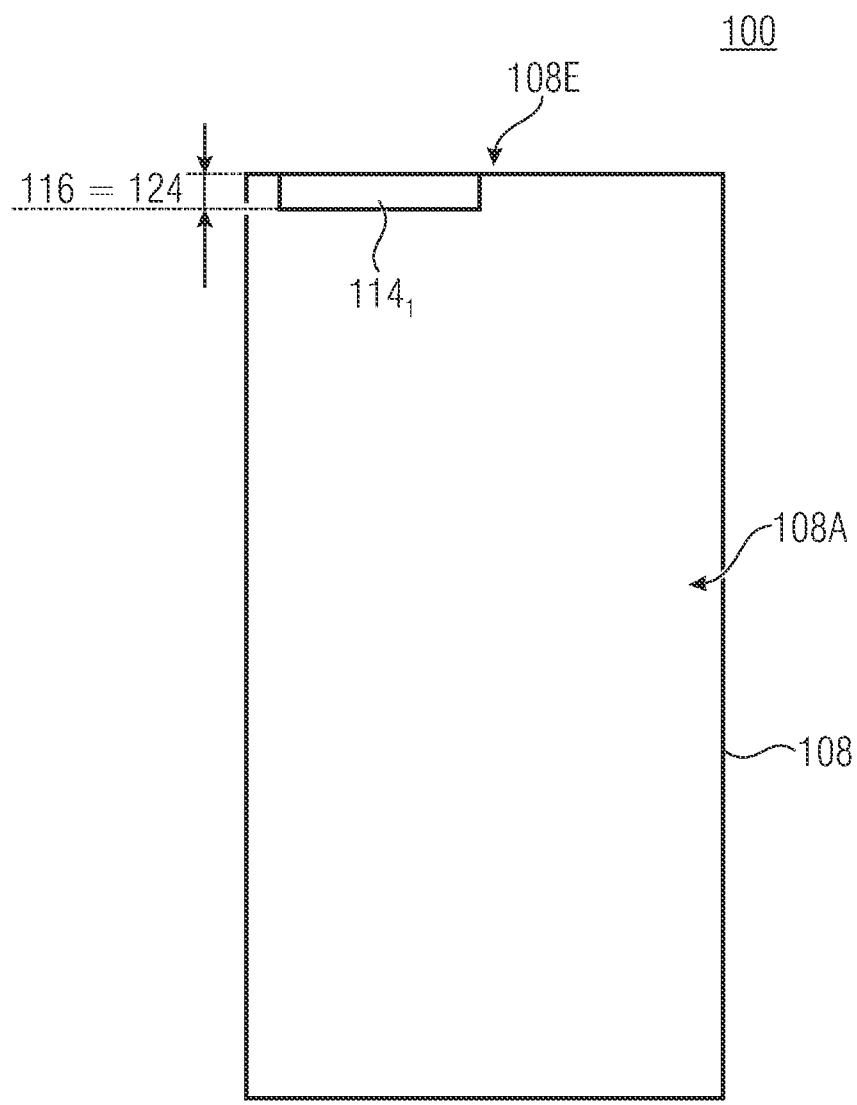

FIGS. 12a to 12c show implementations of the device 100 which are equivalent or at least similar to those of FIGS. 11a to 11c; the dimension 116 of the passage areas $114_1$ and/or $114_2$ may be equal to the distance 124, which means that the windows are entirely displaced toward the edge of the main side 108A, which may possibly, but not necessarily be implemented such that at least one of the passage areas $114_1$ and/or $114_2$ extends into the edge side 108E.

In other words, FIGS. 12a to 12c show a display of a smartphone and the position(s) of the window(s) in a configuration wherein the passage areas are adjacent without an edge.

FIGS. 11a, 11b, 11c, 12a, 12b and 12c each show a view of the main side 108A. In accordance with embodiments, the viewing direction of the multi-aperture imaging device is invariable.

In accordance with other embodiments, the viewing direction of the multi-aperture imaging device is variable on the basis of a movement of the beam deflection means, for example toward an opposite direction. Embodiments therefore involve providing the main side, which is not depicted in FIGS. 11a, 11b, 11c, 12a, 12b and 12c, with passage areas in an identical or at least comparable manner so as to enable a corresponding viewing direction. A relative location of the beam deflection means may therefore be switchable between a first position and a second position. In the first position, the optical path may be deflected toward a first total field of view, and in the second position, it may be deflected toward a second total field of view; different passage area arrangements, possibly in different main sides of the housing, are passed through in each case. It may be advantageous to provide the passage area arrangement, i.e., the passage windows, with diaphragms. Respectively non-used passage areas, i.e., those passage area arrangements through which the optical paths are not directed in the current picture captured, may be set to be fully or partly non-transparent, i.e., they may be optically closed, by the diaphragm and an associated control means. To this end, mechanical and/or electrochromic diaphragms may be suitable. When the beam deflection means, in a first operating state, deflects the optical paths such that they pass through a first passage area arrangement, the second diaphragm may optically set the second passage area arrangement to be at least partly non-transparent. In the second operating state, the beam deflection means may deflect the optical path of the imaging device such that said optical path extends through the second passage area arrangement. The first diaphragm may then optically set the first passage area arrangement to be at least partly non-transparent, whereas alternately, the second passage area arrangement is set to be transparent.

In the following, reference shall be made to the channel-specific implementation of the multi-aperture imaging device.

Figure 13A:
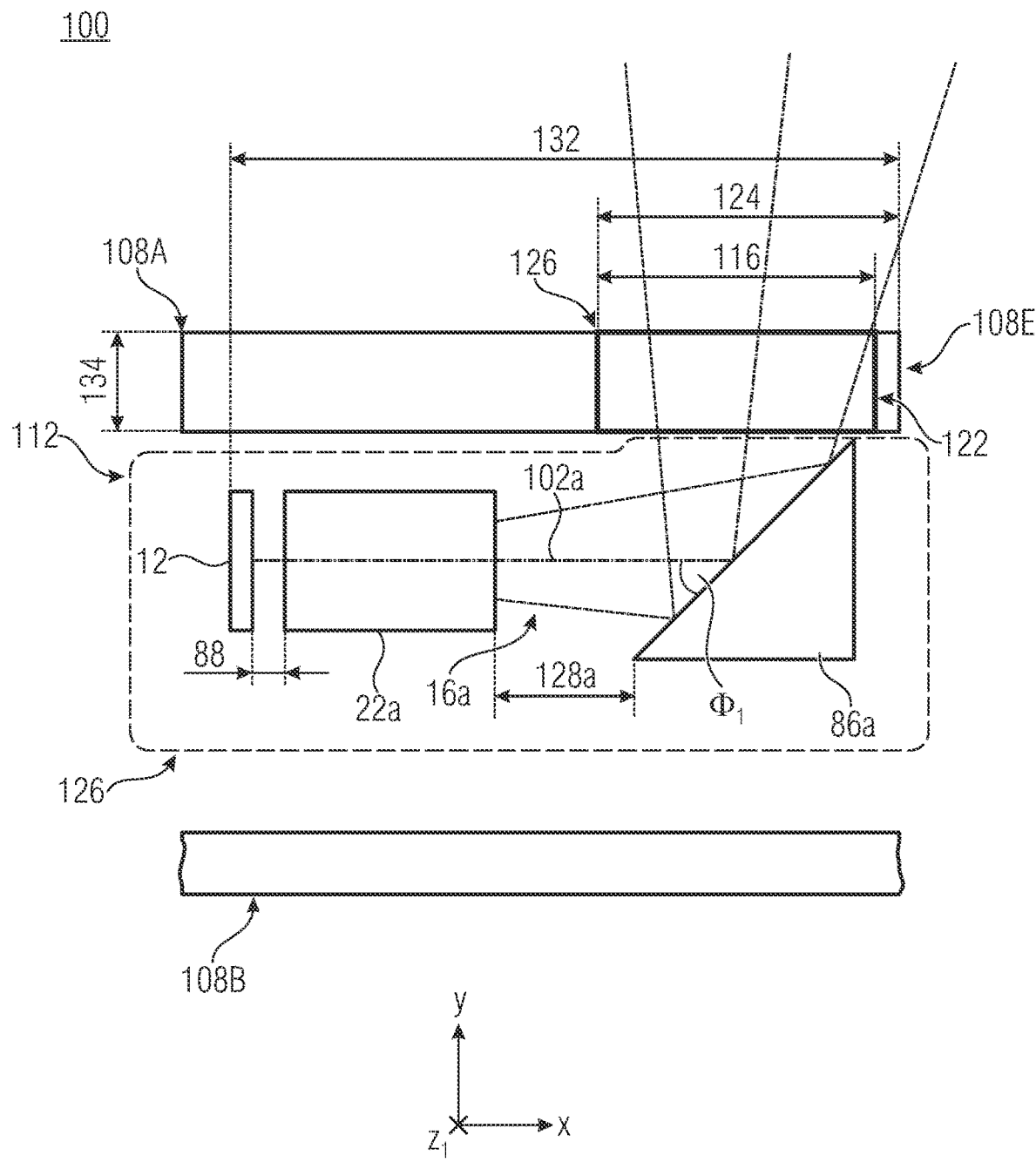
FIG. 13a shows an exemplary schematic sectional side view of the device of FIG. 10 in accordance with an embodiment, comprising sections of the main sides in order to illustrate the interior of the housing.

To this end, FIG. 13a shows an exemplary schematic sectional side view of the device 100 comprising sections of the main sides 108A and 108B for depicting the interior 127 of the housing 108. FIG. 13a shows, in the depicted sectional plane, a representation of a first optical channel, e.g. of the optical channel 16a comprising the optic 22a, wherein the distance 88 is provided between the image sensor 12 and the optic 22a.

Figure 13B:
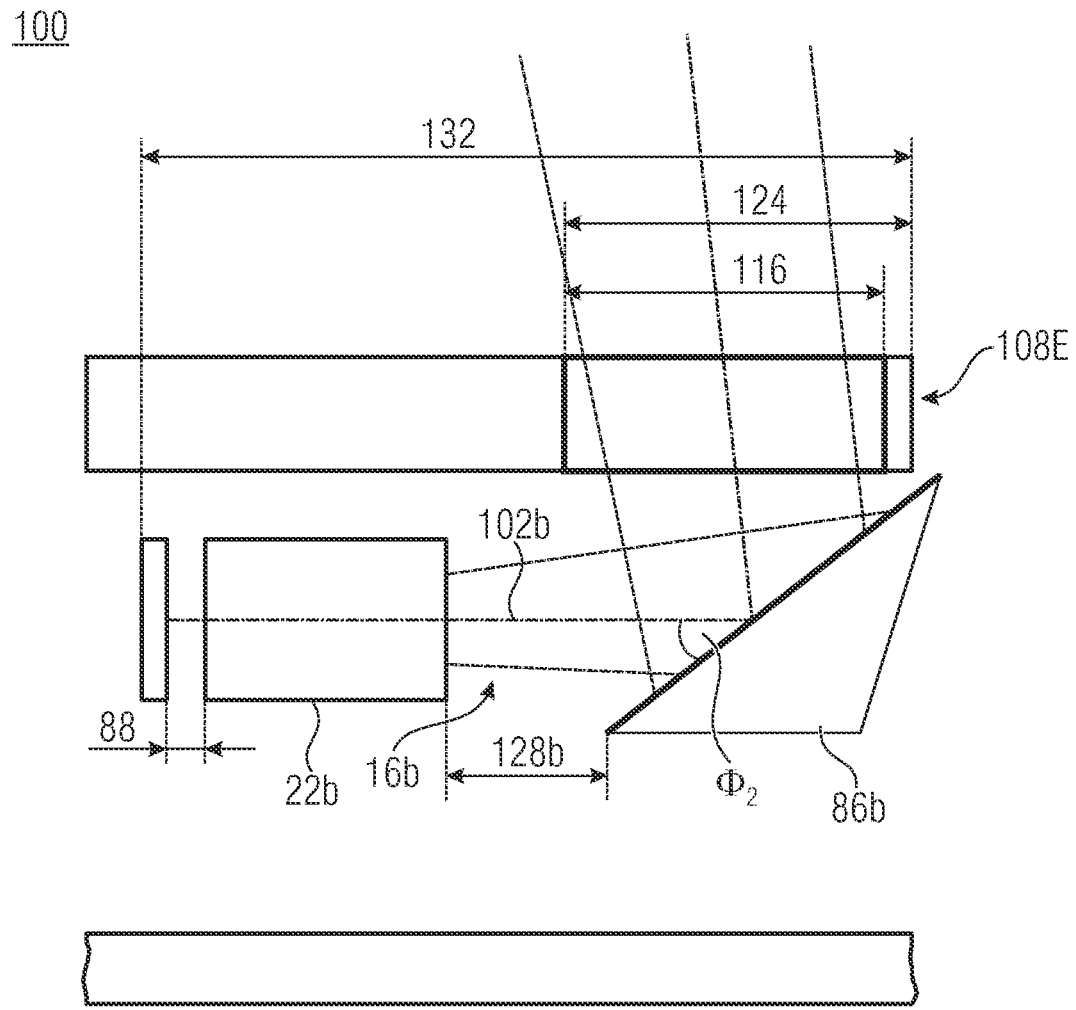
FIG. 13b shows a schematic sectional side view of the same implementation of the device as in FIG. 13a, but within a different sectional plane.

FIG. 13b shows a schematic sectional side view of the same implementation of the device 100 as is shown in FIG. 13a, but within a different sectional plane, namely within a plane having the value $z_2$ instead of $z_1$ along the z axis. There the optical channel 16b is arranged with the optic 22b. The optical channels 16a and 16b differ with regard to a distance 128a between the optic 22a and the facet 86a as compared to a distance 128b of the optical channel 16b between the optic 22b and the facet 86b. The distance 128 may refer to the respective distance between the optic 22 and the reflecting surface of the facet 86, while the inclination angle Φ may refer to a plane parallel to the main side 108A, e.g., the x/y plane. Channel-specific implementation of the optical channels by means of a channel-specific relative position may include a channel-specific inclination angle of the optical path in the area located between the image sensor area arrangement and the beam deflection means in relation to a plane parallel to the main side, i.e., an out-of-plane course of the optical channels. Channel-specific is understood to mean that at least two channels, several channels or all of the channels differ from at least one other optical channel, several optical channels or all optical channels with regard to the relative position(s).

For example, the distance 128b may be larger, alternatively smaller, than the distance 128a. Alternatively or additionally, a setting angle $Φ_1$ of the optical channel 16a may differ from a setting angle $Φ_2$ of the optical channel 16b, e.g. it may be larger. As a result, optical paths 102a and 102b which extend in parallel with each other or extend at least within the same x/z plane may be deflected in different directions. A distance 132 of the image sensor 12 and/or of the respectively associated image sensor areas from the edge side 108E may be identical in the optical channels 16a and 16b, which is equivalent to a same or identical relative position of the respective image sensor area along the axial direction x. Instead of referring to the edge side 108E, said same position may refer to the proximal edge 122 or the distal edge 126.

In other words, embodiments of the present invention relate to the individual designs of the optical channels, so that a minimum window size and/or a minimum distance of the window edge (the distal edge 126), which faces the optic, from the edge of the smartphone or its display results. This is achieved, e.g., in that an axial distance 128 and a setting angle ϕ of the reflecting facets 86 with regard to the optics 22 are selected such that a minimum window size (dimension 116) and/or a minimum distance 124 of the window edge 126, which faces the optic, from the edge of the smartphone or its display results for a distance, among other things, in accordance with the thickness 134 of the display of a smartphone. The distances of the optics from the image sensor and the optics may be the same for all of the channels.

Figure 14A:
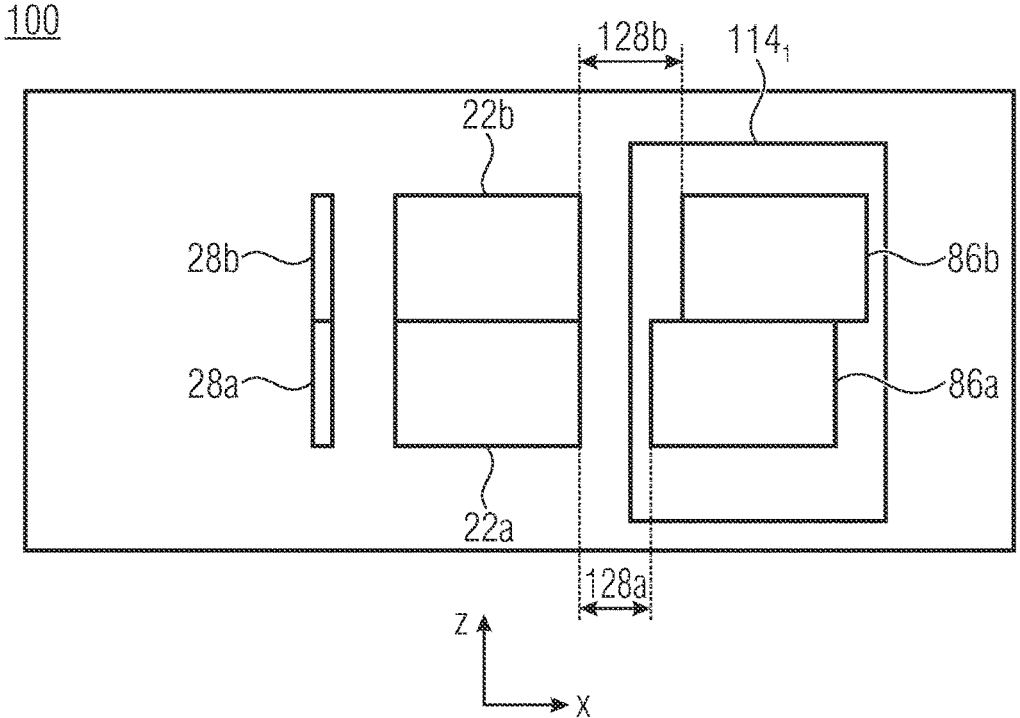
FIGS. 14a-c show schematic top views of different implementations of the device of FIG. 10, with the different distances, mentioned in the context of FIGS. 13a and 13b, between optics and facets.
Figure 14B:
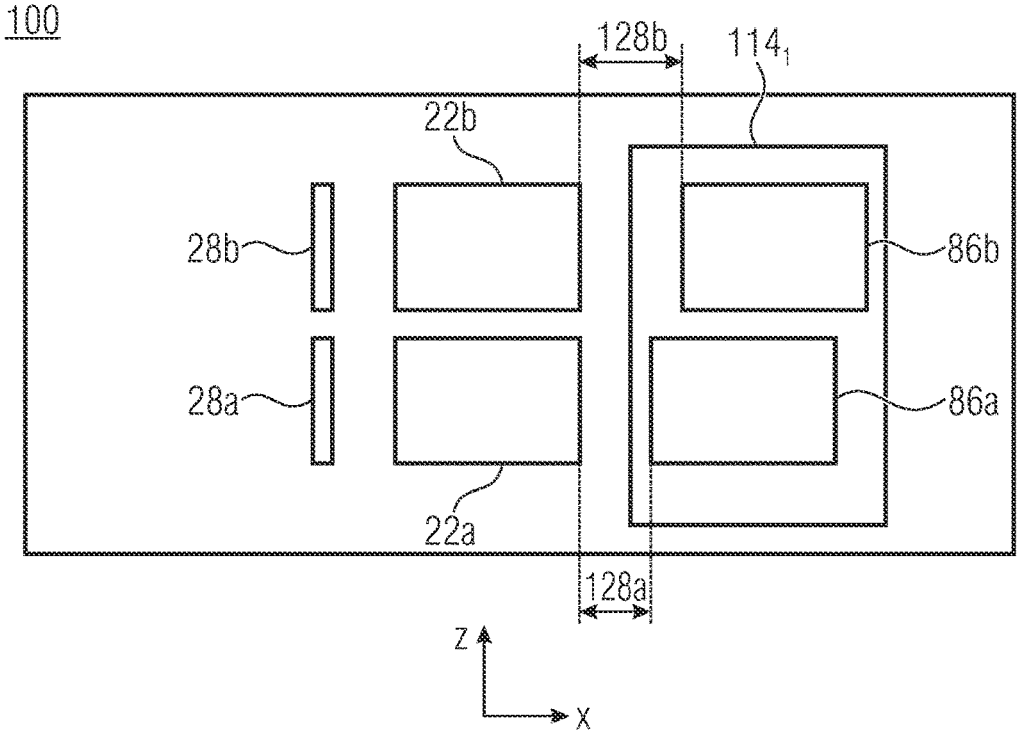
Figure 14C:
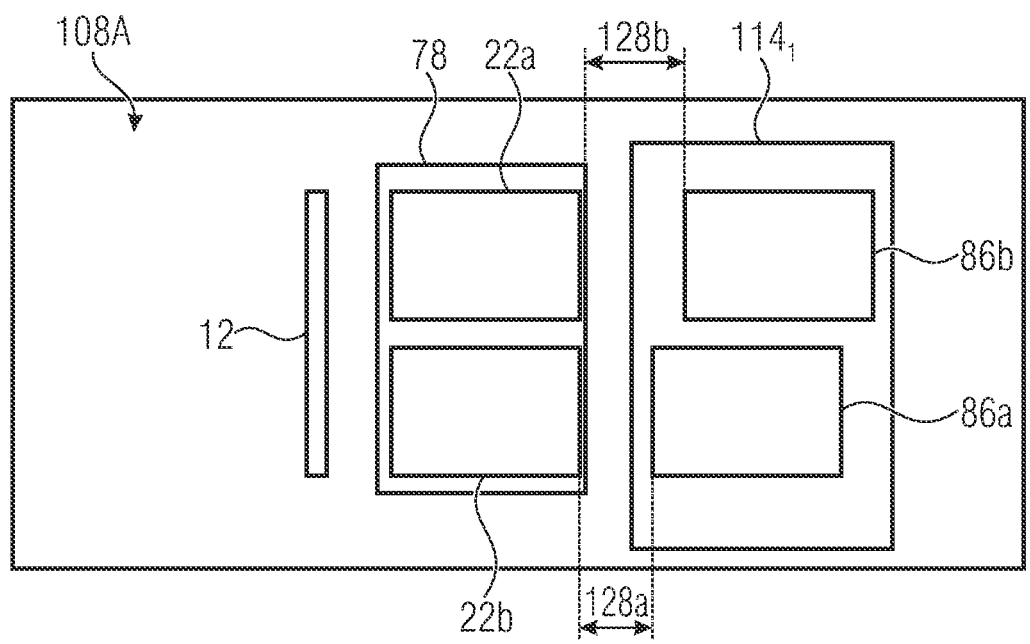

FIGS. 14a to 14c show schematic top views of different implementations of the device 100 including the different distances 128a and 128b between the optic 22a and the facet 86a, on the one hand, and between the optic 22b and the facet 86b, on the other hand, which were mentioned in connection with FIGS. 13a and 13b. This is obtained in that, for example, the optics 22a and 22b are arranged at the same axial position, i.e., with the same x coordinate. Alternatively or additionally, the image sensor areas 28a and 28b may also be arranged at the same axial position.

While in FIG. 14a, the image sensor areas 28a and 28b are implemented as different chips which are directly adjacent to each other, however, a shared image sensor 12 may be used in accordance with the configuration shown in FIG. 14c, i.e., a constructional gap may or may not be arranged between the image sensor areas 28a and 28b. In accordance with a distance or a direct neighborhood of image sensor areas, the optics 22a and 22b may also be arranged close to each other, as depicted in FIG. 14a, or may be arranged at a mutual distance, as explained in FIGS. 14b and 14c, for example. Optionally, the array of optical channels may comprise the shared substrate 78 which, e.g., is transparent and has the optical paths passing through it.

The facets 86a and 86b may also be arranged directly adjacently to each other, as depicted in FIG. 14a, or may be spaced apart from each other as depicted in FIGS. 14b and 14c.

The representation of modules consisting of image sensor, optic and facet in accordance with FIG. 14a, a distance between the individual channels in FIG. 14b and a continuous image sensor and a shared array optic in FIG. 14c may be combined in any manner desired.

The different distances 128a and 128b may be compensated for, while keeping the distances between the optics and the image sensor areas, by differently formed optics, e.g., with regard to the focal width, so that adaptation of the optics to the different distances, or vice versa, may be implemented.

Figure 15A:
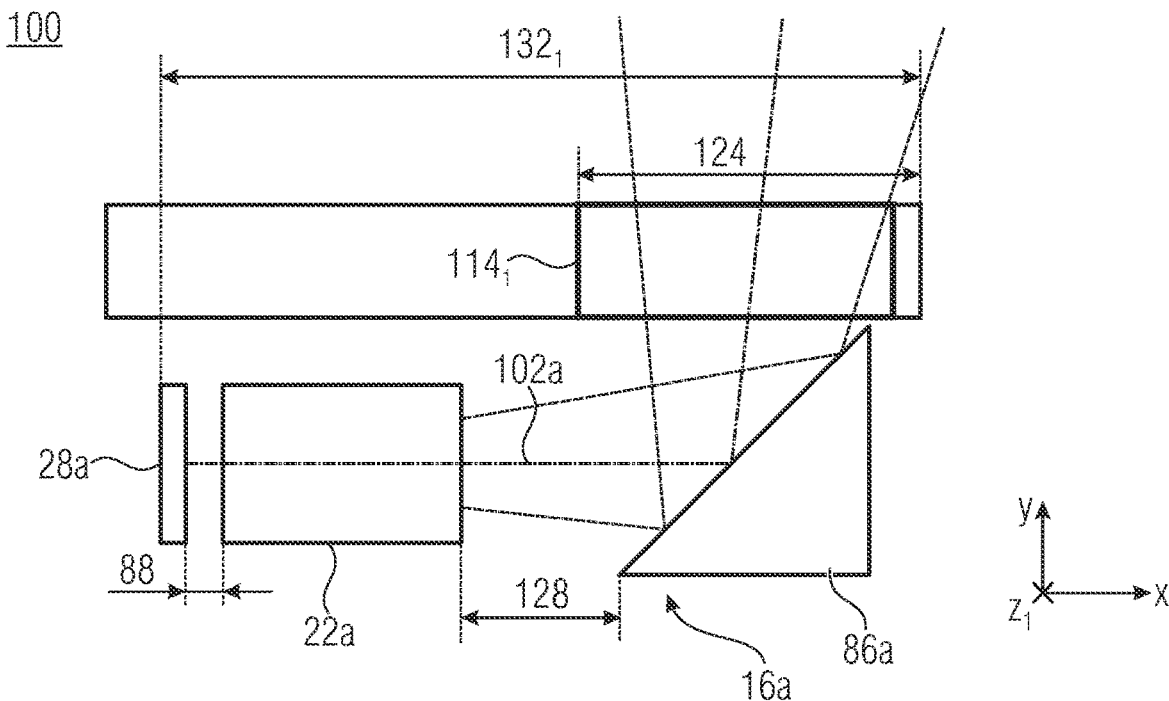
FIGS. 15a-b show schematic sectional side views of a configuration of the device of FIG. 10 in accordance with an embodiment, wherein an axial position of the combination of the image sensor area, the optic and the associated facet of the different optical channels provides the channel-specific relative position along a direction of the optical paths in an area located between the image sensor arrangement comprising the image sensor areas and the beam deflection means.
Figure 15B:
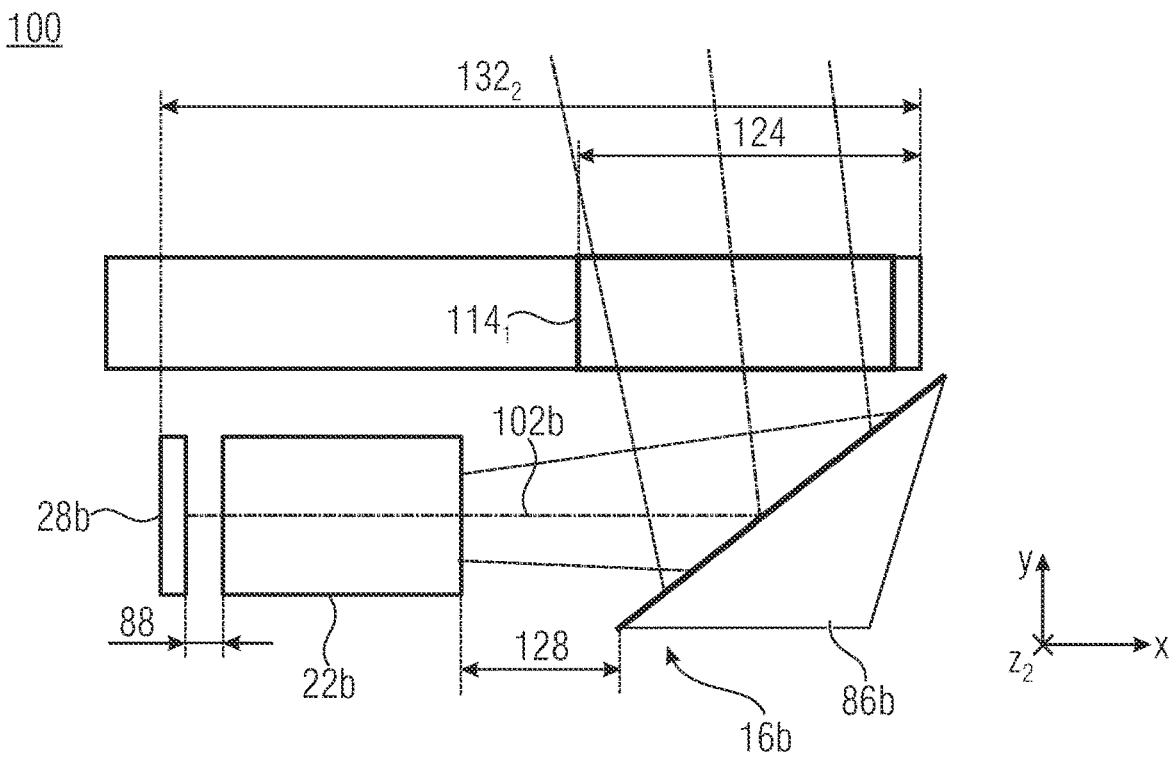

FIGS. 15a and 15b show schematic sectional side views of a configuration of the device 100 in accordance with an embodiment, wherein a different axial position of the combination, i.e., of the total arrangement, of the image sensor area 28, the optic 22 and the associated facet 86 of the different optical channels 16a and 16b along a direction of the optical paths 102a and 102b in an area located between the image sensor arrangement comprising the image sensor areas 28a and 28b and the beam deflection means provides the channel-specific relative position.

Figure 15C:
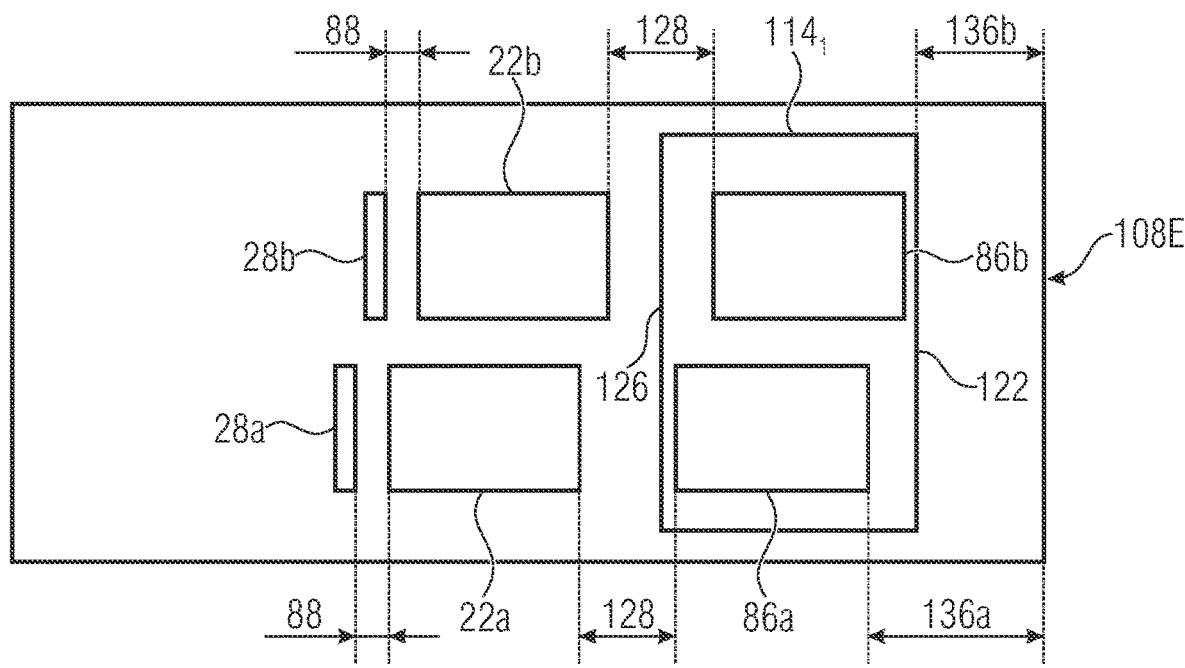
FIG. 15c shows a schematic top view of the configuration of FIGS. 15a and 15b.

This means that the distance 88 as well as the distance 128 may be the same in the optical channels 16a and 16b, as can also be seen in FIG. 15c, which shows a schematic top view of the configuration which is depicted within different planes of the z axis in FIGS. 15a and 15b. The optical channels 16a and 16b may thus be formed to be the same, e.g., with regard to the spacing of the components, but may be mutually offset in total as a group along the x direction, so that different distances 136a and 136b result between the facets 86a and 86b and the edge side 108E.

Even though the image sensor areas 28a and 28b are depicted as mutually different chips, this will not prevent the image sensor areas 28a and 28b from being configured within a shared substrate, for example by implementing a step shape or the like. Likewise, the optic 22a may be connected to the optic 22b while using a shared substrate.

This embodiment enables implementing the optics 22a and 22b in the same manner, for example with the same focal width and/or the same capturing range. However, it is also possible to combine this embodiment with the different distances described in connection with FIGS. 13a, 13b, 14a, 14b and 14c. Alternatively or additionally, for example, only one axial position of the facet along the direction of the optical path 102 may differ in the area located between the image sensor 12 and the beam deflection means, and/or a distance between the respective optic 22 and the image sensor may be adapted.

In other words, alternatively or additionally, the axial position of the entirety consisting of the image sensor, the optic and the deflection facet may be formed differently, i.e., individual channels may comprise the same optics or distances, but may comprise no image sensor within a shared plane, for example no shared continuous image sensor.

Figure 16A:
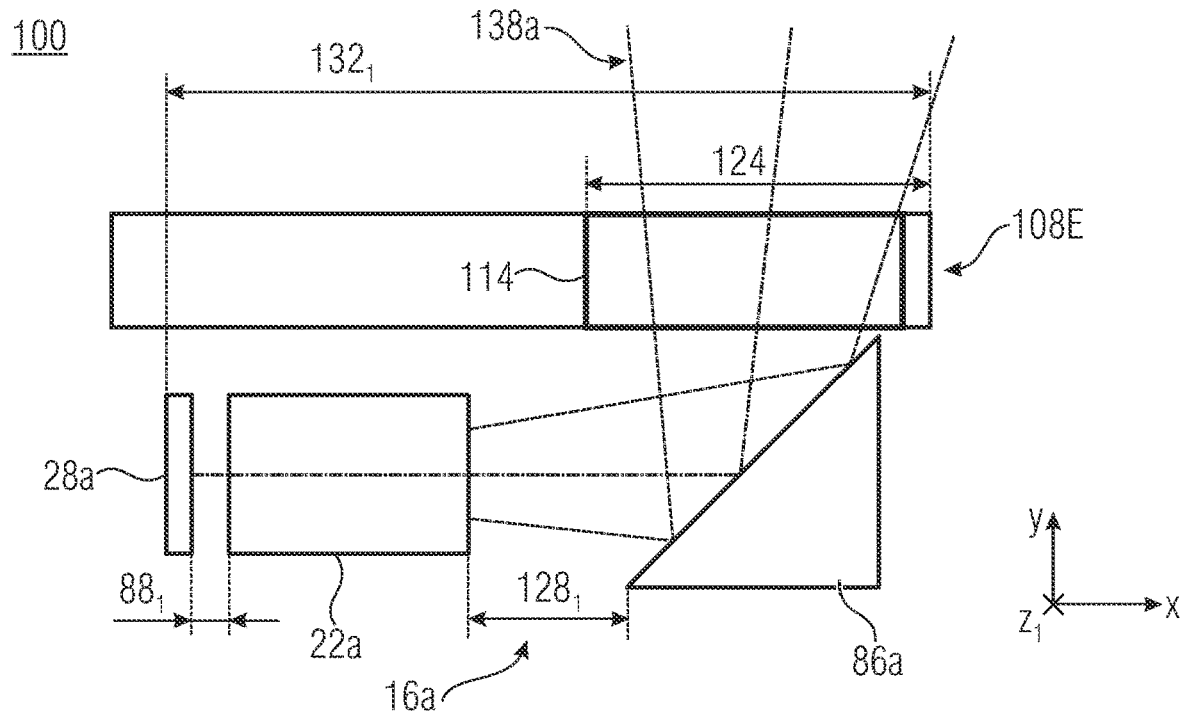
FIGS. 16a-b show schematic sectional side views of a configuration of the device of FIG. 10 in accordance with an embodiment, within different planes $z_1$ and $z_2$ of an x/y plane.
Figure 16B:
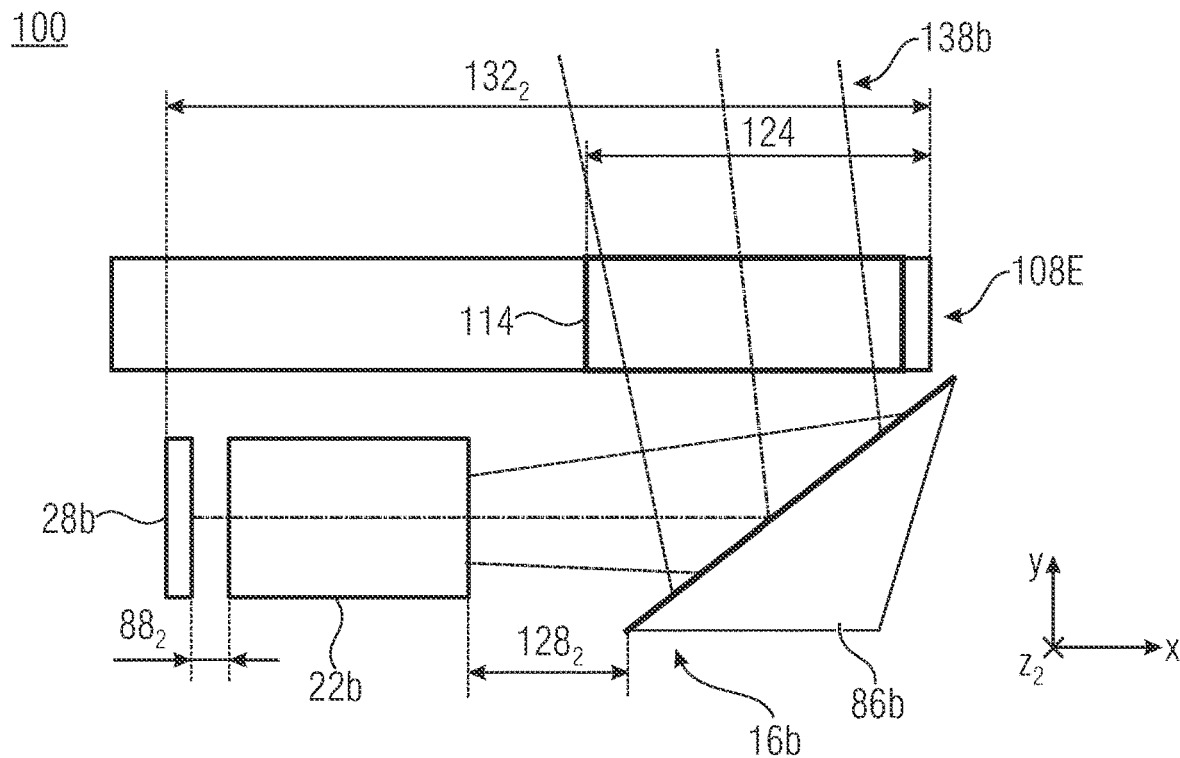

FIGS. 16a and 16b show schematic sectional side views of a configuration of the device 100 within different planes $z_1$ and $z_2$ of an x/y plane, wherein the image sensor areas 28a and 28b comprise different distances $132_1$ and 1322 from the edge side 108E. In addition, the optics 22a and/or 22b have different distances $88_1$ and $88_2$ from the respectively associated image sensor areas 28a and 28b.

Alternatively or additionally, the distances $128_1$ and 1282 between the optic 22a and the facet 86a and/or between the optic 22b and the facet 86b may differ from each other so as to implement a corresponding adaptation of the imaging properties of the optical channels 16a and 16b. Alternatively or additionally, potentially present dissimilar dimensions of the optics 22a and 22b along the x direction may be compensated for by the different distances, e.g., when using optics 22a and 22b which have different properties.

In other words, optics, axial optic positions and/or axial image sensor positions may be individual for, or specific to, all channels.

Individuality, or specificity, may be exploited in that projections of beams of rays 138a and 138b of the different optical channels into a shared x/y plane, i.e., with a projection along the line extension direction and/or the z direction, overlap to a large extent, in particular to a larger extent than in an implementation that is global to all channels, i.e., in an implementation wherein the axial positions of the image sensor areas, of the optics and of the facets are the same, even if setting angles of the facets may differ. Due to the large amount of overlap, the window size required, the dimension 116, may be small, which is advantageous in particular with large displays, or when a surface is used as a display to a large extent. This means that the passage area arrangement may be adapted to the increased overlap obtained—in particular, it may be reduced in size. The passage area arrangement may be configured such that unimpeded passage of the optical paths is enabled in an unchanged manner.

Figure 17A:
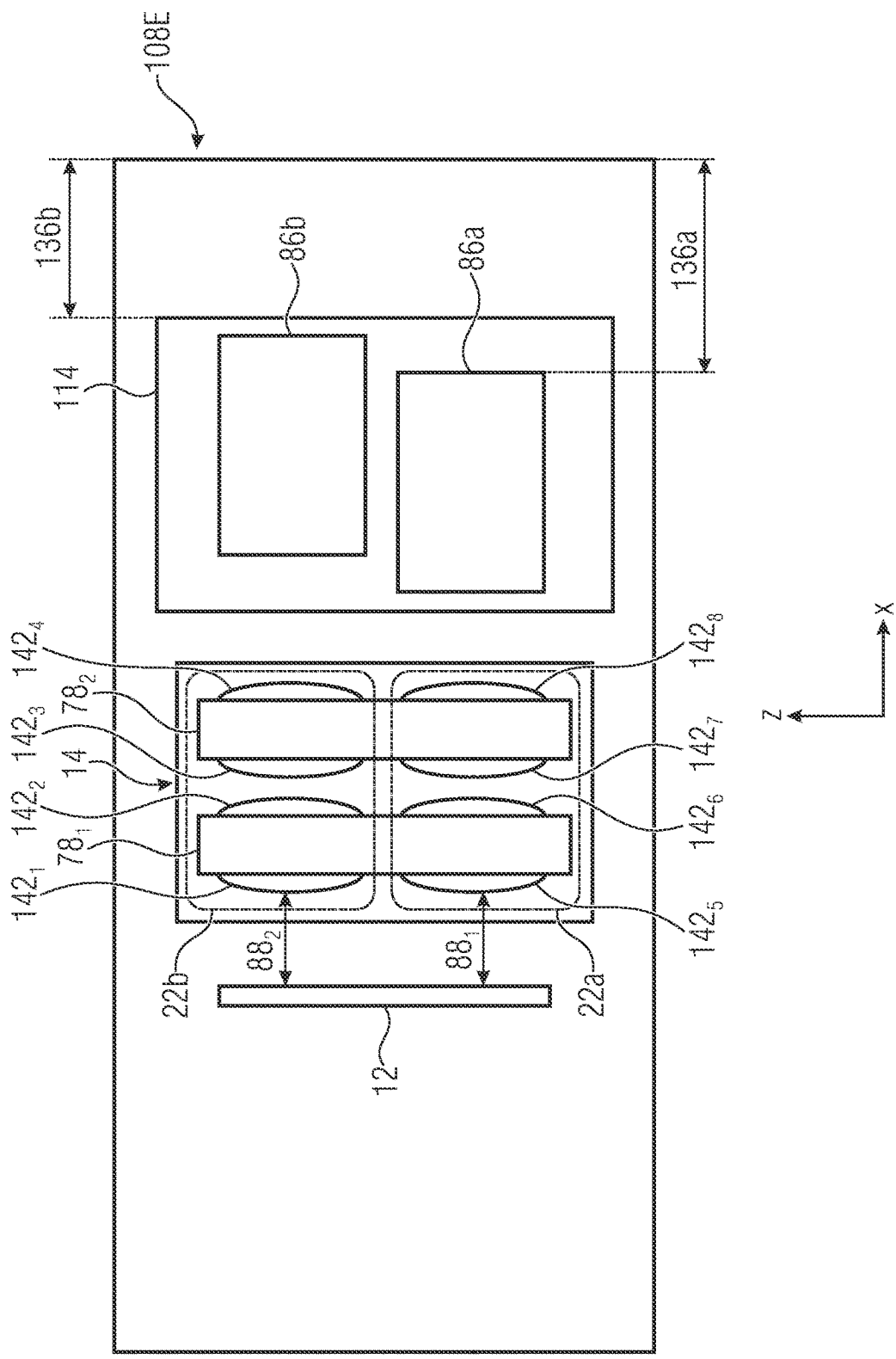
FIG. 17a shows a schematic top view of a configuration of the device of FIG. 10 in accordance with an embodiment, wherein the optics are formed as a stack of lenses in each case.

FIG. 17a shows a schematic top view of a configuration of the device 100, wherein the optics 22a and 22b are each formed as a stack of lenses connected to one or more substrates $78_1$ and/or $78_2$ within different planes along the x direction. On the basis of the different distances 136a and 136b of the facets 86a and 86b arranging of the image sensor areas within a shared x plane, possibly as a shared image sensor 12, may be enabled; the optics 22a and 22b may be individually designed here, e.g., with regard to their focal widths and/or with regard to the obtained distances from the facets and/or from the image sensor. For example, the individual lenses $142_i$ of the optics 22a and 22b may have different sizes and/or focal widths. As a result, in combination with several individual lenses, any desired optical property of the total optics 22a and 22b may be obtained, which are adapted to the mutually different distances 136a and 136b.

In other words, the optics may comprise shared continuous substrates $78_1$ and $78_2$; arranged on the latter, the lenses $142_i$ of the individual channels may be configured in a channel-specific manner and may also comprise different distances from the image sensor 12. The substrates 78₁ and 78₂ may be arranged perpendicularly to the optical axis, which means perpendicularly to the axial direction x.

FIG. 17b shows a schematic top view of a configuration wherein the substrate 78₁ and/or 78₂ is tilted, as compared to the perpendicular arrangement shown in FIG. 17a, in a manner that is perpendicular to the axial direction, which also enables adapting the optical paths of the individual optical channels to the mutually different distances of the different channels between the optics 22a and 22b, respectively, the associated facets 86a and 86b, respectively, and/or the respectively associated image sensor area, or image sensor 12. The optics may comprise rotationally asymmetric bodies while being configured such that the surface profiles of lenses 142ᵢ of the optics 22a and 22b may be described to be rotationally symmetric about a direction parallel to the x direction, i.e., rotationally symmetric to the optical axes of the optical channels. This may be obtained, for example, by compensating for the tilting by means of the substrates 78₁ and 78₂ by means of wedge shapes 144, as a result of which a rotationally asymmetric body is obtained which, however, may result in a rotationally symmetric optic when combined with the tilted substrate 78₁ and/or 78₂.

By contrast, adaptation, or channel-specific implementation, in accordance with FIG. 17a may be performed such that the optics 22a and 22b are formed to differ from each other and are arranged along different axial positions along the x direction so as to adapt the optical paths of the individual channels to the mutually differing distances between the optics, the associated facets and/or the respectively associated image sensor area.

In other words, the substrates, as depicted in FIG. 17b, may be arranged in a non-perpendicular manner in relation to the optical axes, and the lenses of the optics may be configured to comprise a wedge angle, so that the surfaces of the lenses are formed to be rotationally symmetric to the optical axes of the channels.

While FIG. 17a shows a continuous image sensor, a shared array optic with continuous substrates, FIG. 17b shows a combination of different embodiments.

Embodiments enable a minimum width of the shared exit window (of the passage area arrangement 114) of all channels for improved utilization of the surface and maximization of the display area. This may also involve improved aesthetics. Embodiments may be used in multi-aperture imaging systems comprising linear channel encoding and minimal installation size, in particular for cameras for smartphones in the direction facing the user. In accordance with embodiments, a display means, or a display, is arranged on the main side which covers at least 90%, at last 93% or at least 95% of the main side 108A and at least partly encloses the passage area arrangement. For example, the passage area arrangement is not enclosed by the display only on that side which faces the edge side 108E.

As can be easily seen, e.g., in FIGS. 14a, 14b, 14c, 15c, 17a and 17b, the multi-aperture imaging device may be configured such that an overlap of the facets 86, which form the end along the axial direction x, across the passage area arrangement 114 is small or not required. Therefore, embodiments enable arranging the beam deflection means to be adjacent to the edge side 108E and also arranging the passage area arrangement, despite the very small size, to be adjacent to the edge side. The edge 126 which is distal in relation to the edge side may have a distance from the edge side 108E which is influenced by several properties of the device, which include:

a: on the side of the optic of the optical channels, a size, e.g., a diameter, of an aperture diaphragm used;
b: a thickness of the exit window, see, e.g., the dimension along y in FIGS. 13a-b, FIGS. 15a-b and FIGS. 16a-b;
c: a total angle of field of the total field of view along the longest side of the housing
d: the number of partial images captured along this longest side of the housing;
e: an optional super-resolution factor.

The distance of the distal edge may amount to:

$$3a+4b*\tan(c/2*d*e+(d/e-1)*5°)$$

or less, which may also be expressed as the sum of three times the diameter of the aperture diaphragm of the optic and the product of four times the window thickness, multiplied by the tangent of the angle, which corresponds to half the visual field angle along the longest side of the housing, divided by the number of partial images in the direction of the longest side of the housing, multiplied by the factor of the super resolution plus the number of images which is divided by the factor of the super resolution, in the direction of the longest side of the housing, minus one, multiplied by 5°.

As is shown in FIGS. 12a to 12c, the proximal edge 122 may be made to come close to the edge side 108E, so that the distance comprises a value of, at the most, double the diameter of the aperture diaphragm. It may be particularly preferred for the proximal edge to reach or overlap the edge side.

In other preferred embodiments, the proximal edge 122 has a distance from the edge side 108E which amounts to, at the most, double the diameter of the aperture diaphragm.

Even though embodiments described herein may be configured such that the multi-aperture imaging device may be implemented without duplicating the channels for stereo capturing, other embodiments envisage providing at least one second multi-aperture imaging device for capturing the total field of view at least in a stereoscopic manner. Alternatively or additionally, a multi-aperture imaging device or a combination of at least two multi-aperture imaging devices may be configured such that a first group of optical channels is set up for capturing a first partial field of view or the total field of view, whereas a second group of optical channels is set up for capturing a second partial field of view or the total field of view. The device may be configured, while using a corresponding control unit, to join image information of image sensor areas of the first group and/or of the second group for increasing the resolution. Instead of or in addition to generating a depth map, one may therefore obtain an increase in the resolution in the sense of a super resolution.

The position of the beam deflection means may determine a size, at least along one direction, of the multi-aperture imaging device, e.g., along the axial direction x between the image sensor arrangement 12 and the beam deflection means 18. The beam deflection means may be arranged adjacently to the edge side, which enables arranging the passage area arrangement to also be adjacent to the edge side. This may occur alternatively or in addition to channel-specific implementation, so that embodiments refer to a device comprising a housing having two opposite main sides, the main sides being connected to each other via at least one edge side.

The device includes, e.g., a multi-aperture imaging device which is arranged inside the housing and comprises an image sensor arrangement having at least two image sensor areas, an array of adjacently arranged optical channels, each optical channel including an optic for projecting at least one partial field of view of a total field of view onto an image sensor area of the image sensor arrangement. The multi-aperture imaging device includes a beam deflection means for deflecting an optical path of the optical channels, the beam deflection means comprising a plurality of facets, each optical channel having a facet associated with it. The device is configured such that at least one of the main sides comprises a passage area arrangement having at least one passage area, the passage area arrangement being set up for allowing the optical paths to pass through. A position of the beam deflection means determines, at least partly, a size of the multi-aperture imaging device along an axial direction between the image sensor arrangement and the beam deflection means. The beam deflection means is arranged adjacently to the edge side. The passage area arrangement is arranged in an edge area of the main side that is adjacent to the edge side. Said implementation may be readily combined with the size and/or arrangement of the passage areas, of the proximal and distal edges thereof.

Inventive methods of providing a device include providing a housing comprising two oppositely located main sides which are connected to each other via at least one edge side, so that one of the main sides comprises a passage area arrangement having at least one passage area, the passage area arrangement being set up for allowing the optical paths to pass. The method includes arranging a multi-aperture imaging device in an interior of the housing, said arranged multi-aperture imaging device comprising: an image sensor arrangement; an array of adjacently arranged optical channels, each optical channel including an optic for projecting at least one partial field of view of a total field of view onto an image sensor area of the image sensor arrangement, and a beam deflection means for deflecting an optical path of the optical channels, the beam deflection means comprising a plurality of facets, each optical channel having a facet associated with it. The method is performed, in one embodiment, such that the optical channels comprise, in relation to the passage area arrangement and along an axial direction, along a course of the optical path of the optical channels between the image sensor arrangement and the beam deflection means, a channel-specific relative position of at least one of: the image sensor area, the optic, and a reflecting surface of a facet associated with the optical channel. In accordance with a further embodiment, the method may alternatively or additionally be performed such that a position of the beam deflection means determines a size of the multi-aperture imaging device along an axial direction between the image sensor arrangement and the beam deflection means, and the beam deflection means is arranged adjacently to the edge side. The passage area arrangement is arranged within an edge area of the main side adjacently to the edge side.

In accordance with embodiments, the exit windows may be designed to be narrow and/or may be arranged to be close to surface edges of a housing side, so that the display may be arranged to have a large surface area, that interruptions thereof may be dispensed with, and that a large amount of the surface may be used for the display. Embodiments are advantageous, in particular, when the cameras are used in smartphones in the direction facing the user (on the user side, which is located opposite a world side) since the exit window(s) is/are as narrow as possible and/or is/are arranged as close to the edge of the smartphone as possible, so that in total, as large as possible a display area with as little interference, so-called notches, as possible results. The windows may contain one, several or all of the optical paths of the multi-aperture cameras, i.e., there are one or several windows.

The multi-aperture cameras comprising linear channel arrangement comprise several optical channels arranged next to one another and transferring parts of the total field of view or a partial field of view in each case. Advantageously, the imaging lenses may have a mirror mounted in front of them which may be used for beam deflection and contributes to reducing the installation height.

One aspect of the present invention relates to designing the components such that the exit window(s) of the imaging channels is/are as narrow as possible, in particular along the direction of the optical axes in the area located between the imaging optics and the beam deflection means. In addition, the components may also be configured such that the distance, of that edge of the window(s) which is arranged closest to the optics, from the edge of the smartphone becomes as small as possible. The configuration of the windows may be useable for all of the variants of multi-aperture cameras which have been described or derived, i.e., the partial fields of view which are imaged by the individual channels and which partly overlap are possibly, but not necessarily, stitched to form a total field of view. Application as a camera (in the near-infrared field) for face recognition or face identification (face-ID) by generating a depth map/depth information/depth profile of a face (in connection with suitable (structured) illumination). Partial images need not necessarily be stitched (on a depth-based manner) to form a total field of view but may also be individually used for calculating the respective (partial) depth map, the total depth map possibly being stitched at a later point in time. Given a sufficiently specified, limited and known working distance (e.g., distance of the face from the smartphone), parallax-based image stitching is not necessary anyway, or is necessary to a very small extent only, but the partial images may be stitched to form a total image for this corresponding one object distance only.

There may be several channels or modules, so that the total field of view may be scanned several times, so that stereo, triple, quattro and even more often repeated scanned arrangements may result.

The optics of the channels regarding the above-mentioned architectures may achieve a higher spatial resolution than may be resolved by using the pixels of the image sensors used in the channels, so that aliasing results. By scanning the total field of view several times, methods of super resolution may thus be used, and improved spatial resolution may be achieved.

The total fields of view of individual channel groups may differ in size and may fully overlap. Alternatively or additionally, the one-dimensional vectors of the arrangement of the channels and of the partial fields of view may be arranged perpendicularly and/or in parallel.

Even though some aspects were described in connection with a device, it shall be understood that said aspects also represent a description of the corresponding method, so that a block or a component of a device is also to be understood as a corresponding method step or as a feature of a method step. By analogy therewith, aspects that were described in connection with or as a method step also represent a description of a corresponding block or detail or feature of a corresponding device.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device comprising:
   a housing having two oppositely located main sides which are connected to each other via at least one edge side;
   a multi-aperture imaging device arranged in an interior of the housing and comprising:
      an image sensor arrangement;
      an array of adjacently arranged optical channels, each optical channel including an optic for projecting at least one partial field of view of a total field of view onto an image sensor area of the image sensor arrangement, and
      a beam deflection means for deflecting an optical path of the optical channels, the beam deflection means comprising a plurality of facets, each optical channel having a facet associated with it;
   wherein one of the main sides comprises a passage area arrangement with at least one passage area, the passage area arrangement being set up to allow the optical paths to pass;
   wherein the optical channels comprise, in relation to the passage area arrangement and along an axial direction, along a course of the optical path of the optical channels between the image sensor arrangement and the beam deflection means, a channel-specific relative position of at least one of:
      the image sensor area;
      the optic;
      a reflecting surface of a facet associated with the optical channel as a distance between the reflecting surface of the facet and the optic of the optical channel, differing from another optical channel;
   wherein the passage area arrangement causes, as compared to a relative position that is global to all the channels, a reduction of a required size of the passage area arrangement along the axial direction, which nevertheless enables unimpeded passage of the optical paths: or
   wherein the channel-specific relative position causes, as compared to a relative position that is global to all the channels, an increase in the overlap of projections of beams of rays of the optical paths within an area of the passage area arrangement, and a size of the passage area arrangement is adapted to the increase in overlap, the projections being projected along a line extension direction of the array.

2. The device as claimed in claim 1, wherein the channel-specific relative position includes at least one of the following:
   a distance between the optic and the reflecting surface of the associated facet;
   an inclination angle of the optical path in the area located between the image sensor and the beam deflection means in relation to a plane parallel to the main side;
   a distance between the image sensor area and the optic;
   an axial position of the image sensor area, of the optic and of the associated facet along a direction of the optical path within an area located between the image sensor and the beam deflection means; and
   an axial position of the facet along the direction of the optical path within an area located between the image sensor and the beam deflection means.

3. The device as claimed in claim 1, wherein the array of optical channels comprises a shared substrate that is effective for at least two optical channels, that supports at least part of the optics of the respective optical channel, and wherein a first facet of a first optical channel comprises a first axial position along the axial direction; and wherein a second facet of a second optical channel comprises a second axial position, which differs from the first axial position, along the axial direction;
   wherein the substrate is arranged perpendicularly to the axial direction and the optics of the first and second optical channels are formed to differ from one another and may be arranged along different axial positions so as to adapt the optical paths of the individual channels to the mutually different distances between the optics, the associated facets and/or the respectively associated image sensor area; and/or
   wherein the substrate is tilted, in relation to an arrangement, perpendicularly to the axial direction so as to adapt the optical paths of the individual channels to the mutually different distances of the different channels located between the optics, the associated facets and/or the respectively associated image sensor area.

4. The device as claimed in claim 3, wherein the substrate is tilted in relation to the perpendicular arrangement, and the optics comprise rotationally asymmetric bodies, and the surface profiles of lenses of the optics may be described to be rotationally symmetric to the optical axes of the optical channels.

5. The device as claimed in claim 3, wherein the substrate is formed to be transparent and has the optical paths passing through it.

6. The device as claimed in claim 1, wherein the beam deflection means is arranged adjacently to the edge side, and the passage area arrangement is arranged within an edge area of the main side adjacently to the edge side, wherein the at least one passage area comprises, in relation to the edge side, a proximal edge and a distal edge, wherein the distal edge comprises a distance from the edge side which corresponds, at the most, to the sum of three times the diameter of the aperture diaphragm of the optic and the product of four times the window thickness, multiplied by the tangent of the angle, which corresponds to half the visual field angle along the longest side of the housing, divided by the number of partial images in the direction of the longest side of the housing, multiplied by the factor of the super resolution plus the number of images which is divided by the factor of the super resolution, in the direction of the longest side of the housing, minus one, multiplied by 5°.

7. The device as claimed in claim 6, wherein the proximal edge exhibits a distance from the edge side which corresponds, at the most, to double the diameter of the aperture diaphragm of the optics and which particularly preferably reaches the edge side.

8. The device as claimed in claim 1, wherein the beam deflection means is arranged adjacently to the edge side, and the passage area arrangement is arranged within an edge area of the main side adjacently to the edge side, wherein the at least one passage area comprises, in relation to the edge side, a proximal edge and a distal edge, wherein the proximal edge exhibits a distance from the edge side which corresponds, at the most, to double the diameter of the aperture diaphragm of the optics.

9. The device as claimed in claim 1, further comprising:
   a focusing means for setting a focal position of the multi-aperture imaging device; and
   a control means configured to control the focusing means and to receive image information from the image sensor arrangement; the control means being configured to control the multi-aperture imaging device into a sequence of focal positions so as to capture a corresponding sequence of image information of the total field of view and to produce, from the sequence of image information, a depth map for the captured total field of view.

10. The device as claimed in claim 1, further comprising an illumination source configured to send out an illumination signal within a wavelength range that is not visible to the human eye, preferably an infrared range, and particularly preferably a near-infrared range, in the direction of the total field of view, the multi-aperture imaging device being configured to image the total field of view within the non-visible wavelength range.

11. The device as claimed in claim 1, wherein the total field of view is a first total field of view, wherein the passage area arrangement is a first passage area arrangement and is arranged in a first main side; the device comprising a second passage area arrangement in a second main side;
wherein a relative location of the beam deflection means is switchable between a first position and a second position, so that in the first position, the optical path is deflected toward the first total field of view, and in the second position, the optical path is deflected toward a second total field of view through the second passage area arrangement.

12. The device as claimed in claim 11, wherein the first passage area arrangement comprises a first diaphragm, and the second passage area arrangement comprises a second diaphragm, the beam deflection means deflecting, in a first operating state, the optical paths such that they pass through the first passage area arrangement and the second diaphragm sets the second passage area arrangement to be at least partly optically non-transparent; and
wherein in the second operating state, the beam deflection means deflects the optical path of the imaging device such that said optical path passes through the second passage area arrangement and the first diaphragm sets the first passage area arrangement to b at least partly optically non-transparent.

13. The device as claimed in claim 1, wherein a first optical channel of the array is configured to image a first partial field of view of the total field of view, wherein a second optical channel of the array is configured to image a second partial field of view of the total field of view, and wherein a third optical channel is configured to fully image the total field of view.

14. The device as claimed in claim 1, wherein the partial fields of view of the total field of view are arranged in a direction perpendicular or parallel to a line extension direction of the array, along which the optical channels are adjacently arranged in one line.

15. The device as claimed in claim 1, wherein the multi-aperture imaging device is a first multi-aperture imaging device, and the device further comprises at least one second multi-aperture imaging device and is set up to capture the total field of view at least stereoscopically.

16. The device as claimed in claim 1, wherein a first group of optical channels is set up for capturing a first partial field of view or the total field of view, whereas a second group of optical channels is set up for capturing a second partial field of view or the total field of view, the device comprising a control unit means configured to join image information of image sensor areas of the first group and/or of the second group for increasing the resolution.

17. The device as claimed in claim 1, wherein the main side comprises a display means which covers at least 90% of the main side and at least partly encloses the passage area arrangement.

18. The device as claimed in claim 1, wherein a position of the beam deflection means determines a size of the multi-aperture imaging device along the axial direction between the image sensor arrangement and the beam deflection means, and the beam deflection means is arranged adjacently to the edge side.

19. A device comprising:
a housing having two oppositely located main sides which are connected to each other via at least one edge side;
a multi-aperture imaging device arranged in an interior of the housing and comprising:
an image sensor arrangement;
an array of adjacently arranged optical channels, each optical channel including an optic for projecting at least one partial field of view of a total field of view onto an image sensor area of the image sensor arrangement,
a beam deflection means for deflecting an optical path of the optical channels, the beam deflection means comprising a plurality of facets, each optical channel having a facet associated with it;
wherein one of the main sides comprises a passage area arrangement with at least one passage area, the passage area arrangement being set up to allow the optical paths to pass;
wherein a position of the beam deflection means determines a size of the multi-aperture imaging device along an axial direction between the image sensor arrangement and the beam deflection means, and the beam deflection means is arranged adjacently to the edge side; and
wherein the passage area arrangement is arranged within an edge area of the main side adjacently to the edge side;
wherein the at least one passage area comprises, in relation to the edge side, a proximal edge and a distal edge, wherein the distal edge comprises a distance from the edge side which corresponds, at the most, to the sum of three times the diameter of the aperture diaphragm of the optic and the product of four times the window thickness, multiplied by the tangent of the angle, which corresponds to half the visual field angle along the longest side of the housing, divided by the number of partial images in the direction of the longest side of the housing, multiplied by the factor of the super resolution plus the number of images which is divided by the factor of the super resolution, in the direction of the longest side of the housing, minus one, multiplied by 5°; or
wherein the at least one passage area comprises, in relation to the edge side, a proximal edge and a distal edge, wherein the proximal edge exhibits a distance from the edge side which corresponds, at the most, to double the diameter of the aperture diaphragm.

20. The device as claimed in claim 19, wherein the proximal edge exhibits a distance from the edge side which corresponds, at the most, to double the diameter of the aperture diaphragm and which particularly preferably reaches the edge side.

21. A method of providing a device, comprising:
providing a housing comprising two oppositely located main sides which are connected to each other via at least one edge side, so that one of the main sides comprises a passage area arrangement having at least one passage area, the passage area arrangement being set up for allowing the optical paths to pass;

arranging a multi-aperture imaging device in an interior of the housing, said arranged multi-aperture imaging device comprising:

an image sensor arrangement;

an array of adjacently arranged optical channels, each optical channel including an optic for projecting at least one partial field of view of a total field of view onto an image sensor area of the image sensor arrangement, a beam deflection means for deflecting an optical path of the optical channels, the beam deflection means comprising a plurality of facets, each optical channel having a facet associated with it;

so that the optical channels comprise, in relation to the passage area arrangement and along an axial direction, along a course of the optical path of the optical channels between the image sensor arrangement and the beam deflection means, a channel-specific relative position of at least one of:

the image sensor area;

the optic;

a reflecting surface of a facet associated with the optical channel as a distance between the reflecting surface of the facet and the optic of the optical channel, differing from another optical channel;

such that the passage area arrangement causes, as compared to a relative position that is global to all the channels, a reduction of a required size of the passage area arrangement along the axial direction, which nevertheless enables unimpeded passage of the optical paths; or such that the channel-specific relative position causes, as compared to a relative position that is global to all the channels, an increase in the overlap of projections of beams of rays of the optical paths within an area of the passage area arrangement, and a size of the passage area arrangement is adapted to the increase in overlap, the projections being projected along a line extension direction of the array.

* * * * *